(12) United States Patent
King

(10) Patent No.: US 11,127,993 B2
(45) Date of Patent: Sep. 21, 2021

(54) ELECTRIC VEHICLE THERMAL MANAGEMENT SYSTEM WITH BATTERY HEAT STORAGE

(71) Applicant: Rivian IP Holdings, LLC, Plymouth, MI (US)

(72) Inventor: Jonathan King, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 15/716,333

(22) Filed: Sep. 26, 2017

(65) Prior Publication Data

US 2018/0086224 A1    Mar. 29, 2018

Related U.S. Application Data

(60) Provisional application No. 62/400,128, filed on Sep. 27, 2016.

(51) Int. Cl.
*B60H 1/32*    (2006.01)
*H01M 10/625*    (2014.01)
(Continued)

(52) U.S. Cl.
CPC ...... *H01M 10/625* (2015.04); *B60H 1/00278* (2013.01); *B60H 1/00921* (2013.01); *B60H 1/32281* (2019.05); *B60L 50/64* (2019.02); *B60L 58/26* (2019.02); *H01M 10/613* (2015.04); *H01M 10/63* (2015.04); *H01M 10/66* (2015.04); *H01M 10/663* (2015.04); *B60H 1/00392* (2013.01); *B60H 2001/00307* (2013.01); *B60H 2001/00928* (2013.01); *B60H 2001/00942* (2013.01); *B60H 2001/00949* (2013.01); *B60H 2001/00957* (2013.01);
(Continued)

(58) Field of Classification Search
CPC ............ B60H 1/00278; B60H 1/00885; B60H 2001/00307; B60L 58/24; B60L 58/26; B60L 58/27; H01M 10/66; H01M 10/663
See application file for complete search history.

(56) References Cited

U.S. PATENT DOCUMENTS 4,007,315 A    2/1977    Brinkman et al.
9,328,945 B2    5/2016    Arai et al.
(Continued)

OTHER PUBLICATIONS

Patent Cooperation Treaty, International Search Report, PCT/US2017/053476, dated Nov. 30, 2017.
(Continued)

*Primary Examiner* — Jonathan Bradford
(74) *Attorney, Agent, or Firm* — Clements Bernard Walker; Christopher L. Bernard

(57) ABSTRACT

Systems and methods are described herein for controlling heat flow between systems of an electric automotive vehicle. An automotive electric vehicle system includes a high voltage battery system including an enclosure, an electric powertrain system, a radiator, coolant lines that permit coolant flow between the high voltage battery system, the power train system and the radiator, one or more valves for routing coolant along the coolant lines, and a controller. The controller is configured to control the one or more valves to control the flow of coolant among a plurality of different, selectable coolant flow states involving the high voltage battery system, the powertrain system and the radiator.

30 Claims, 53 Drawing Sheets

(51) Int. Cl.
| | |
|---|---|
| *B60H 1/00* | (2006.01) |
| *H01M 10/663* | (2014.01) |
| *H01M 10/613* | (2014.01) |
| *H01M 10/63* | (2014.01) |
| *B60L 50/64* | (2019.01) |
| *H01M 10/66* | (2014.01) |
| *B60L 58/26* | (2019.01) |
| *B60K 11/02* | (2006.01) |
| *B60K 1/00* | (2006.01) |
| *B60K 1/04* | (2019.01) |

(52) U.S. Cl.
CPC ................. *B60K 1/04* (2013.01); *B60K 11/02* (2013.01); *B60K 2001/003* (2013.01); *B60K 2001/005* (2013.01); *B60K 2001/0438* (2013.01); *H01M 2220/20* (2013.01); *Y02T 10/70* (2013.01)

(56) References Cited

U.S. PATENT DOCUMENTS

| | | | |
|---|---|---|---|
| 2006/0060340 A1* | 3/2006 | Busse | ................ B60H 1/00278 165/202 |
| 2010/0012295 A1 | 1/2010 | Nemesh et al. | |
| 2012/0297805 A1* | 11/2012 | Kamada | .................... F25B 5/02 62/208 |
| 2013/0175022 A1 | 7/2013 | King et al. | |
| 2013/0299129 A1* | 11/2013 | Osaka | .................. B60H 1/0005 165/59 |
| 2014/0041826 A1* | 2/2014 | Takeuchi | .................. B60L 1/02 165/10 |
| 2014/0311180 A1* | 10/2014 | Kawakami | ......... B60H 1/00278 62/498 |
| 2014/0338376 A1* | 11/2014 | Carpenter | ............... B60L 1/003 62/115 |
| 2016/0272036 A1 | 9/2016 | Chen et al. | |

OTHER PUBLICATIONS

Patent Cooperation Treaty, Written Opinion of the International Searching Authority, PCT/US2017/053476, dated Nov. 30, 2017.

Thermal Management, Audi Technology Portal, 2014, 1 page, retrieved from the Internet at https://www.audi-technology-portal.de/en/download?file=1101 on Aug. 31, 2018.

Innovative Thermal Management, Audi Technology Portal, 2014, 1 page, retrieved from the Internet at https://www.audi-technology-portal.de/en/download?file=678 on Aug. 31, 2018.

* cited by examiner

LEGEND

| | |
|---|---|
| AGS | ACTIVE GRILLE SHUTTER |
| CHLR | COOLANT → REFRIGERANT HEAT EXCHANGER |
| OBC | ON-BOARD CHARGER |
| DCDC | DC-DC CONVERTER (HV → LV) |
| EVAP | A/C EVAPORATOR |
| CHX | CABIN HEAT EXCHANGER (HEAT PUMP) |
| PTC | POSITIVE TEMPERATURE COEFFICIENT HEATER |
| PT | POWERTRAIN |
| ESS | ENERGY STORAGE SYSTEM (INCL. HV BATTERY SYSTEM) |
| BMS | BATTERY MANAGEMENT SYSTEM (CONTROLLER) |
| PCM | POWERTRAIN CONTROL MODULE |
| HMI | HUMAN MACHINE INTERFACE |
| ◉ | ELECTRIC WATER PUMP (EWP) |
| ◎ | ELECTRIC A/C COMPRESSOR (eAC) |
| ◆ | ELECTRIC COOLANT VALVE (ECV) |
| ⊗ | THERMAL EXPANSION VALVE (TXV) WITH SOLENOID, OR ELECTRONIC EXPANSION VALVE (EXV) |
| ········ | CONTROLS (CAN, LIN, DIRECT WIRED) |
| – – – | REFRIGERANT LINE |
| ——— | COOLANT (ETHYLENE GLYCOL/WATER) LINE |

LEGEND

| | |
|---|---|
| CHLR | - Chiller |
| CHRG | - Charger (AC→DC) |
| DCDC | - DC→DC Converter |
| EAC | - Electric Air Conditioner Compressor |
| ESS | - Energy Storage System (HV Battery) |
| HEX | - Heat Exchanger |
| LTR | - Low Temp. Radiator |
| PTC | - Positive Temp. Coefficient HV Heater |
| TMFA | - Traction Motor Front Axle incl. Inverter |
| TMRA | - Traction Motor Rear Axle incl. Inverter |
| AGS | - Active Grille Shutters (PCM Controlled) |
| LTR | - Low Temperature Radiator |
| FAN | - Cooling Fan(s) (PCM Controlled) |
| RD | - Receiver/Drier (Refrigerant System) |
| IHX | - Internal Heat Exchanger |
| SLHX | - Suction Line Heat Exchanger |
| TXV | - Thermal Expansion Valve |
| ACIS | - A/C Isolation Solenoid |
| HPHEX | - Heat Pump Heat Exchanger |

FIG. 3

| STATE | TWO 3-WAY VALVE LOGIC – AS SHOWN | | |
|---|---|---|---|
| | VALVE | INPUT | OUTPUT |
| 1 | V1 | PT PORT1 | PORT2 | LTR BYPASS |
| | V2 | ESS PORT1 | PORT2 | ESS CLOSED LOOP |
| 2 | V1 | PT PORT1 | PORT3 | LTR |
| | V2 | ESS PORT1 | PORT2 | ESS CLOSED LOOP |
| 3 | V1 | PT PORT1 | PORT2 | LTR BYPASS |
| | V2 | ESS PORT1 | PORT3 | ESS TO PT LOOP |
| 4 | V1 | PT PORT1 | PORT3 | LTR |
| | V2 | ESS PORT1 | PORT3 | ESS TO PT LOOP |

FIG. 4B

| STATE | 5-WAY VALVE BODY – VALVE LOGIC (SINGLE VALVE REPLACES TWO 3-WAY VALVES) | | |
|---|---|---|---|
| | INPUT | OUTPUT |  |
| 1 | PORT (1) | ESS TO P3 | PORT (3) | ESS CLOSED LOOP |
| | PORT (2) | PT TO P4 | PORT (4) | LTR BYPASS |
| 2 | PORT (1) | ESS TO P3 | PORT (3) | ESS CLOSED LOOP |
| | PORT (2) | PT TO P5 | PORT (5) | LTR |
| 3 | PORT (1) | ESS & PT COMBINED | PORT (4) | LTR BYPASS |
| | PORT (2) | | | |
| 4 | PORT (1) | ESS & PT COMBINED | PORT (5) | LTR |
| | PORT (2) | | | |

FIG. 4D

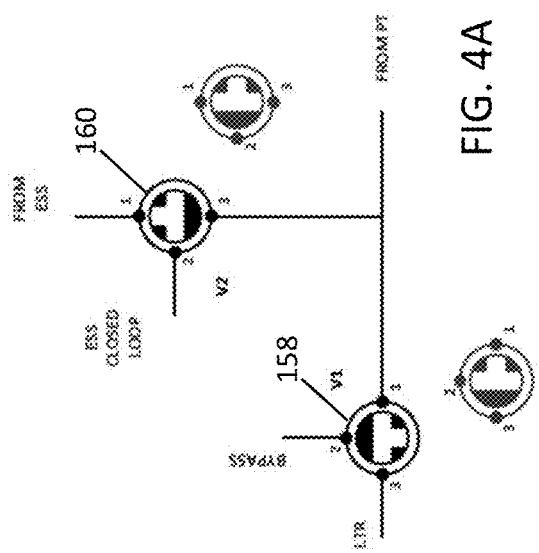

FIG. 4A

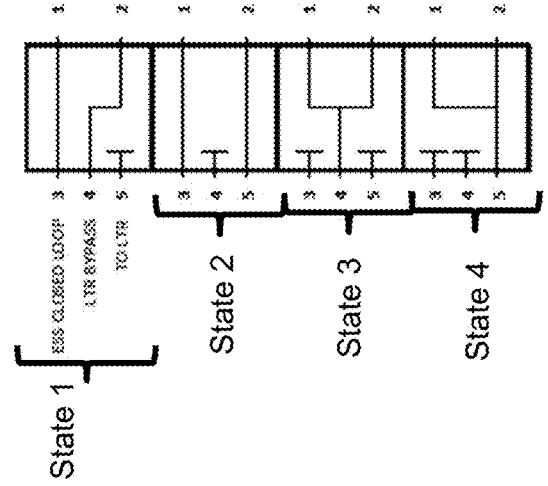

FIG. 4C

| Condition | Interior | Battery | Battery Loop | Powertrain Loop | A/C Compressor | PTC Heater | Battery Heater | AGS | Valve 1 | Valve 2 (To Radiator) | Chiller Valve (To Chlr) | Cabin Valve (To EVAP) | Interior Temp | Battery Temp | Powertrain Temp |
|---|---|---|---|---|---|---|---|---|---|---|---|---|---|---|---|
| 1 | Cool | Actively Cool | Cool, Bypass | On | Off | Off | 0-100% | Bypass | Closed | Open | Open | >20°C | >30°C | <=55°C |
| 2 | Cool | Actively Cool | Cool, No Bypass | On | Off | Off | 0-100% | No Radiator | Closed | Open | Open | >20°C | >30°C | >55°C |
| 3 | Cool | Passively Cool | Cool, Bypass | On | Off | Off | 0-100% | Bypass | Open | Closed | Open | Open | >20°C | >25°C & <=30°C | <=55°C |
| 4 | Cool | Passively Cool | Cool, No Bypass | On | Off | Off | 0-100% | No Radiator | Open | Closed | Open | Open | >20°C | >25°C & <=30°C | >55°C |
| 5 | Cool | None | Cool, Bypass | On | Off | Off | 0-100% | Bypass | N/A | Closed | Open | Open | >20°C | >10°C & <=25°C | <=55°C |
| 6 | Cool | None | Cool, No Bypass | On | Off | Off | 0-100% | No | N/A | Closed | Open | Open | >20°C | >10°C & <=25°C | >55°C |
| 7 | Cool | Warm | Cool, Bypass | On | Off | Off | 0-100% | Bypass | Closed | Closed | Open | Open | >20°C | >5°C & <=10°C | <=55°C |
| 8 | Cool | Warm | Cool, No Bypass | On | Off | Off | 0-100% | No Radiator | Closed | Closed | Open | Open | >20°C | >5°C & <=10°C | >55°C |
| 9 | Cool | Actively Heat | Cool, Bypass | On | Off | On | 0-100% | Bypass | Closed | Closed | Open | Open | >20°C | <=5°C | <=55°C |
| 10 | Cool | Actively Heat | Cool, No Bypass | On | Off | On | 0-100% | No Radiator | Closed | Closed | Open | Open | >20°C | <=5°C | >55°C |
| 11 | None | Actively Cool | Cool, Bypass | On | Off | Off | 0-100% | Bypass | Closed | Open | Open | Closed | >15°C & <=20°C | >30°C | <=55°C |

FIG. 14A

| Condition | Interior | Battery | Powertrain Loop | A/C Compressor | PTC Heater | Battery Heater | ACS | Valve 1 | Valve 2 (to Radiator) | Chiller Valve (to CHLR) | Cabin Valve (to EVAP) | Interior Temp | Battery Temp | Powertrain Temp |
|---|---|---|---|---|---|---|---|---|---|---|---|---|---|---|
| 12 | None | Actively Cool | Cool, No Bypass | On | Off | Off | 0-100% | No Bypass | Closed | Open | Closed | >15°C & <= 20°C | >30°C | >55°C |
| 13 | None | Passively Cool | Cool, Bypass | Off | Off | Off | 0-100% | Bypass Radiator | Open | Closed | Closed | >15°C & <= 20°C | >25°C & <=30°C | <=55°C |
| 14 | None | Passively Cool | Cool, No Bypass | Off | Off | Off | 0-100% | No Bypass | Open | Closed | Closed | >15°C & <= 20°C | >25°C & <=30°C | >55°C |
| 15 | None | None | Cool, Bypass | Off | Off | Off | 0-100% | Bypass Radiator | N/A | Closed | Closed | >15°C & <= 20°C | >10°C & <=25°C | <=55°C |
| 16 | None | None | Cool, No Bypass | Off | Off | Off | 0-100% | No Bypass | N/A | Closed | Closed | >15°C & <= 20°C | >10°C & <=25°C | >55°C |
| 17 | None | Warm | Cool, Bypass | Off | Off | Off | 0-100% | Bypass Radiator | Closed | Closed | Closed | >15°C & <= 20°C | >5°C & <=10°C | <=55°C |
| 18 | None | Warm | Cool, No Bypass | Off | Off | On | 0-100% | No Bypass | Closed | Closed | Closed | >15°C & <= 20°C | >5°C & <=10°C | >55°C |
| 19 | None | Actively Heat | Cool, Bypass | Off | Off | On | 0-100% | Bypass Radiator | Closed | Closed | Closed | >15°C & <= 20°C | >5°C & <=5°C | <=55°C |
| 20 | None | Actively Heat | Cool, No Bypass | On | Off | Off | 0-100% | No Bypass | Closed | Open | Closed | >15°C & <= 20°C | <= 5°C | >55°C |
| 21 | Warm - Low | Actively Cool | Cool, Bypass | On | Off | Off | 0-100% | Bypass Radiator | Open | Open | Closed² | >10°C & <= 15°C | >30°C | <=55°C |
| 22 | Warm - Low | Actively Cool | Cool, No Bypass | On | Off | Off | 0-100% | No Bypass | Open | Open | Closed² | >10°C & <= 15°C | >30°C | >55°C |

FIG. 14B

| # | Condition | Interior | Battery | Powertrain Loop | A/C Compressor | PTC | Battery Heater | AGS | Valve 1 | Valve 2 (To Radiator) | Chiller Valve (To Chiller) | Cabin Valve (to EVAP) | Inverter Temp | Battery Temp | Powertrain Temp |
|---|---|---|---|---|---|---|---|---|---|---|---|---|---|---|---|
| 23 | Warm - Low | Passively Cool | Cool, Bypass | On | Off | Off | 0-100% | Bypass Radiator | Open | Open | Closed² | >10°C & <=15°C | >25°C & <=30°C | <=55°C |
| 24 | Warm - Low | Passively Cool | Cool, No Bypass | On | Off | Off | 0-100% | No Bypass | Open | Open | Closed² | >10°C & <=15°C | >25°C & <=30°C | >55°C |
| 25 | Warm - Low | None | Cool, Bypass | On | Off | Off | 0-100% | Bypass Radiator | N/A | Open | Closed² | >10°C & <=15°C | >10°C & <=25°C | <=55°C |
| 26 | Warm - Low | None | Cool, No Bypass | On | Off | Off | 0-100% | No Bypass | N/A | Open | Closed² | >10°C & <=15°C | >10°C & <=25°C | >55°C |
| 27 | Warm - Low | Warm | Cool, Bypass | On | Off | Off | 0-100% | Bypass Radiator | Closed | Open | Closed² | >10°C & <=15°C | >5°C & <=10°C | <=55°C |
| 28 | Warm - Low | Warm | Cool, No Bypass | On | Off | Off | 0-100% | No Bypass | Closed | Open | Closed² | >10°C & <=15°C | >5°C & <=10°C | >55°C |
| 29 | Warm - Low | Actively Heat | Cool, Bypass | Off | On² | On | 0-100% | Bypass Radiator | Closed | Closed | Closed² | >10°C & <=15°C | <= 5°C | <=55°C |
| 30 | Warm - Low | Actively Heat | Cool, No Bypass | Off | On² | On | 0-100% | No Bypass | Closed | Closed | Closed² | >10°C & <=15°C | <= 5°C | >55°C |
| 31 | Warm - High | Actively Cool | Cool, Bypass | On | On² | Off | 0-100% | Bypass Radiator | Closed | Open | Closed² | >10°C & <=15°C | >30°C | <=55°C |
| 32 | Warm - High | Actively Cool | Cool, No Bypass | On | On² | Off | 0-100% | No Bypass | Closed | Open | Closed² | <= 10°C | >30°C | >55°C |
| 33 | Warm - High | Passively Cool | Cool, Bypass | On | On² | Off | 0-100% | Bypass Radiator | Open | Open | Closed² | <= 10°C | >25°C & <=30°C | <=55°C |

FIG. 14C

| Condition | | Interior | Battery | Powertrain Loop | A/C Loop | Compressor | PTC Heater | Battery Heater | AGS | Valve 1 | Valve 2 (To Radiator) | Chiller Valve (To Chiller) | Cabin valve (To EVAP) | Interior Temp | Battery Temp | Powertrain Temp |
|---|---|---|---|---|---|---|---|---|---|---|---|---|---|---|---|---|
| 34 | Warm - High | Passively Cool | Cool, No Bypass | On | On[1] | Off | 0-100% | No Bypass | Open | Open | Closed[2] | <= 10°C | >25°C & <=30°C | >55°C |
| 35 | Warm - High | None | Cool, Bypass | On | On[1] | Off | 0-100% | Bypass Radiator | N/A | Open | Closed[2] | <= 10°C | >10°C & <=25°C | <=55°C |
| 36 | Warm - High | None | Cool, No Bypass | On | On[1] | Off | 0-100% | No Bypass | N/A | Open | Closed[2] | <= 10°C | >10°C & <=25°C | >55°C |
| 37 | Warm - High | Warm | Cool, Bypass | On | On[1] | Off | 0-100% | Bypass Radiator | Closed | Open | Closed[2] | <= 10°C | >5°C & <=10°C | <=55°C |
| 38 | Warm - High | Warm | Cool, No Bypass | On | On[1] | Off | 0-100% | No Bypass | Closed | Open | Closed[2] | <= 10°C | >5°C & <=10°C | >55°C |
| 39 | Warm - High | Actively Heat | Cool, Bypass | Off | On[1] | On | 0-100% | Bypass Radiator | Closed | Closed | Closed[2] | <= 10°C | >5°C & <=10°C | <=55°C |
| 40 | Warm - High | Actively Heat | Cool, No Bypass | Off | On[1] | On | 0-100% | No Bypass | Closed | Closed | Closed[2] | <= 10°C | <= 5°C | >55°C |

Notes:
1. Airside PTC heater may only be commanded "on" if air temperature from cabin heat pump (heat exchanger) is below target outlet temperature
2. May be commanded "open" to demist/defog interior depending on outside ambient (glass) temperature and interior humidity.

FIG. 14D

ELECTRIC VEHICLE THERMAL MANAGEMENT SYSTEM WITH BATTERY HEAT STORAGE

This application claims the benefit of U.S. Provisional Patent Application No. 62/400,128 filed Sep. 27, 2016 entitled "Electric Vehicle Thermal Management System with Battery Heat Storage," the entire contents of which are incorporated herein by reference.

BACKGROUND

Field of the Disclosure

The present disclosure relates to vehicles such as electric vehicles including hybrid vehicles and more particularly to thermal management systems and methods for such vehicles.

Background Information

Electric vehicles including hybrid vehicles are of great interest for transportation applications and can provide benefits of low or zero emissions, quiet operation and reduced dependence upon fossil fuels. However, conventional electric vehicles that rely primarily or exclusively on battery power for power train and propulsion may suffer degradation in vehicle range when the vehicle is operated near extremes of ambient environmental temperatures, particularly at colder temperatures.

SUMMARY

The present inventor has observed a need for an enhanced thermal management system for electric vehicles that may mitigate degradation of the vehicle range due to extremes of environmental conditions. Exemplary approaches described herein may address such needs.

According to one example, an automotive electric vehicle system includes a high voltage battery system including an enclosure, an electric powertrain system, a radiator, coolant lines that permit coolant flow between the high voltage battery system, the power train system and the radiator, one or more valves for routing coolant along the coolant lines, and a controller configured to control the valves to facilitate the flow of coolant among a plurality of different, selectable coolant flow states involving the high voltage battery system, the powertrain system, and the radiator.

According to another example, a heat transfer system for an electric vehicle includes coolant lines that permit flow of coolant between a high voltage battery system, a power train system, and a radiator. The heat transfer system also includes one or more valves for routing coolant along the coolant lines and a controller configured to control the valves to facilitate the flow of coolant among a plurality of different, selectable coolant flow states involving the high voltage battery system, the powertrain system, and the radiator. The high voltage battery system is configured to serve as a source of heat for another vehicle system.

According to yet another example a method of controlling heat flow between systems of an electric automotive vehicle includes receiving, by at least one data processor, external data to the electric vehicle and sensor data from one or more sensors of the electric vehicle. The electric vehicle includes a high voltage battery system, a powertrain system, and a radiator. A coolant flow state is determined from a plurality of different, selectable coolant flow states involving the high voltage battery system, the powertrain system, and the radiator. Output is provided to a controller to facilitate control of the coolant flow state.

BRIEF DESCRIPTION OF THE FIGURES

FIG. 3 illustrates a legend for the diagrams of FIGS. 1 and 2.

FIG. 4A illustrates an exemplary valve arrangement comprising two 3-way valves for use in a thermal management system of an electric vehicle according to an example of the disclosure.

FIG. 4B illustrates an exemplary state table for the exemplary valve arrangement of FIG. 4A.

FIG. 4C illustrates an exemplary valve arrangement comprising a 5-way valve for use in a thermal management system of an electric vehicle according to an example of the disclosure.

FIG. 4D illustrates an exemplary state table for the exemplary valve arrangement of FIG. 4C.

FIGS. 14A-14D depicts operational guidelines or conditions for how the exemplary coolant flow states and refrigerant flow states may be invoked by the controller depending upon desired actions for the electric vehicle.

DETAILED DESCRIPTION OF EXEMPLARY EMBODIMENTS

As described in examples herein, increased performance and/or increased efficiency of an electric vehicle can be achieved by using a battery assembly of the electric vehicle as a thermal heat store and with which heat may be exchanged with other vehicle systems, such as a cabin climate control system. This differs from a conventional approach in which air may be used as a heat source, such as in a reverse cycle heat pump (with reversing valves and check valves). Taking heat from within the electric vehicle as opposed to relying exclusively on outside air and/or electrical cabin hearing from a stored battery charge can increase performance and/or efficiency of the electric vehicle. Of course, the examples described herein may still also utilize outside air as a heat source or heat sink. Additionally, preheating a battery assembly of an electric vehicle using wall power and/or a battery heater to bring the battery assembly to a maximum allowable temperature while in cold climates can provide for additional stored heat and can reduce the need for relying on the electrical charge of the battery to provide cabin heating.

Figure 1:
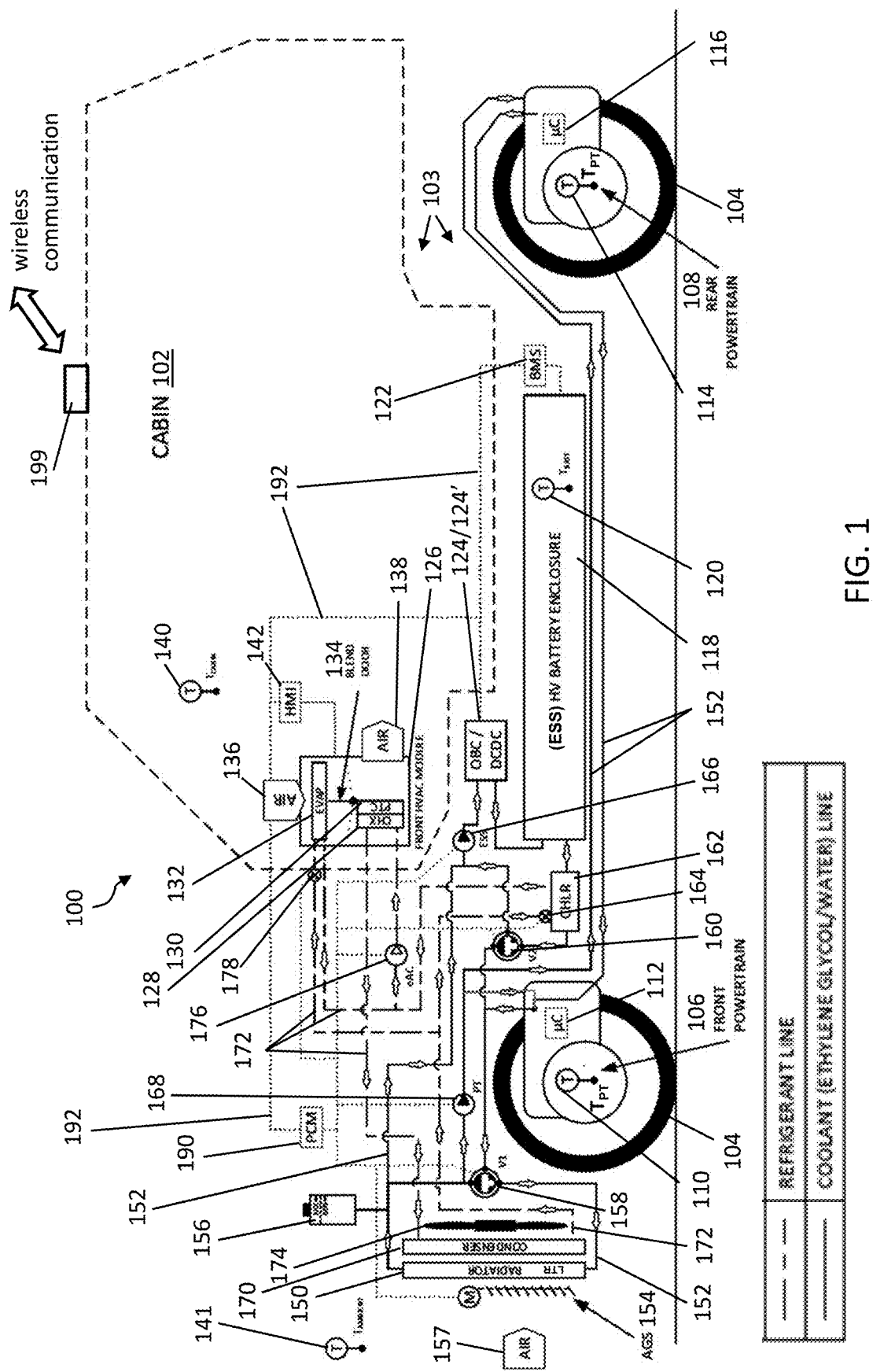
FIG. 1 is a schematic diagram of an exemplary thermal management system for an electric vehicle illustrated in side view according to an example of the disclosure.

FIG. 1 is a schematic diagram of an exemplary thermal management system for an electric vehicle illustrated in side view according to an example of the disclosure. As shown in FIG. 1, an electric vehicle 100 includes a cabin 102, a chassis/body 103, wheels 104, a front powertrain 106, a rear powertrain 108, a front powertrain temperature sensor 110, a rear powertrain temperature sensor 114, a front powertrain microcontroller 112 and a rear powertrain microcontroller 116 (the microcontrollers comprising suitable computer processors and associated memory and circuitry), a high-voltage (HV) battery assembly 118 including an enclosure, the high-voltage battery assembly serving as an energy storage system as well as a battery for vehicle propulsion, and a high-voltage battery assembly temperature sensor 120. The electric vehicle 100 also includes a battery management system 122, an onboard charger 124 and a direct current to direct current (DC/DC) converter 124', which provide suitable circuitry for charging the high-voltage battery, monitoring the state of charge and operation of the high-voltage battery, and for providing the appropriate voltage level to onboard electronic systems.

As shown in FIG. 1, the electric vehicle 100 also includes an air conditioning system for providing environmental control for the cabin 102, including a front Heating, Ventilation, and Air Conditioning (HVAC) module 126, a cabin heat exchanger (heat pump) 128, a positive temperature coefficient heater 130, and air-conditioning (A/C) evaporator 132, and a blend door 134 that provides for blending and air mixture. In this way, input air 136 is conditioned by the front HVAC module so as to generate output error 138 of a desired quality for the occupants of the cabin 102. The cabin 102 also includes a cabin temperature sensor 140 and a human machine interface (HMI) 142 at which an occupant may select the desired level of heating and/or air-conditioning.

The vehicle also includes a cooling system that includes a radiator 150 (each may also be referred to as a low temperature radiator-LTR), cooling lines 152, an active grill shutter (AGS) 154 positioned in front of the radiator and controlled by a motor M or other suitable actuator, and a coolant reservoir 156. The coolant may be any suitable coolant such as conventional ethylene glycol/water mixture, and the refrigerant may be any suitable convention refrigerant. Air 157 may pass through the AGS 154 through the radiator 150 and a condenser 170 of a refrigerant system described below. The cooling lines 152 may be made of any suitable material such as copper tubing, stainless steel tubing, aluminum tubing, flexible polymer/rubber tubing, tubing of other materials, and any suitable combinations thereof. As illustrated in FIG. 1, the cooling lines connect the radiator 150, the onboard charger 124, the DC/DC converter 124', the high-voltage battery assembly 118, the front and rear powertrains 106 and 108 (of which there may be four, one for each wheel), a coolant-refrigerant heat exchanger 162 (which may also be referred to as a chiller-CHLR), and valves V1 158 and V2 160. The heat exchanger 162 has associated with it an expansion valve 164 of a refrigerant system described below, which may be a thermal expansion valve (TXV) with a solenoid, or an electronic expansion valve (EXV). The cooling system also includes an electric water pump 166 for the high-voltage battery assembly 118 and an electric water pump 168 for the powertrain system 106 and 108.

The vehicle 100 also includes a refrigeration system including a condenser 170, refrigerant lines 172, a fan 174, an electric A/C compressor (EAC) 176, and expansion valve 178, which may be a thermal expansion valve with a solenoid or an electronic expansion valve. The vehicle 100 also includes a powertrain control module (PCM) 190, which comprises one or more interfaces for receiving signals such as from temperature sensors 110, 114, 120, 140, 141 and a wireless transceiver 199 that communicates with a remote processing/monitoring system that monitors and communicates with the vehicle 100, one or more computer processors that processes signals onboard, and one or more interfaces that send control signals to various components of the vehicle 100 via electric control lines 192. Though not shown, other types of sensors may be provided such as refrigerant pressure sensors, cabin humidity sensors, voltage and current sensors for various electrical components including the high voltage battery, on-board charger, DC-DC converter, and the like. These and other sensors may provide signal inputs to the controller 190 and processed for decision making by the controller 190. These components to which signals may be sent from the PCM 190 include valves 158 and 160, pumps 166 and 168, microcontrollers 112 and 116, expansion valves 164 and 178, electric AC compressor 176, positive temperature coefficient heater 130, blend door 134, HMI 142, fan 172, and other components as may be suitable.

Figure 2:
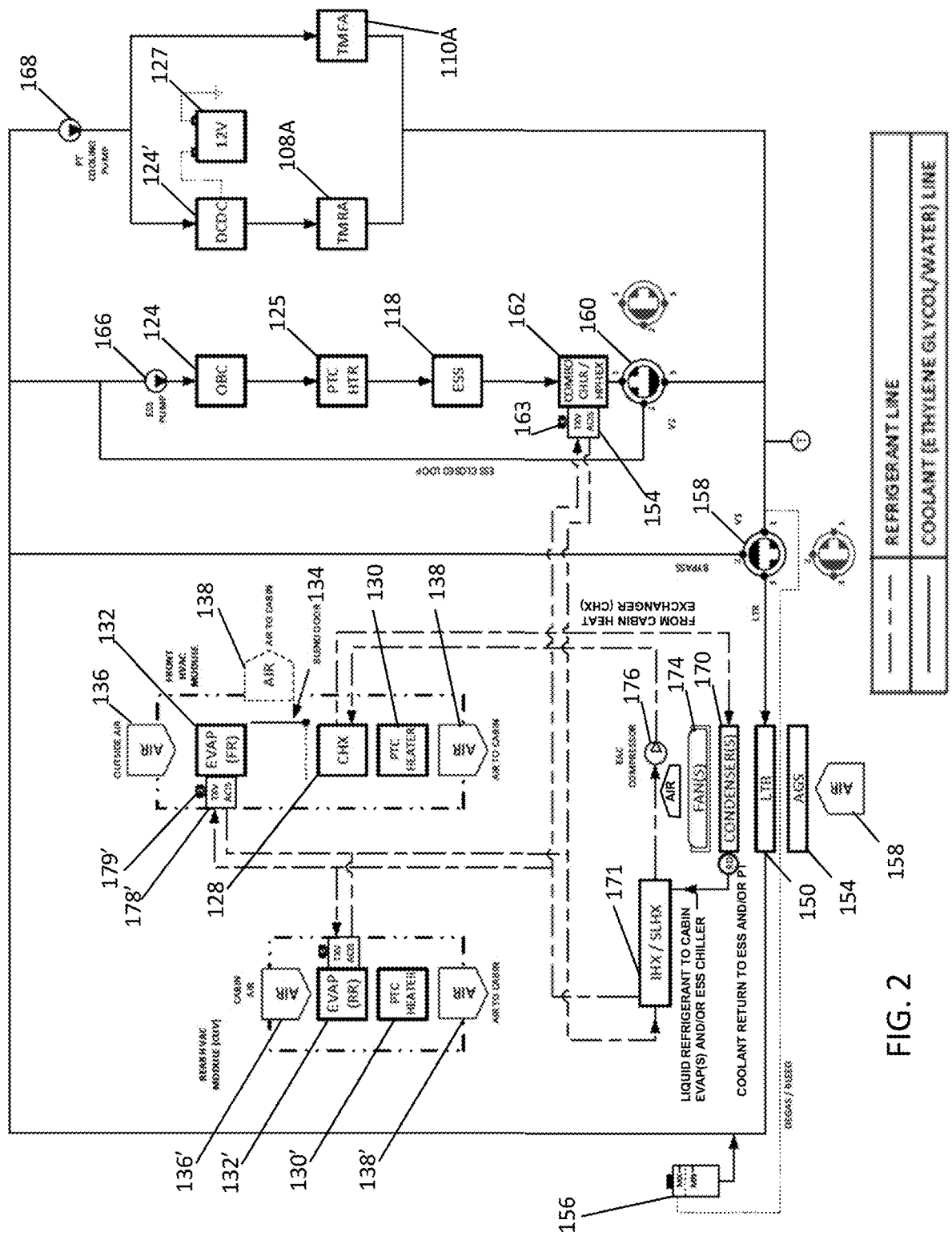
FIG. 2 is a block diagram of an exemplary thermal management system for an electric vehicle according to an example of the disclosure.

FIG. 2 is a block diagram of an exemplary thermal management system for an electric vehicle according to an example of the disclosure. FIG. 2 presents many of the same components illustrated in FIG. 1, which are shown using the same reference numbers, descriptions of which were provided above. FIG. 2 additionally shows that the vehicle 100 may include a rear HVAC module that includes an AC evaporator 132', a positive temperature coefficient heater 130', an expansion valve with an AC isolation solenoid 178', and a solenoid 179' which can condition input air 136' so as to provide output air 138' of desired heat or air conditioning for rear cabin occupants. Also as shown in FIG. 2 the high-voltage battery assembly may include a positive temperature coefficient heater 125. The powertrain system may also include a battery 127, a traction motor front axle including an inverter 108A, and a traction motor rear axle including an inverter 110A. As shown in FIG. 2 the refrigerant system may also include an internal heat exchanger/suction line heat exchanger (IHX/SLHX) 171.

FIG. 3 illustrates a reference legend for the diagrams of FIGS. 1 and 2 for ease of reference.

As noted above, the cooling system for the electric vehicle 100 may include, in some examples, valves V1 158 and V2 160. FIG. 4A illustrates an exemplary valve arrangement comprising two 3-way valves for use in a thermal management system of an electric vehicle according to an example of the disclosure in such an embodiment. As shown in FIG. 4A, valve V1 158 includes 3 ports, one which aligns with the cooling line from the powertrain, one which aligns with the radiator (LTR) 150, and one which provides for bypassing the radiator 150. Valve V2 160 also includes 3 ports, one of which aligns with the cooling line from the powertrain, one of which is aligned with the cooling line to the place coolant circulation in a closed loop for the high-voltage battery assembly (as an energy storage system-ESS), and another which aligns with another cooling line to the high-voltage battery assembly 118 via certain components. FIG. 4B illustrates a logic table for the two valves V1 158 and V2 160 that provide for four primary cooling States 1-4, to be described in detail further below. As illustrated in FIG. 4B, each state has corresponding valve positions. For example, in State 1, port 1 of V1 158 is aligned with the cooling line from the power train and port 2 of V1 158 is aligned with bypassing the radiator (LTR) 150, Also in State 1, port 1 of V2 160 is aligned with another cooling line to the high-voltage battery assembly (ESS) 118 via certain components and port 2 of V2 160 is aligned with the cooling line to place coolant circulation in a closed loop for the high-voltage battery assembly (ESS CLOSED LOOP). Corresponding to State 2, as illustrated in FIG. 4B, port 1 of V1 158 is aligned with the cooling line from the power train and port 2 of V1 158 is aligned with the radiator (LTR) 150. Also in State 2, port 1 of V2 160 is aligned with another cooling line to the high-voltage battery assembly (ESS) 118 via certain components and port 2 of V2 160 is aligned with the cooling line to place coolant circulation in a closed loop for the high-voltage battery assembly (ESS CLOSED LOOP). With respect to State 3, as illustrated in FIG. 4B, similar to State 1, port 1 of V1 158 is aligned with the cooling line from the power train and port 2 of V1 158 is aligned with bypassing the radiator (LTR) 150. Also in State 3, port 1 of V2 160 is aligned with another cooling line to the high-voltage battery assembly (ESS) 118 via certain components and port 2 of V2 160 is aligned with the cooling line from the power train. As illustrated in FIG. 4B, in State 4, port 1 of V1 158 is aligned with the cooling line from the power train and port 2 of V1 158 is aligned with the radiator (LTR) 150. Also in State 4, similar to State 3, port 1 of V2 160 is aligned with another cooling line to the high-voltage battery assembly (ESS) 118 via certain components and port 2 of V2 160 is aligned with the cooling line from the power train.

The four primary cooling states may also be achieved using a single 5-way valve body illustrated schematically in FIG. 4C (instead of two 3-way valves as previously described) which has five associated ports: port 1 from the high-voltage battery assembly 118 (ESS), port 2 from the powertrain, port 3 aligned for closed-loop circulation at the high-voltage battery assembly 118 (ESS CLOSED-LOOP), port 4 bypassing the radiator 150 (LTR) and port 5 directed to the radiator 150 (LTR). FIG. 4C shows schematically the connections between the various ports responsible for the four primary states. FIG. 4D illustrates a logic table for the single 5-way valve that provides for the four primary cooling States 1-4 of FIG. 4C. For example, as illustrated in FIG. 4D, corresponding to State 1, port 1 can be internally coupled to port 3 such that the high-voltage battery assembly 118 (ESS) is aligned with closed loop circulation at the high-voltage battery assembly 118 (ESS CLOSED-LOOP), port 2 can be internally coupled with port 4 such that the bypass of the radiator 150 (LTR) is aligned with the cooling line of the powertrain, and port 5 has no internal connections. As illustrated in FIG. 4D, for State 2 of FIG. 4C, port 1 can be internally coupled to port 3 such that the high-voltage battery assembly 118 (ESS) is aligned with closed loop circulation at the high-voltage battery assembly 118 (ESS CLOSED-LOOP), port 2 can be internally coupled to port 5 such that the high-voltage battery assembly 118 is aligned with the radiator 150 (LTR), and port 4 has no internal connections. For State 3 of FIG. 4C, as illustrated in FIG. 4D, port 1 can be internally coupled to both port 2 and port 4 such that the combination of the cooling line of the powertrain and the high-voltage battery assembly 118 are aligned with the bypass of radiator 150 and port 3 and port 5 have no internal connections. FIG. 4D also illustrates State 5 of FIG. 4C, where port 1 and port 2 are internally coupled with port 4 such that the combination of the cooling line of the powertrain and the high-voltage battery assembly 118 are aligned with the radiator 150 (LTR) and port 3 and port 4 have no internal connections.

Figure 5A:
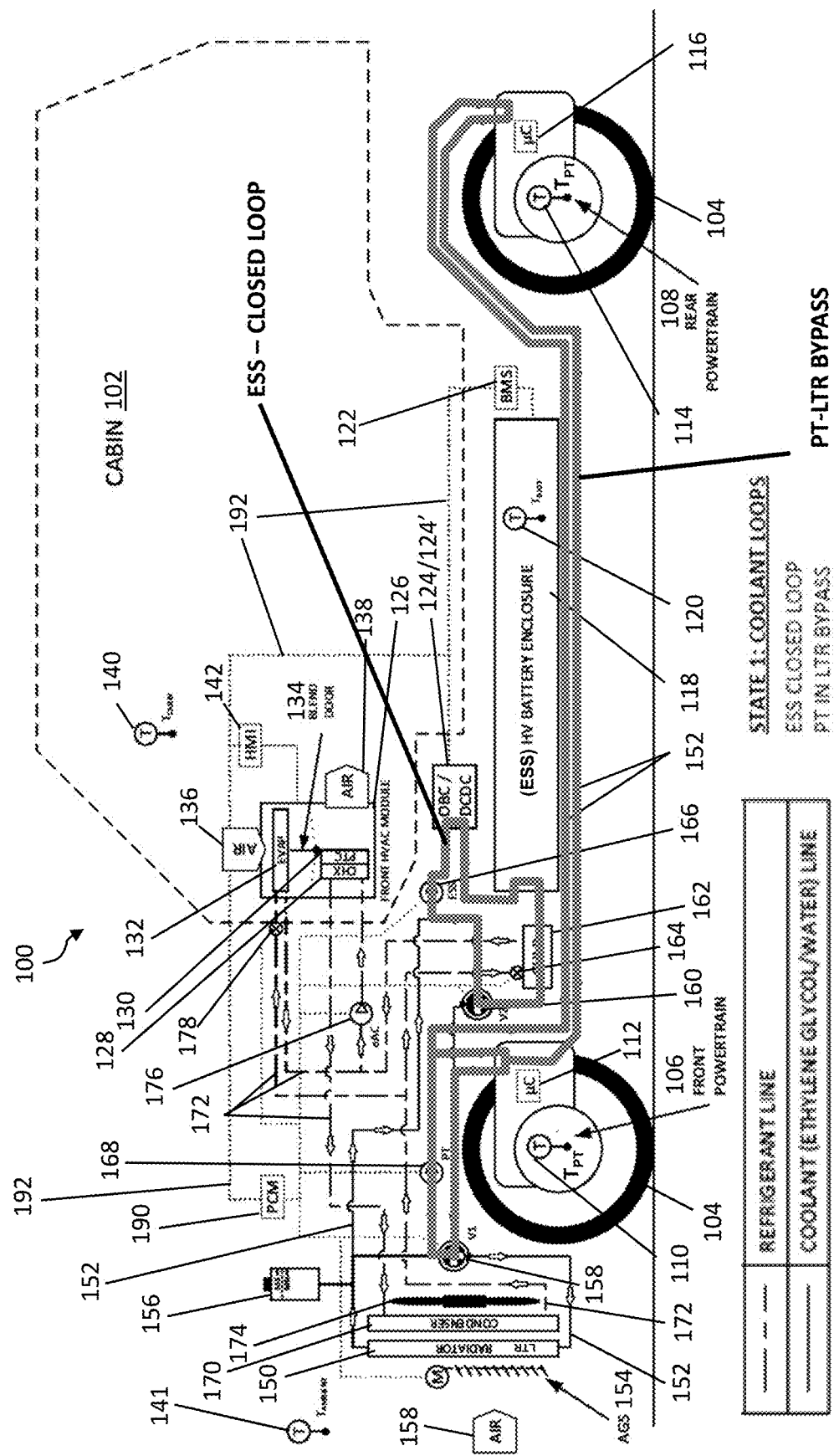
FIG. 5A is a schematic diagram illustrating exemplary coolant flow in a first state of an exemplary thermal management system for an electric vehicle in side view according to an example of the disclosure.
Figure 5B:
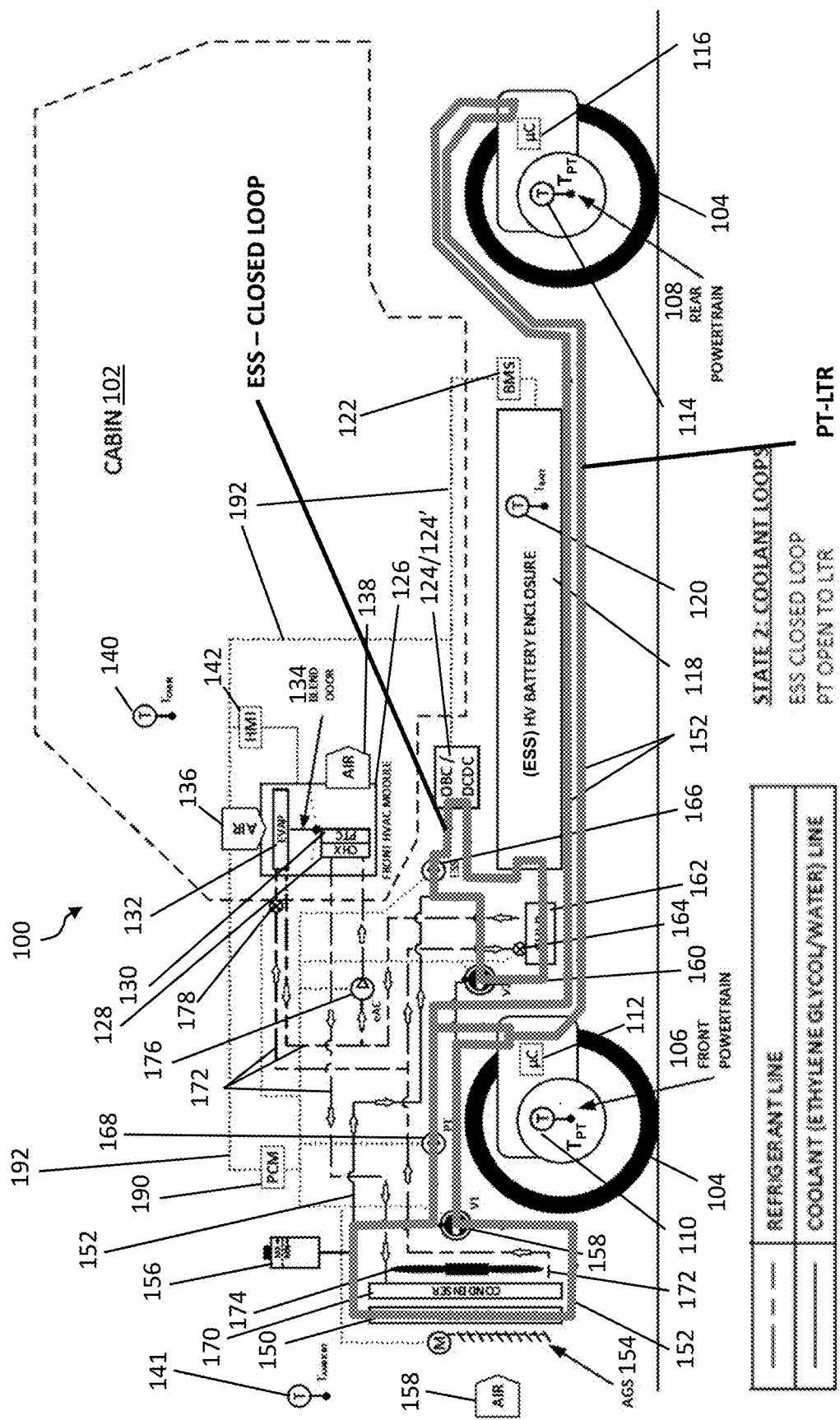
FIG. 5B is a schematic diagram illustrating exemplary coolant flow in a second state of an exemplary thermal management system for an electric vehicle in side view according to an example of the disclosure.
Figure 5C:
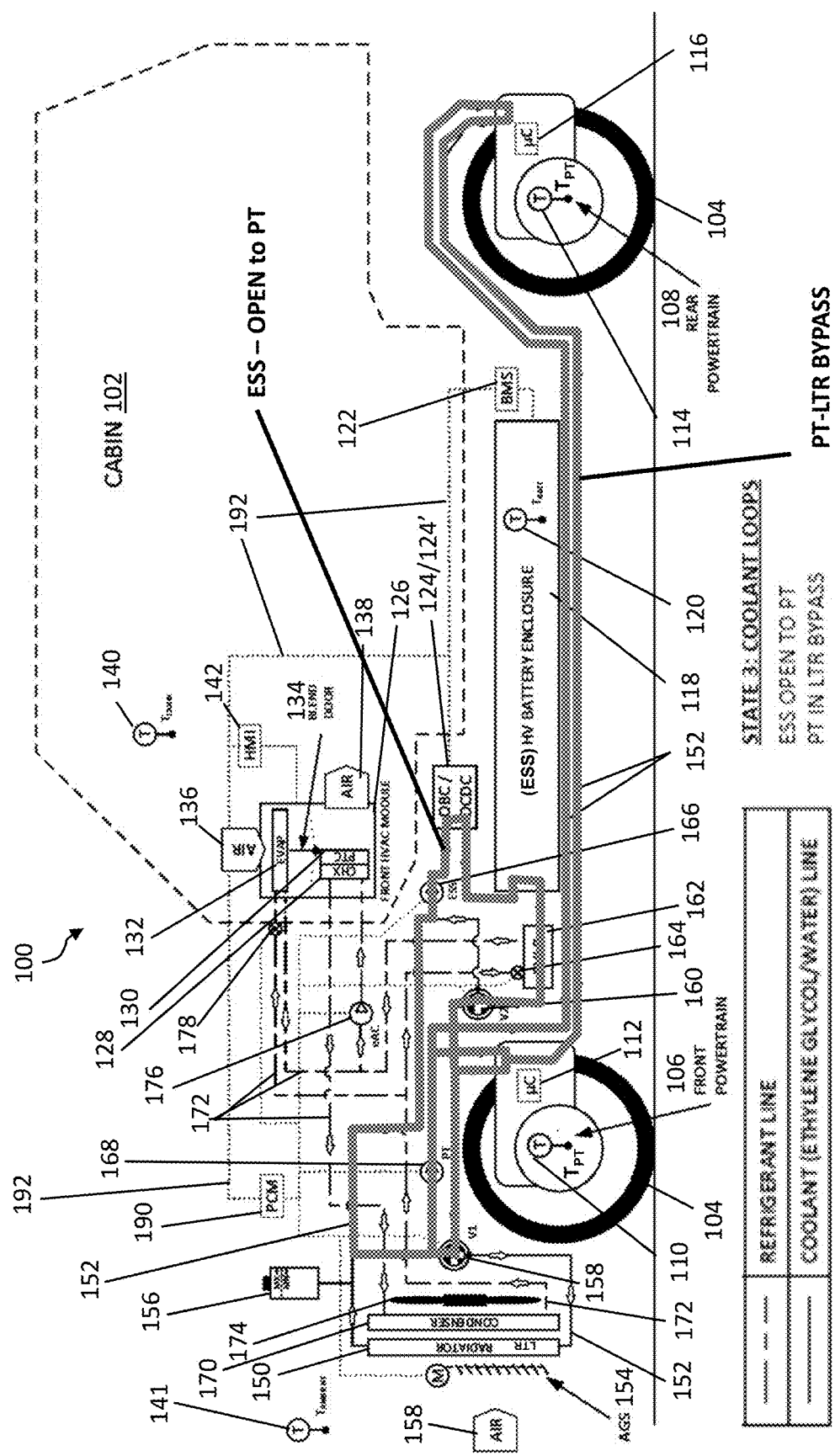
FIG. 5C is a schematic diagram illustrating exemplary coolant flow in a third state of an exemplary thermal management system for an electric vehicle according to an example of the disclosure.
Figure 5D:
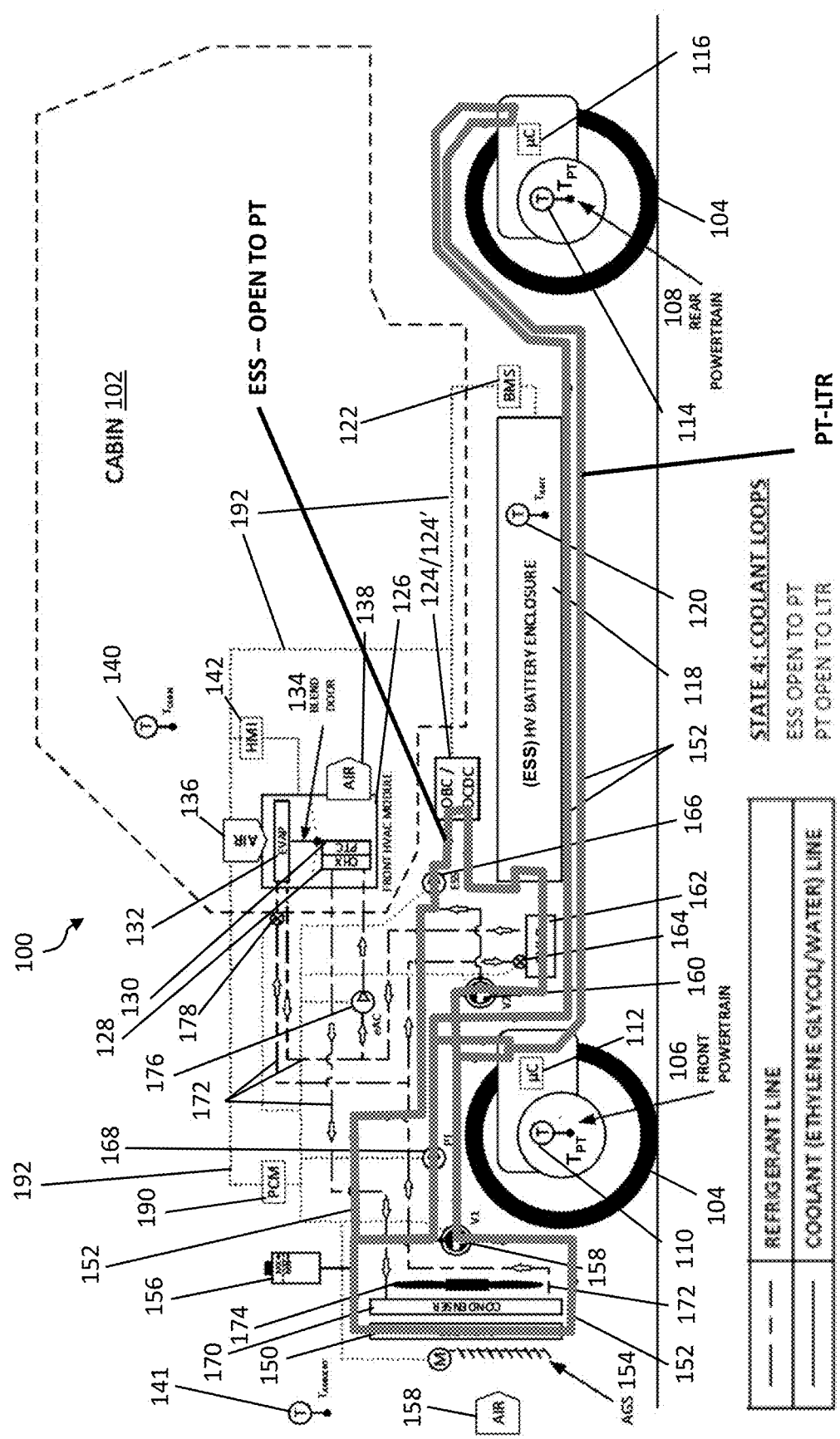
FIG. 5D is a schematic diagram illustrating exemplary coolant flow in a fourth state of an exemplary thermal management system for an electric vehicle in side view according to an example of the disclosure.

FIGS. 5A-5D illustrate schematically four exemplary primary states of an exemplary thermal management system for the electric vehicle 100 according to examples of the disclosure. As shown in FIG. 5A, in a first primary state, there are two distinct loops for coolant flow based on the position of valves V1 158 and V2 160. These loops are labeled ESS-CLOSED LOOP and PT-LTR (power train-low temperature radiator). For the first loop, coolant passes through the high-voltage battery assembly 118, through chiller 162 through valve V2 160, through pump 166 and through onboard charger/DC/DC converter 124/124'. For the second loop, coolant passes through the front and rear powertrains 106 and 108, through valve V1 158, and through pump 168. Different positions of valves V1 158 and V2 160 lead to different states of coolant flow based on the various valve positions discussed in detail in FIGS. 4A-4D. As shown in FIG. 5B, in a second primary state of coolant flow, coolant flowing through the high-voltage battery 118 does so according to the highlighted ESS-CLOSED LOOP, and coolant passing through the powertrain is directed by valve V1 158 through radiator 150 in a configuration labeled PT-LTR. As shown in FIG. 5C, in a third primary state of coolant flow, coolant flowing through the high-voltage battery assembly 118 is open to the powertrain via valve V2 160 as shown by the labeling ESS-OPEN TO PT, and coolant passing through the powertrain bypasses the radiator 150 by virtue of valve V1 158. As shown in FIG. 5D, a fourth primary state of coolant flow, coolant flowing through the high-voltage battery assembly 118 is open to the powertrain via valve V2 160 as shown by the labeling ESS-OPEN TO PT, and coolant passing through the powertrain is directed by valve V1 158 through radiator 150 in a configuration labeled PT-LTR.

Figure 6A:
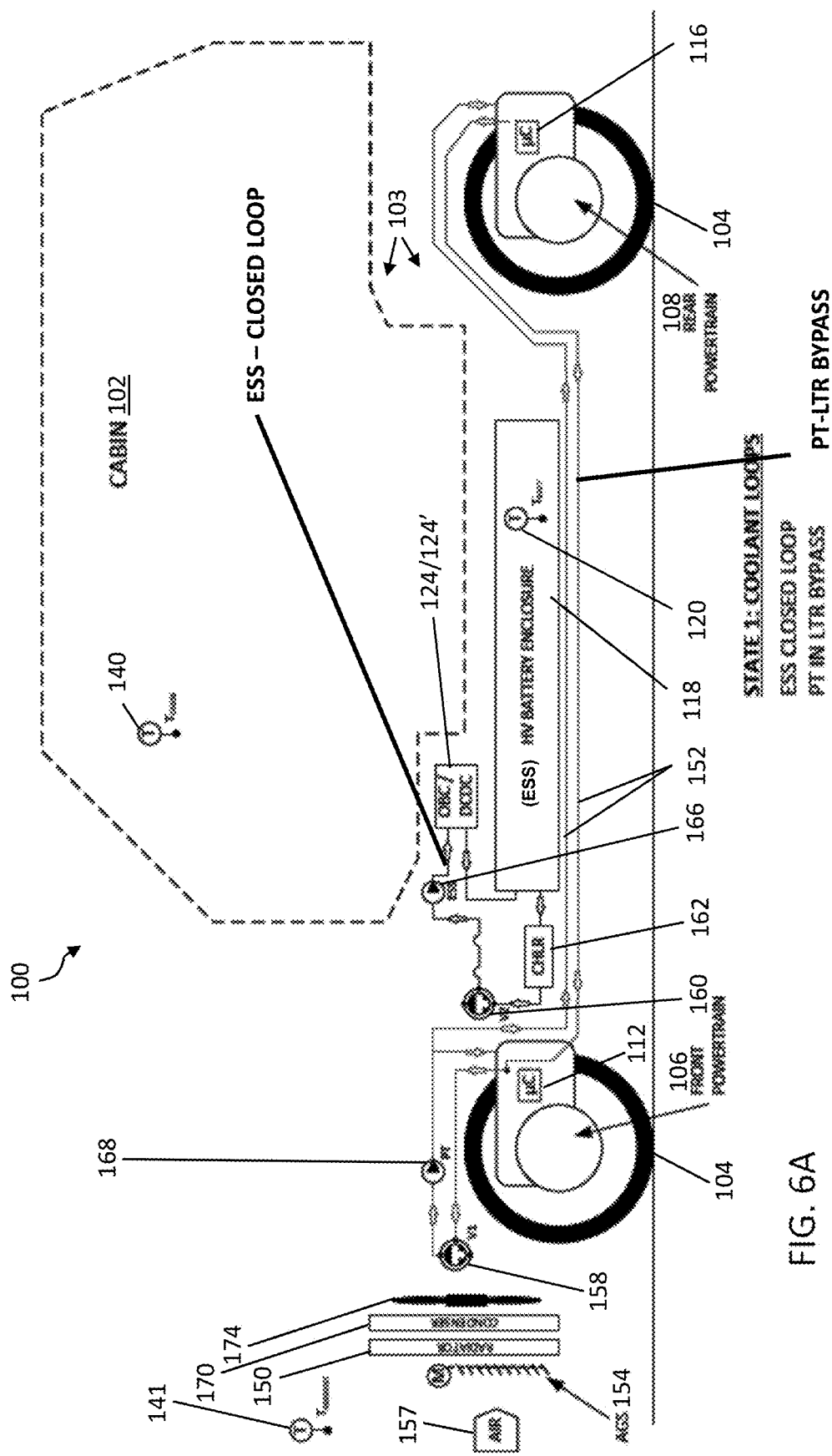
FIGS. 6A-6D are schematic diagrams that correspond to FIGS. 5A-5D, respectively, and that more sparsely illustrate exemplary coolant flow in first through fourth states, respectively, of an exemplary thermal management system for an electric vehicle in side view according to examples of the disclosure.
Figure 6B:
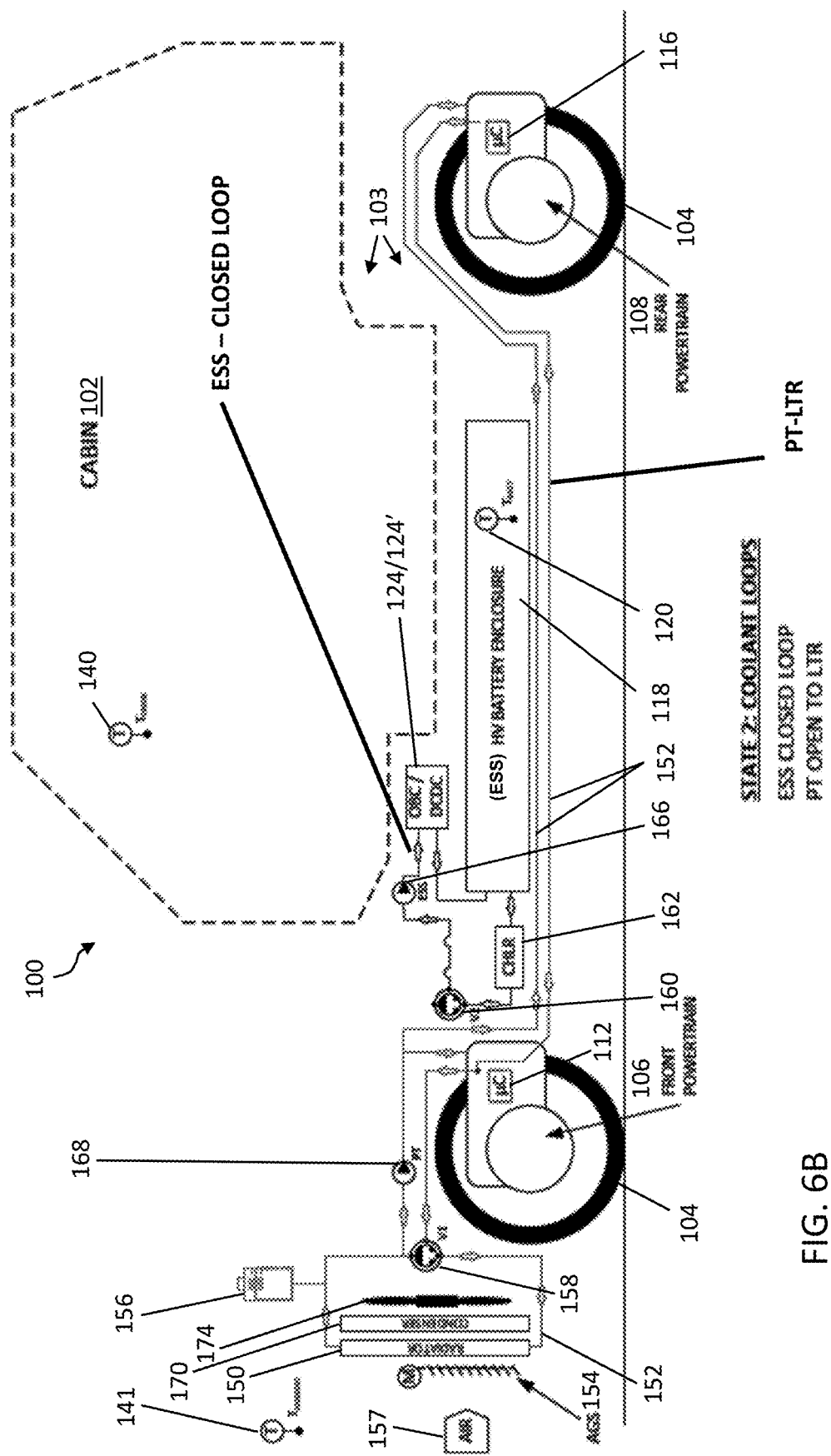
Figure 6C:
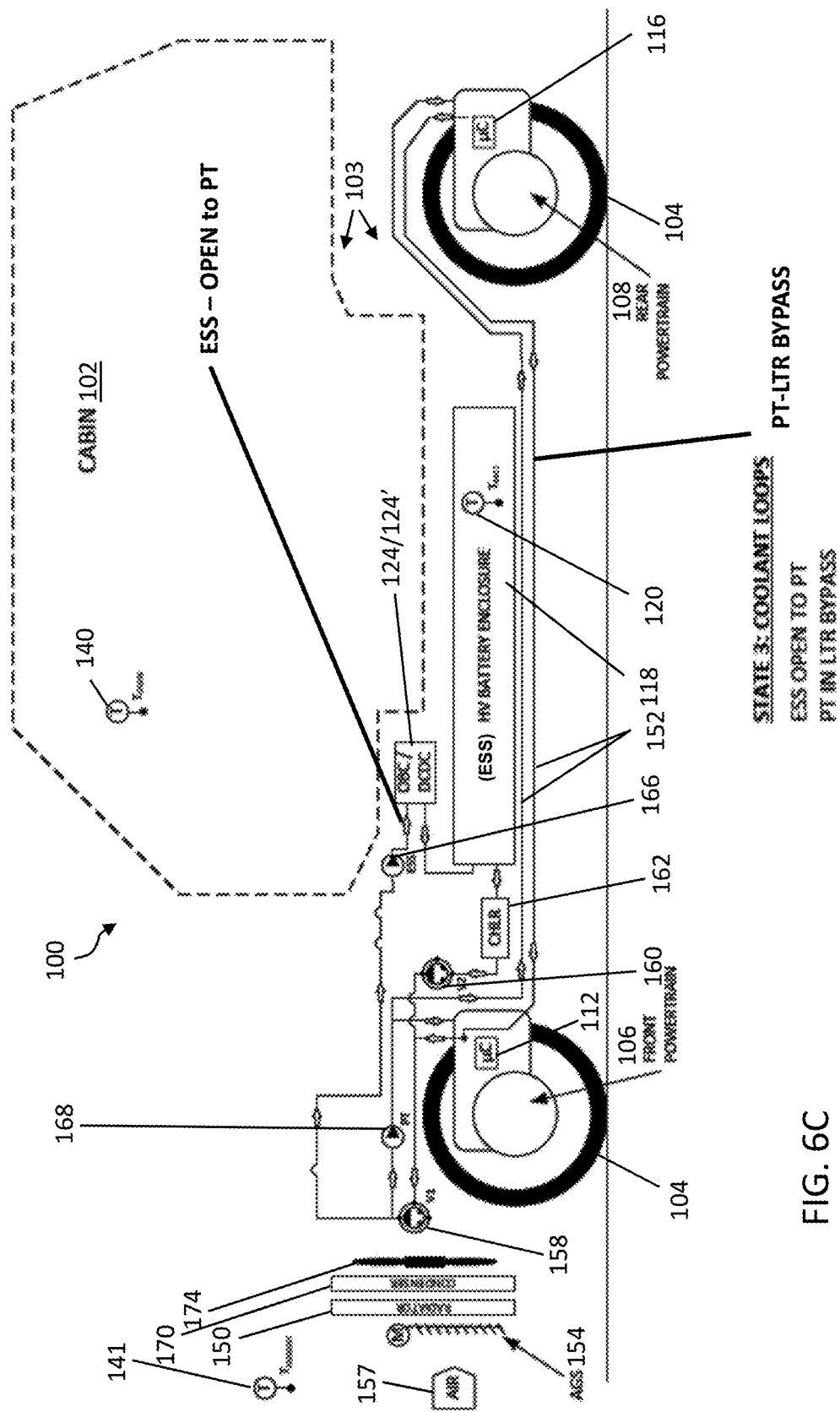
Figure 6D:
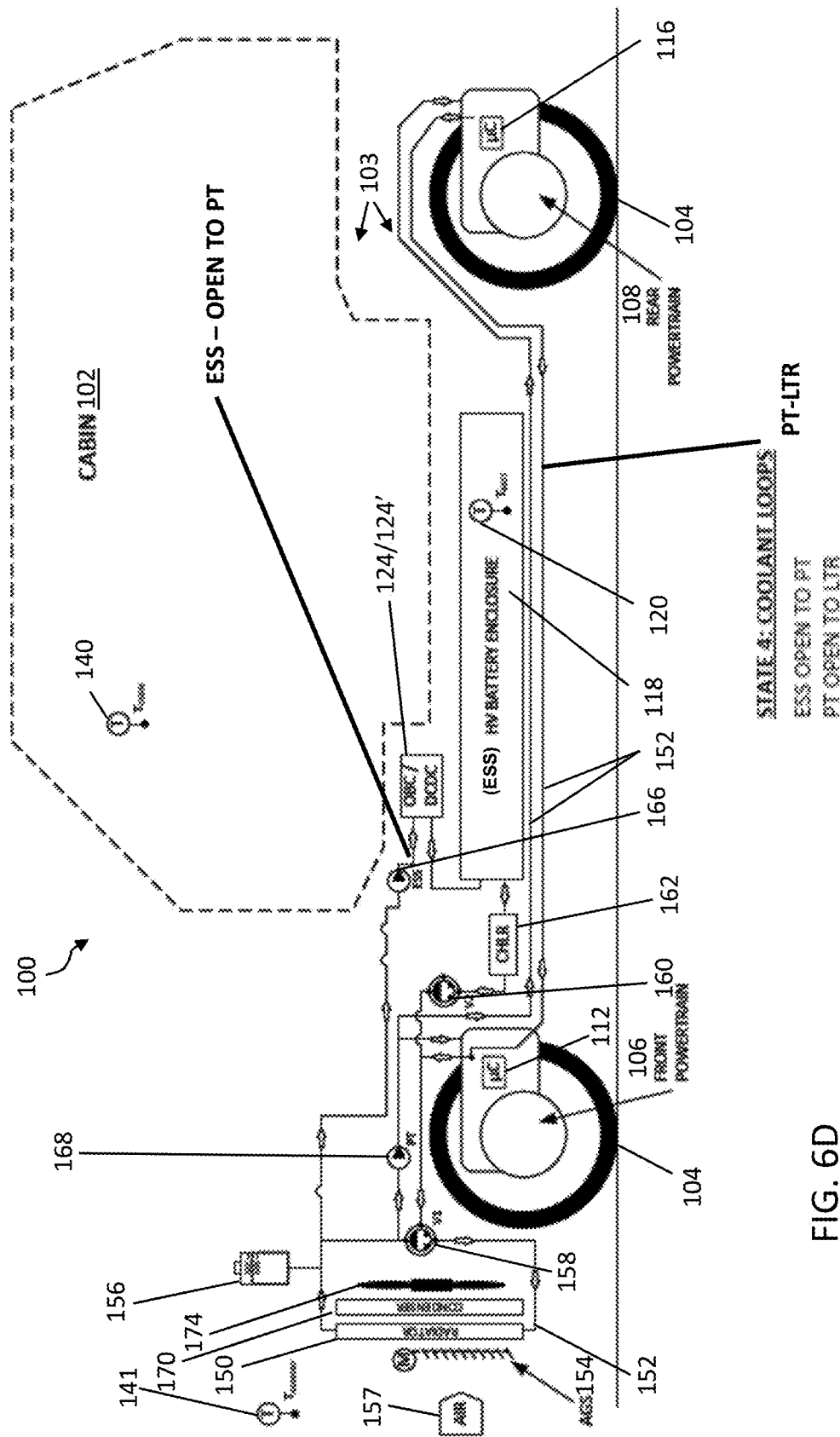

FIGS. 6A-6D are schematic diagrams that correspond to FIGS. 5A-5D, respectively, which more sparsely illustrate exemplary coolant flow in first through fourth states, respectively, of an exemplary thermal management system for an electric vehicle in side view according to examples of the disclosure. As shown in FIG. 6A, in a first primary state as previously described above with reference to FIG. 5A, there are two distinct loops for coolant flow based on the position of valves V1 158 and V2 160. These loops are labeled ESS-CLOSED LOOP and PT-LTR (power train-low temperature radiator). For the first loop, coolant passes through the high-voltage battery assembly 118, through chiller 162 through valve V2 160, through pump 166 and through onboard charger/DC/DC converter 124/124'. For the second loop, coolant passes through the front and rear powertrains 106 and 108, through valve V1 158, and through pump 168. Different positions of valves V1 158 and V2 160 lead to different states of coolant flow based on the various valve positions discussed in detail in FIGS. 4A-4D. FIG. 6B illustrates, as previously described above with reference to FIG. 5B, in a second primary state of coolant flow, coolant flowing through the high-voltage battery 118 does so according to the highlighted ESS-CLOSED LOOP, and coolant passing through the powertrain is directed by valve V1 158 through radiator 150 in a configuration labeled PT-LTR. As illustrated in FIG. 6C, corresponding to the previous description of FIG. 5C, in a third primary state of coolant flow, coolant flowing through the high-voltage battery assembly 118 is open to the powertrain via valve V2 160 as shown by the labeling ESS-OPEN TO PT, and coolant passing through the powertrain bypasses the radiator 150 by virtue of valve V1 158. FIG. 6D, as previously described above with reference to FIG. 5D, illustrates a fourth primary state of coolant flow, coolant flowing through the high-voltage battery assembly 118 is open to the powertrain via valve V2 160 as shown by the labeling ESS-OPEN TO PT, and coolant passing through the powertrain is directed by valve V1 158 through radiator 150 in a configuration labeled PT-LTR.

Figure 7A:
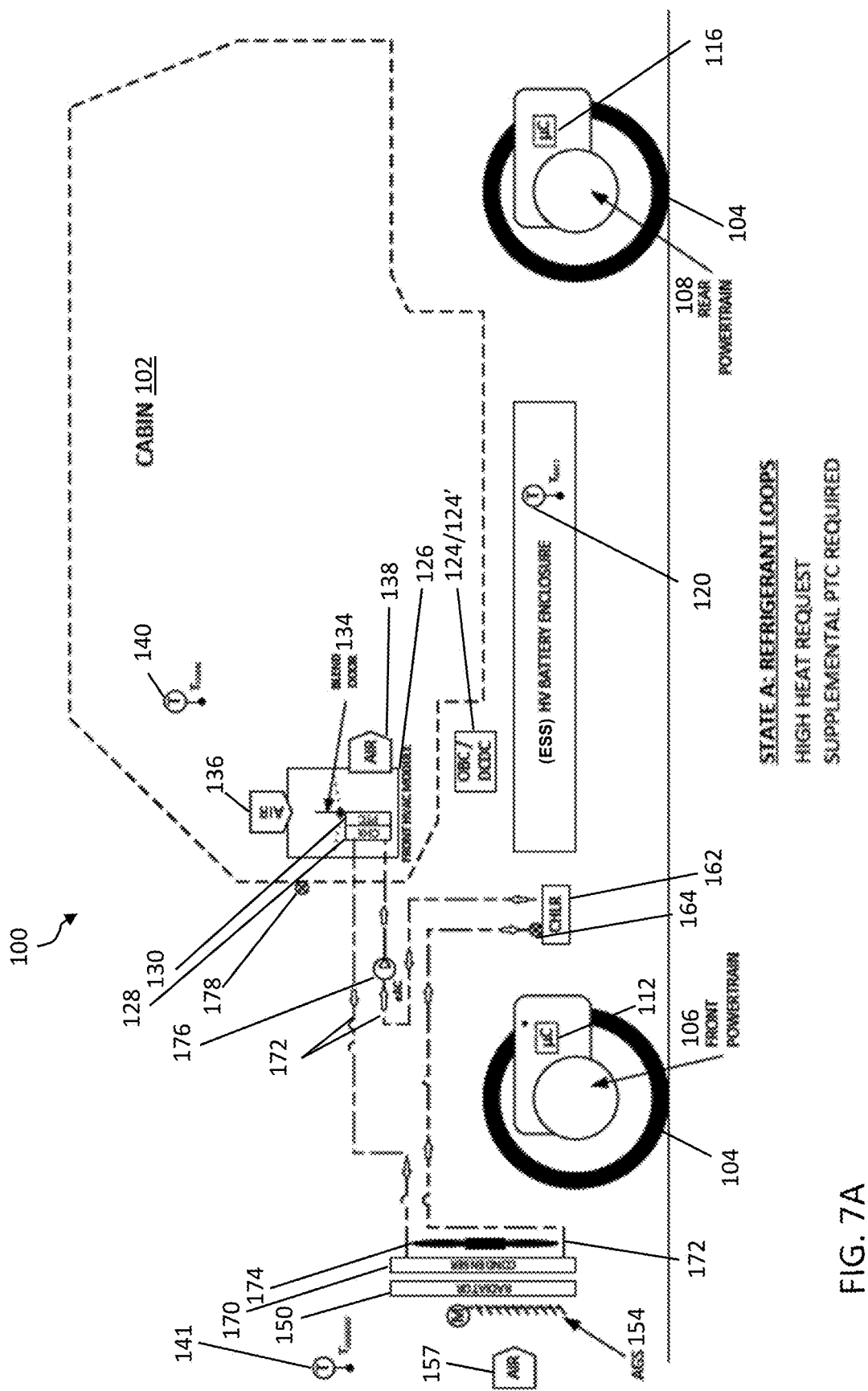
FIGS. 7A-7G are schematic diagrams illustrating refrigerant flow for seven exemplary refrigerant flow states (State A-State G) according to examples of the disclosure.

FIGS. 7A-7G are schematic diagrams illustrating refrigerant flow for seven exemplary refrigerant flow states (State A-State G) according to examples of the disclosure. FIG. 7A illustrates a refrigerant flow state suitable for a high heat request, and supplemental heating via a PTC heater is required. For example, refrigerant can flow along refrigerant lines 172 from condenser 170 through expansion valve 164 into coolant-refrigerant heat exchanger 162 (CHLR), subsequently through electric A/C compressor 176 into cabin heat exchanger (heat pump) 128 that can be modified via positive temperature coefficient heater 130, and back to condenser 170.

Figure 7B:
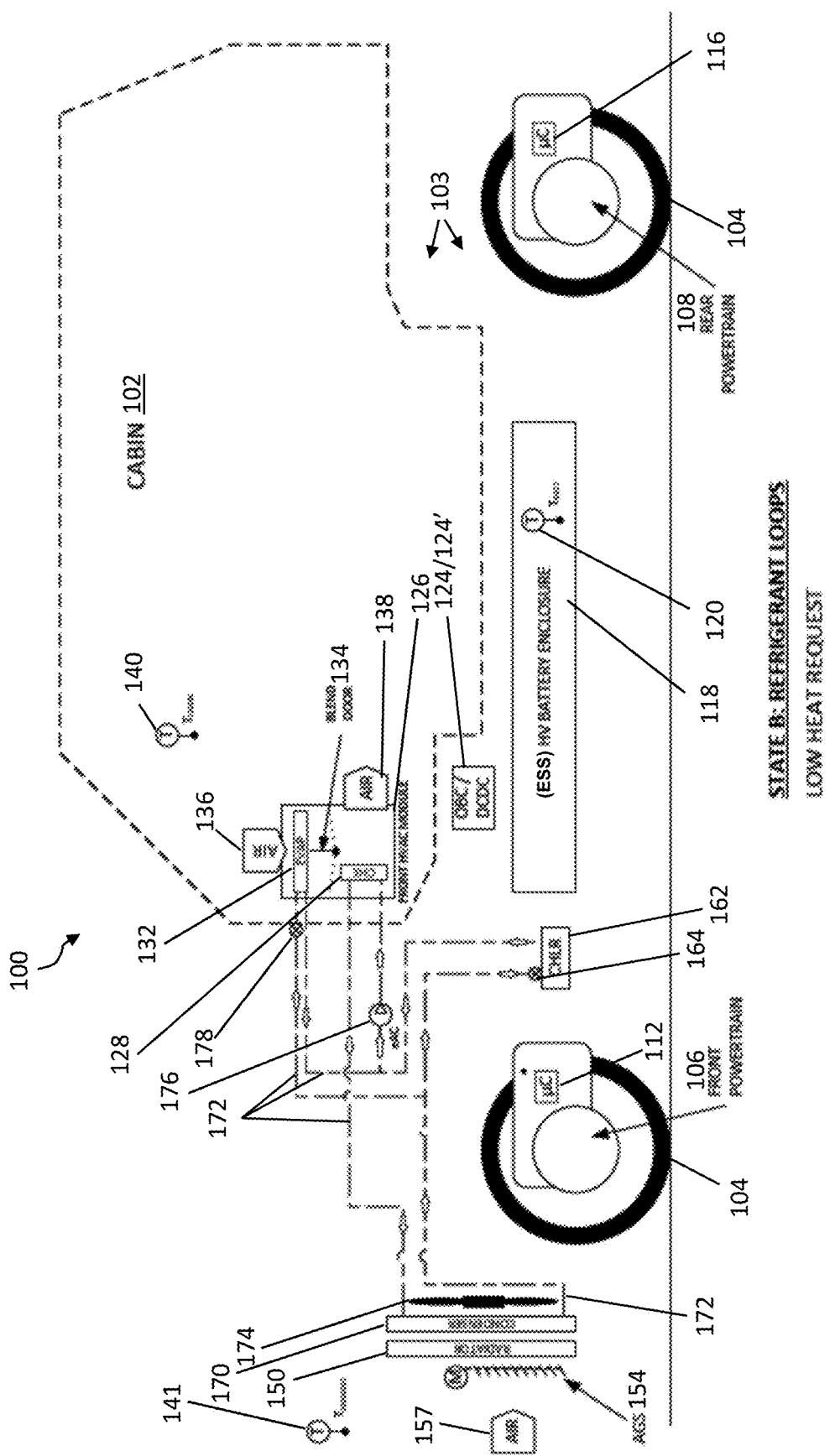

FIG. 7B illustrates a refrigerant flow state suitable for a low heat request and for which no supplemental heating from a PTC heater is required. For example, along one loop, refrigerant can flow along refrigerant lines 172 from condenser 170 through expansion valve 164 through coolant heat exchanger 162 (CHLR) through electric A/C compressor 176 into cabin heat exchanger (heat pump) 128 and from cabin heat exchanger (heat pump) 128 back to condenser 170. Additionally, following another loop refrigerant can also flow along refrigerant lines 172 from condenser 170 through expansion valve 178 into A/C evaporator 132, from A/C evaporator 132 through electric A/C compressor 176 into cabin heat exchanger (heat pump) 128 and subsequently back to condenser 170.

Figure 7C:
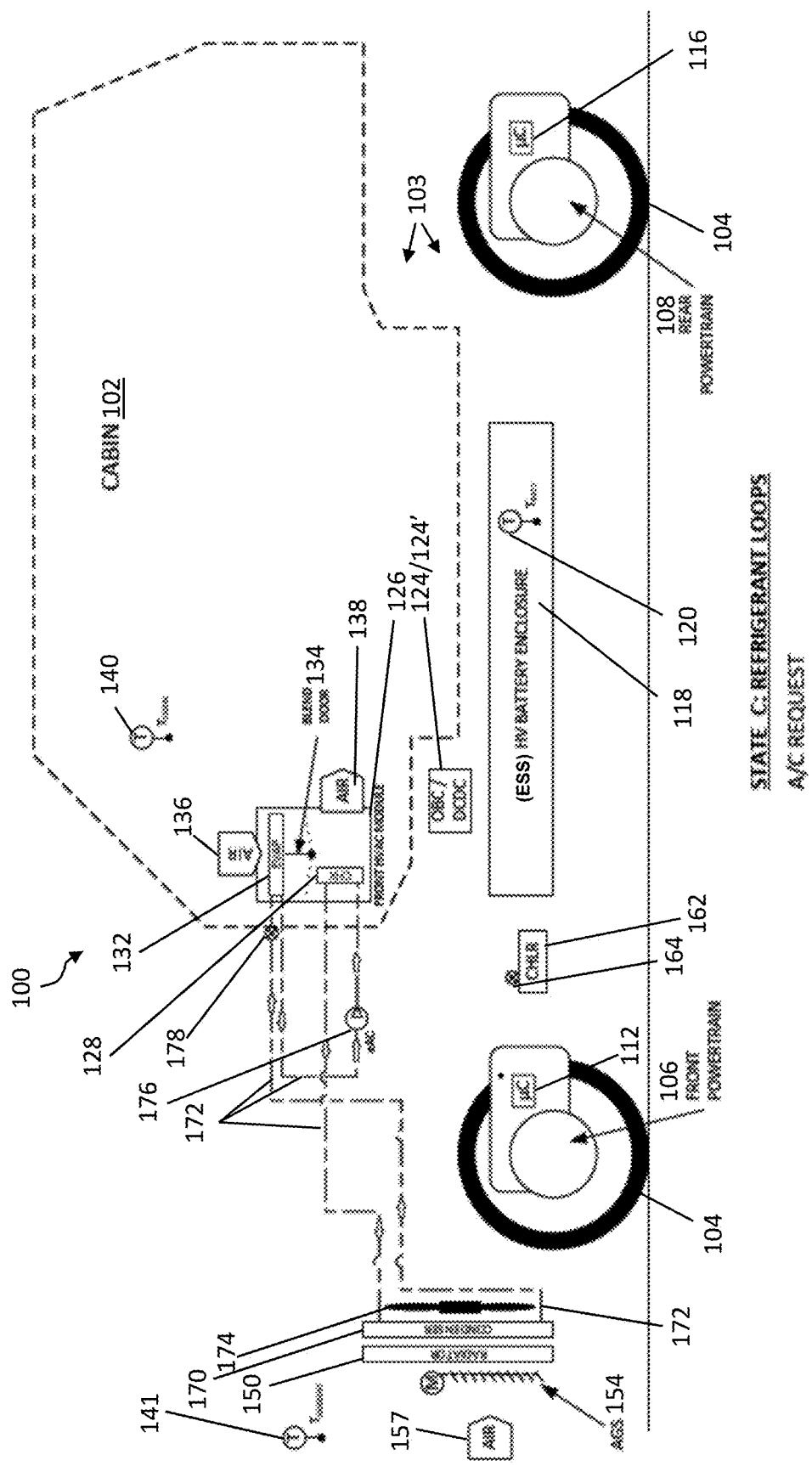

FIG. 7C illustrates a refrigerant flow state suitable where there is an A/C request, e.g., from cabin 102. Along one loop, refrigerant can flow from condenser 170 along refrigerant lines 172 through expansion valve 178 into A/C evaporator 132, from into A/C evaporator 132 through electric A/C compressor 176 into cabin heat exchanger (heat pump) 128, from cabin heat exchanger (heat pump) 128 back to condenser 170.

Figure 7D:
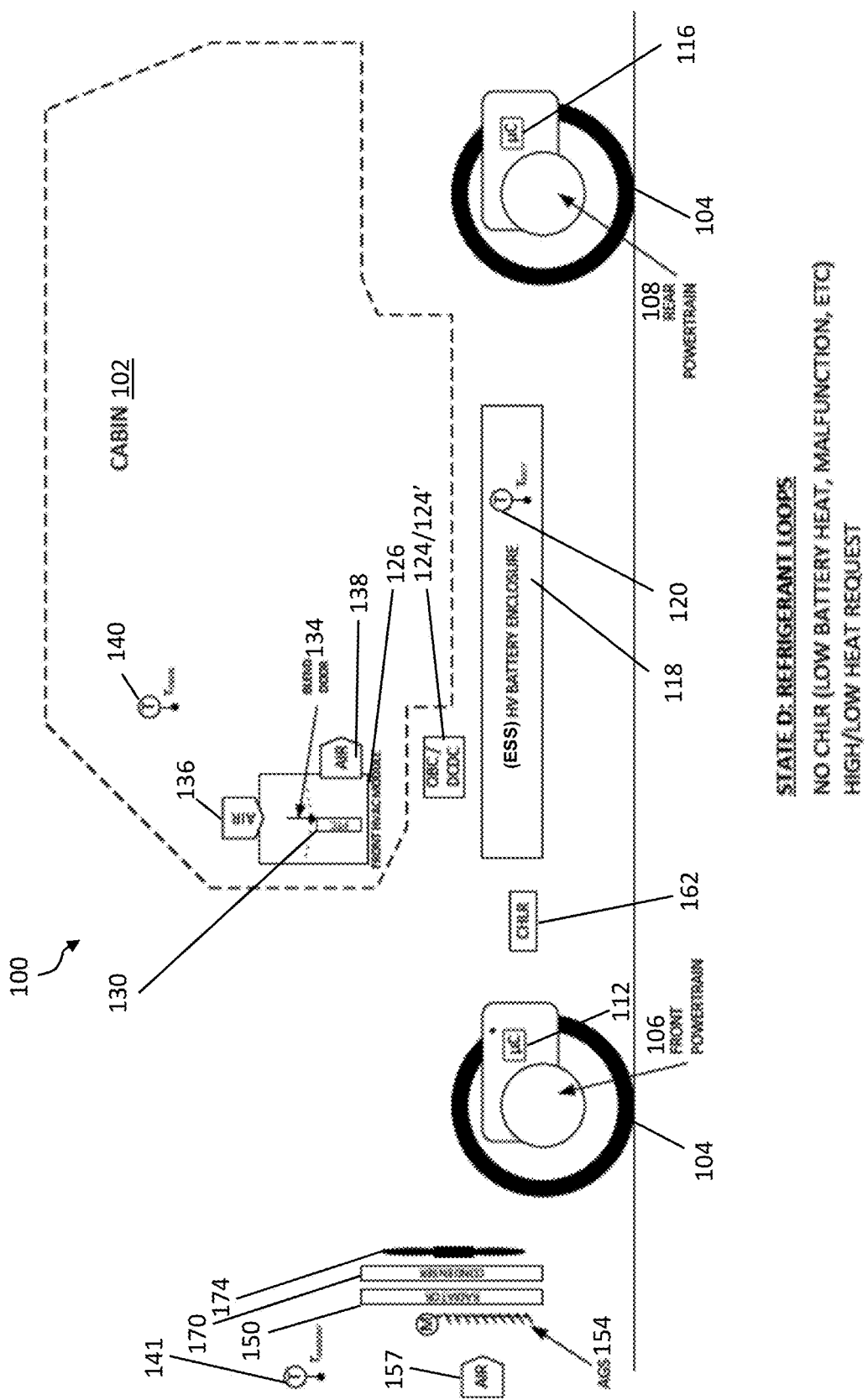
Figure 7E:
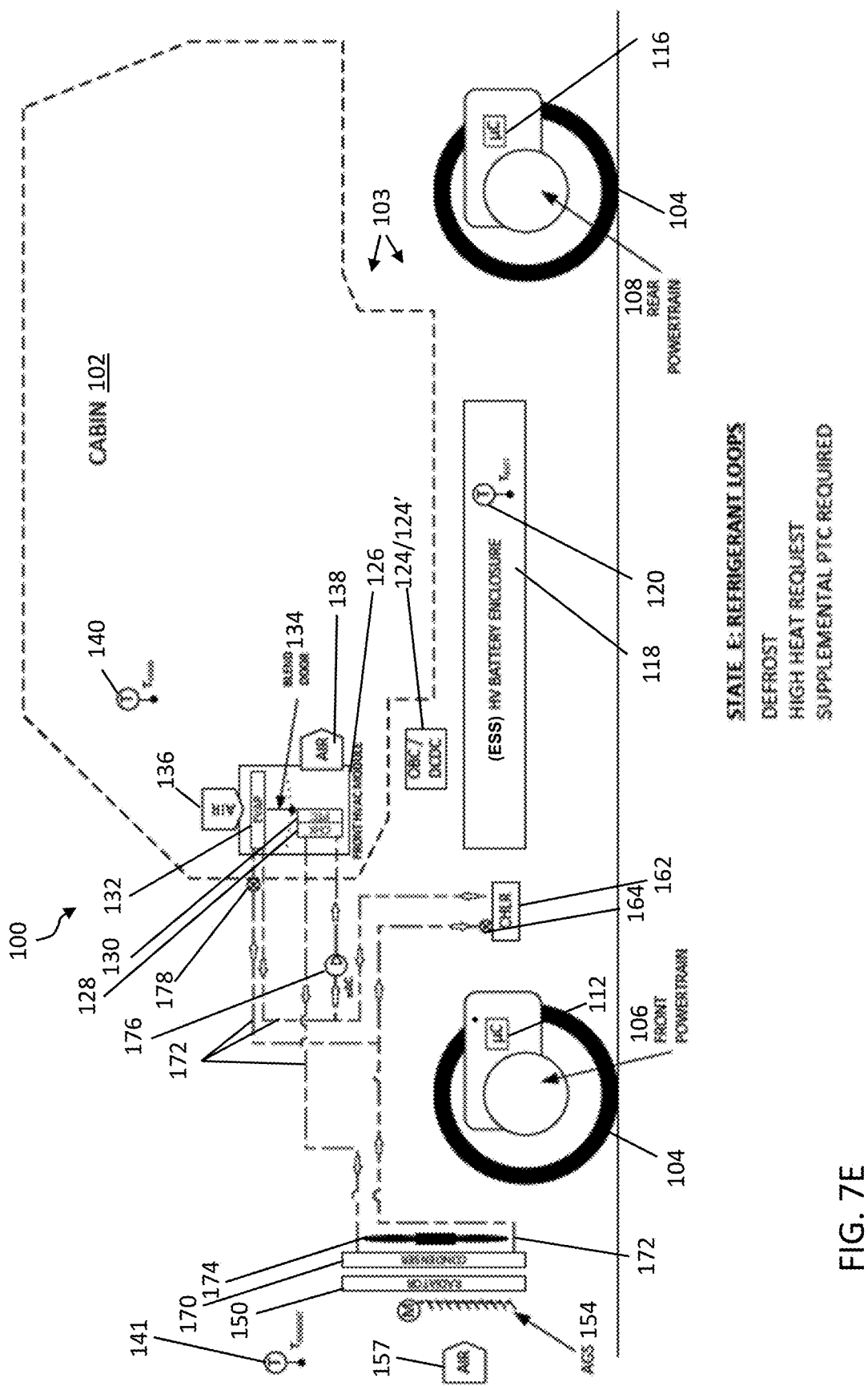

FIG. 7D illustrates a refrigerant flow state suitable for a high or low heat request and for which there is no activity required by the coolant-refrigerant heat exchanger 162. FIG. 7E illustrates a refrigerant flow state suitable for a high heat request and for which defrost is desired and supplemental heating via a PTC heater is required. For example, following one loop, refrigerant can flow along refrigerant lines 172 from condenser 170 through expansion valve 164 into coolant heat exchanger 162 (CHLR), from coolant heat exchanger 162 (CHLR) through electric A/C compressor 176 into cabin heat exchanger (heat pump) 128 that can be modified via positive temperature coefficient heater 130, and back to condenser 170. Following another loop, refrigerant can flow along refrigerant lines 172 from condenser 170 through expansion valve 178 into A/C evaporator 132, from A/C evaporator 132 through electric A/C compressor 176 into cabin heat exchanger (heat pump) 128 that can be modified via positive temperature coefficient heater 130, and subsequently back to condenser 170.

Figure 7F:
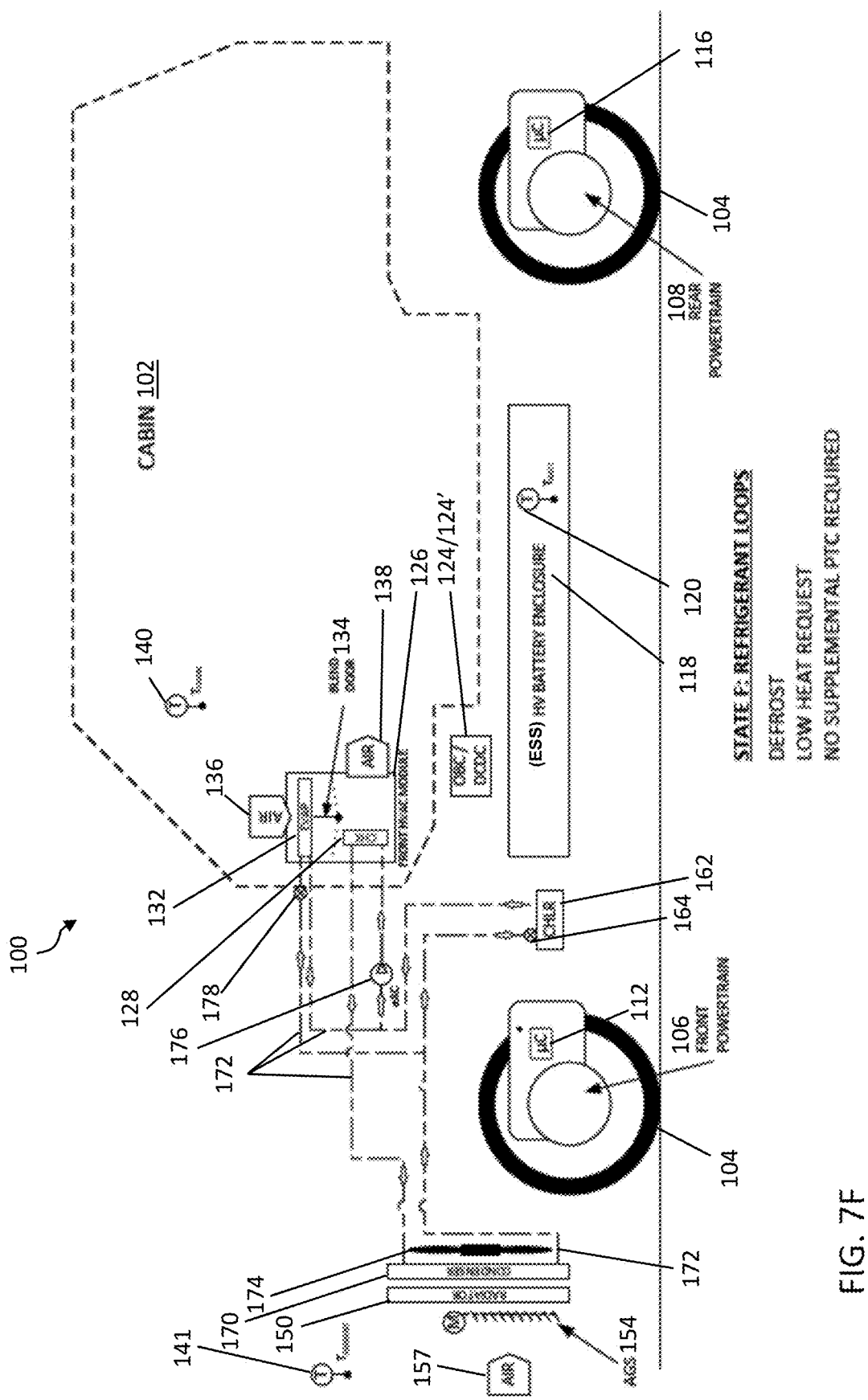

FIG. 7F illustrates a refrigerant flow state suitable for a low heat request and for which the frost is desired and no supplemental heating via a PTC heater is required. For example, following one loop, refrigerant can flow along refrigerant lines 172 from condenser 170 through expansion valve 164 into coolant heat exchanger 162 (CHLR), from coolant heat exchanger 162 through electric A/C compressor 176 into cabin heat exchanger (heat pump) 128 and from cabin heat exchanger (heat pump) 128 subsequently back to condenser 170. Following another loop, refrigerant can flow along refrigerant lines 172 from condenser 170 through expansion valve 178 into A/C evaporator 132, from A/C evaporator 132 through electric A/C compressor 176 into cabin heat exchanger (heat pump) 128 and back to condenser 170.

Figure 7G:
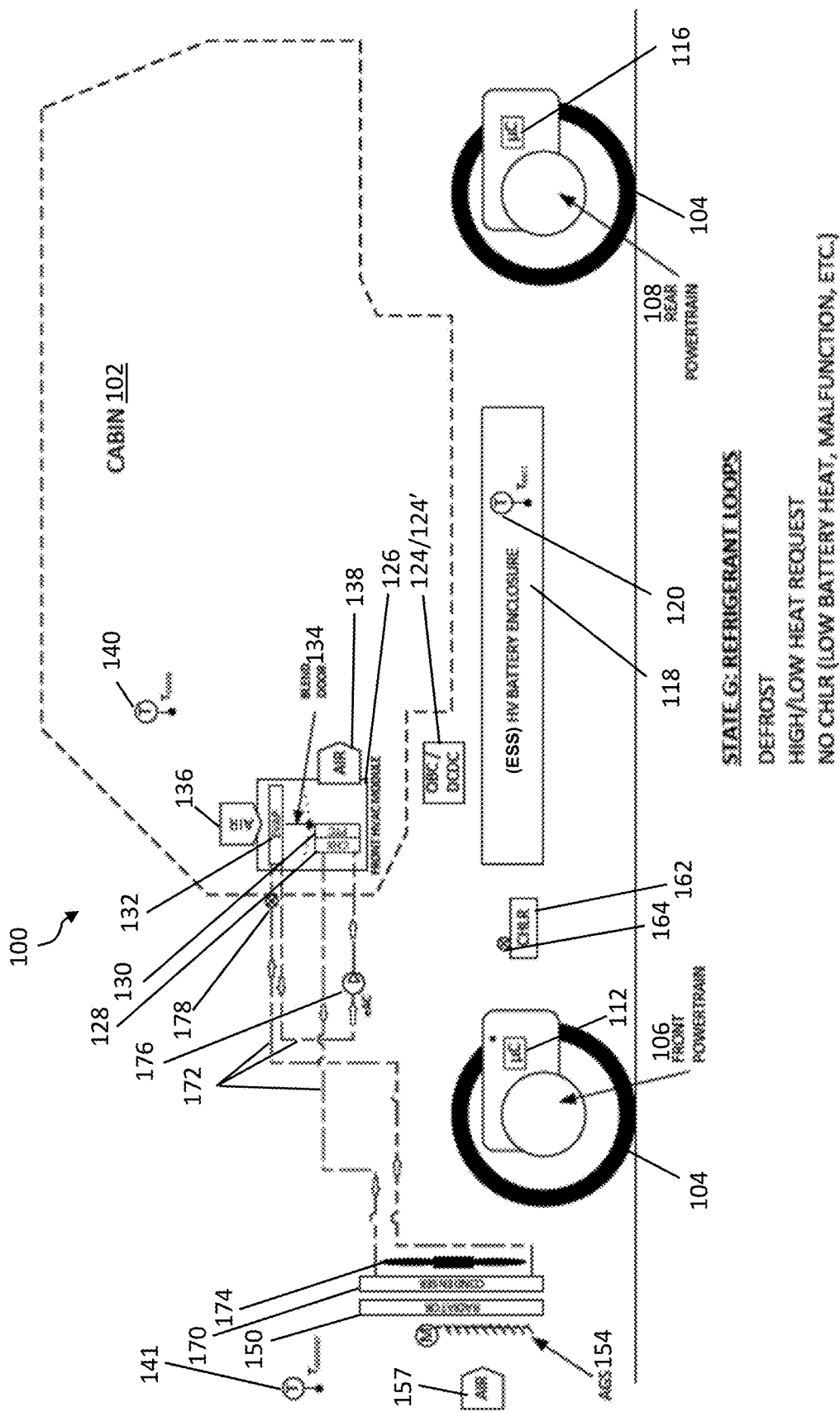
Figure 8A:
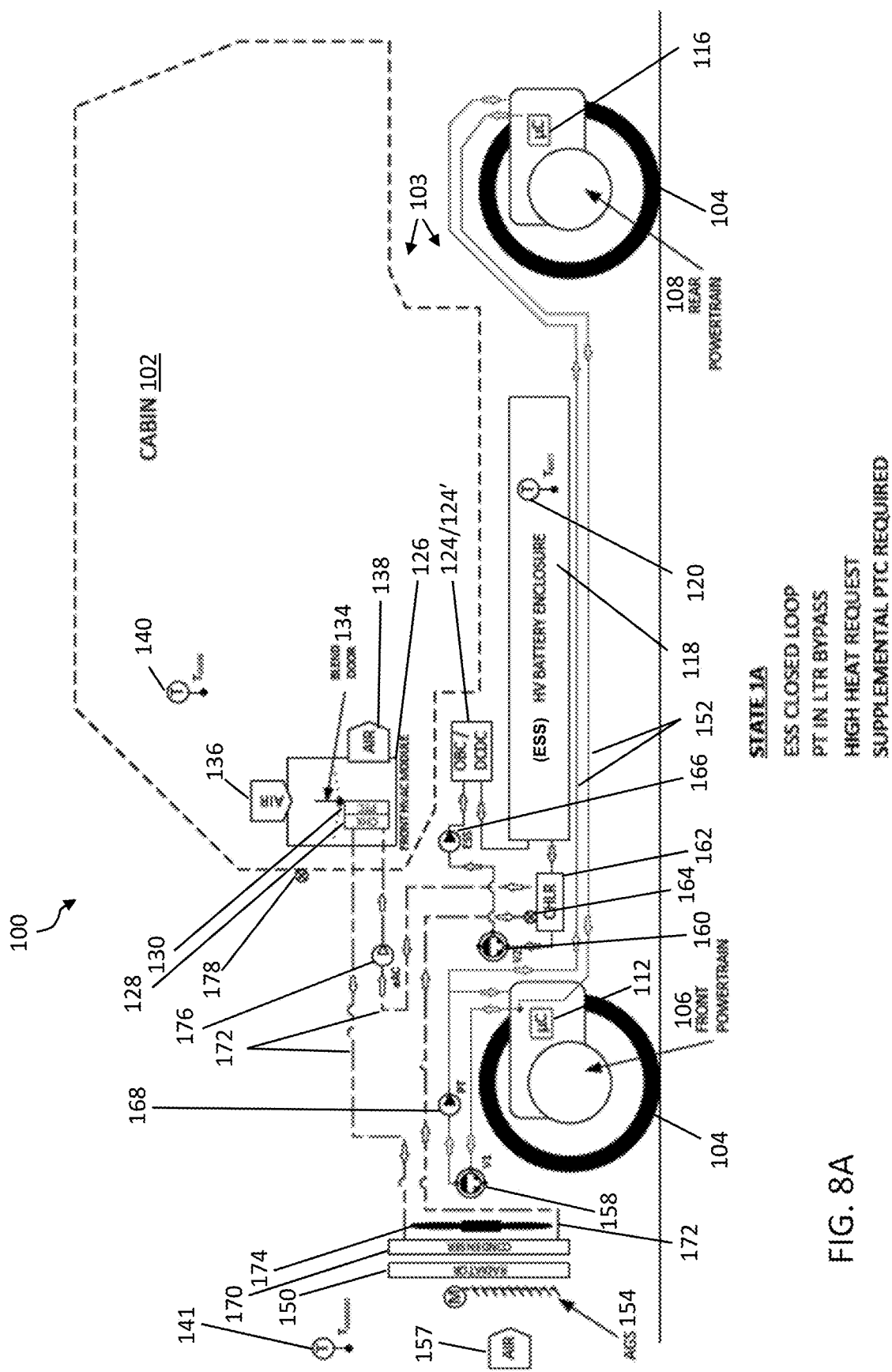
FIGS. 8A-8G are schematic diagrams illustrating coolant flow and refrigerant flow for seven exemplary sub-states (State 1A-State 1G) for a first coolant flow state (State 1) in which HV battery energy storage system has a closed loop coolant configuration and in which the power train has a configuration where power train coolant bypasses the low temperature radiator.
Figure 8B:
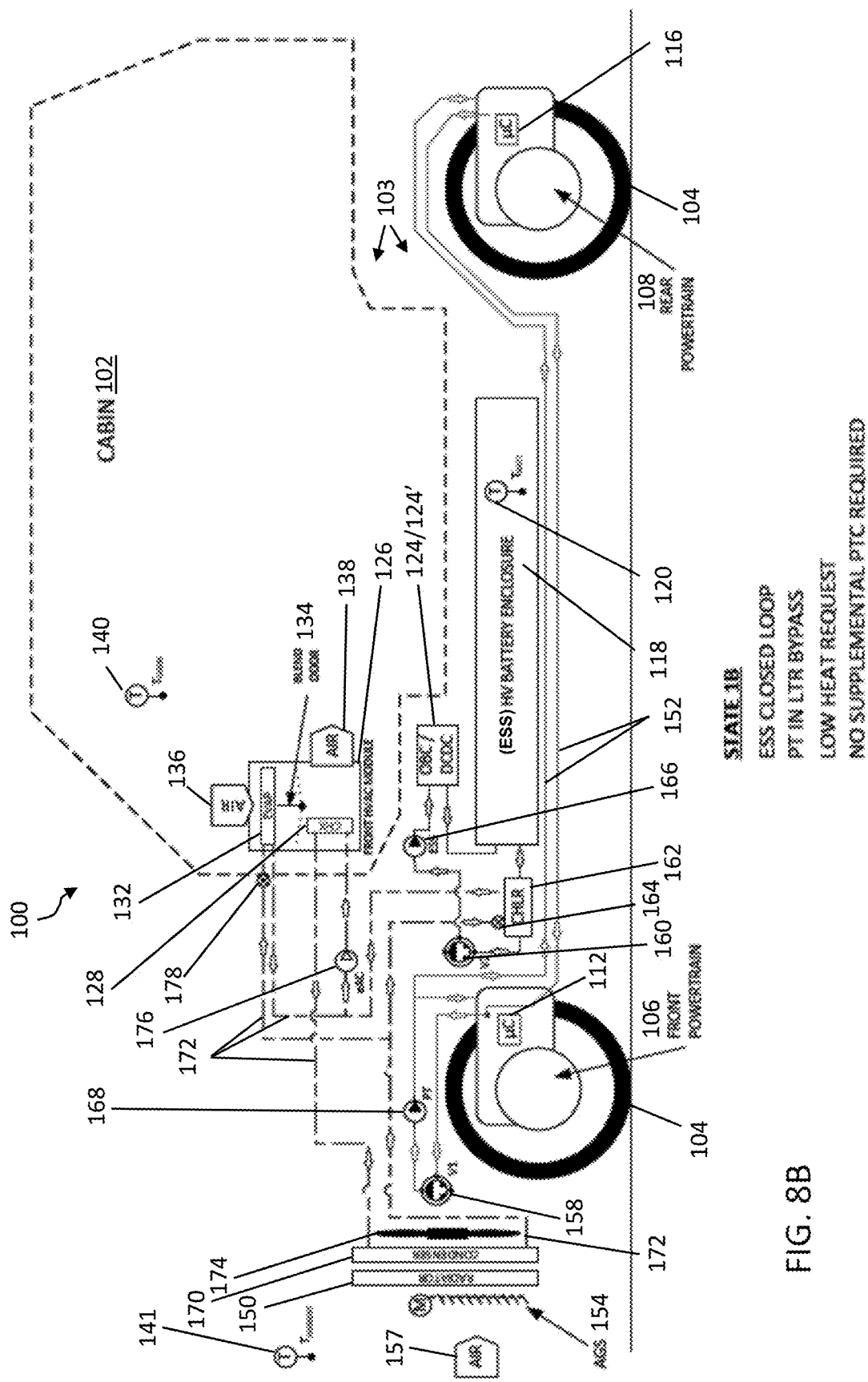
Figure 8C:
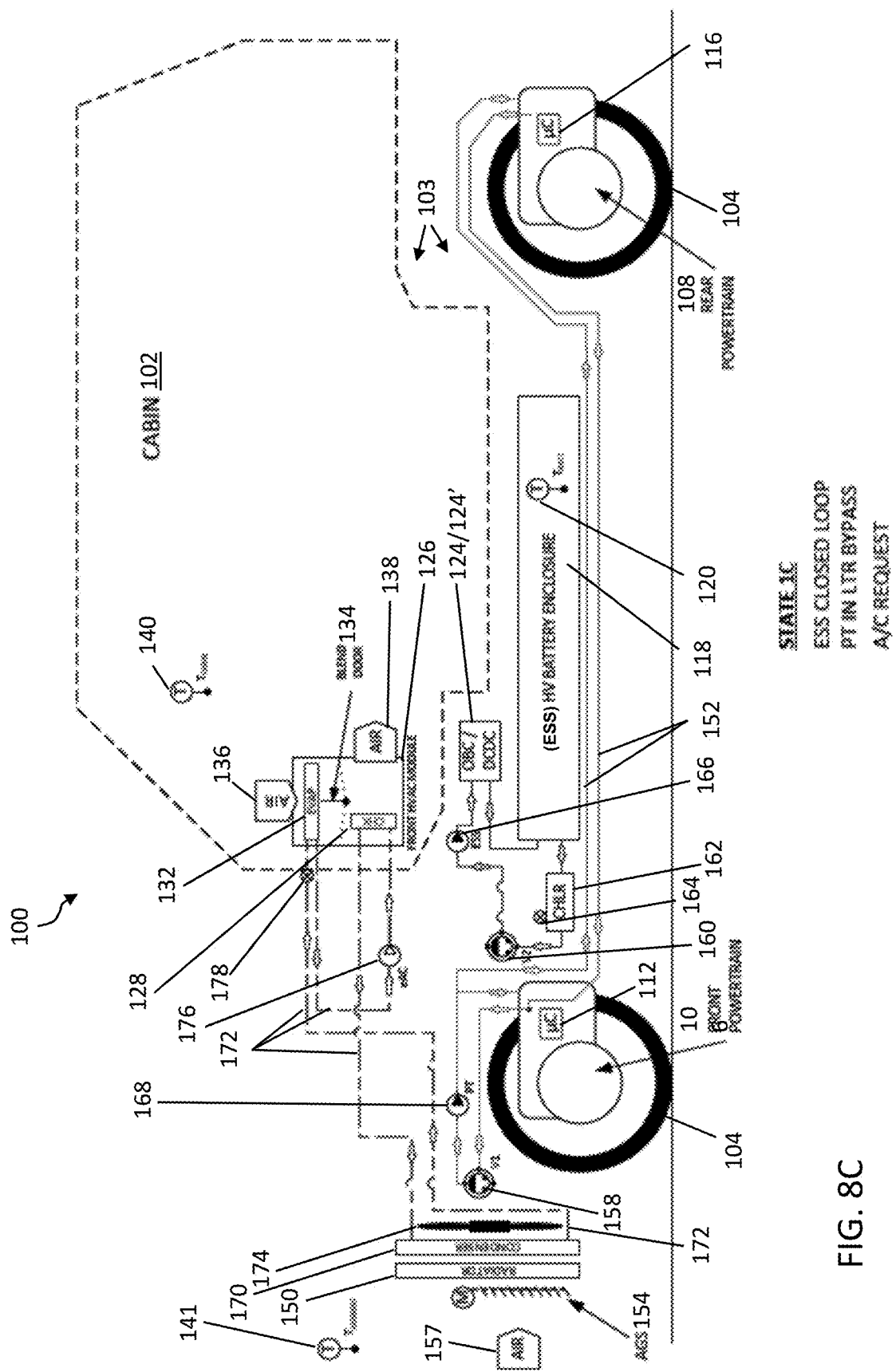
Figure 8D:
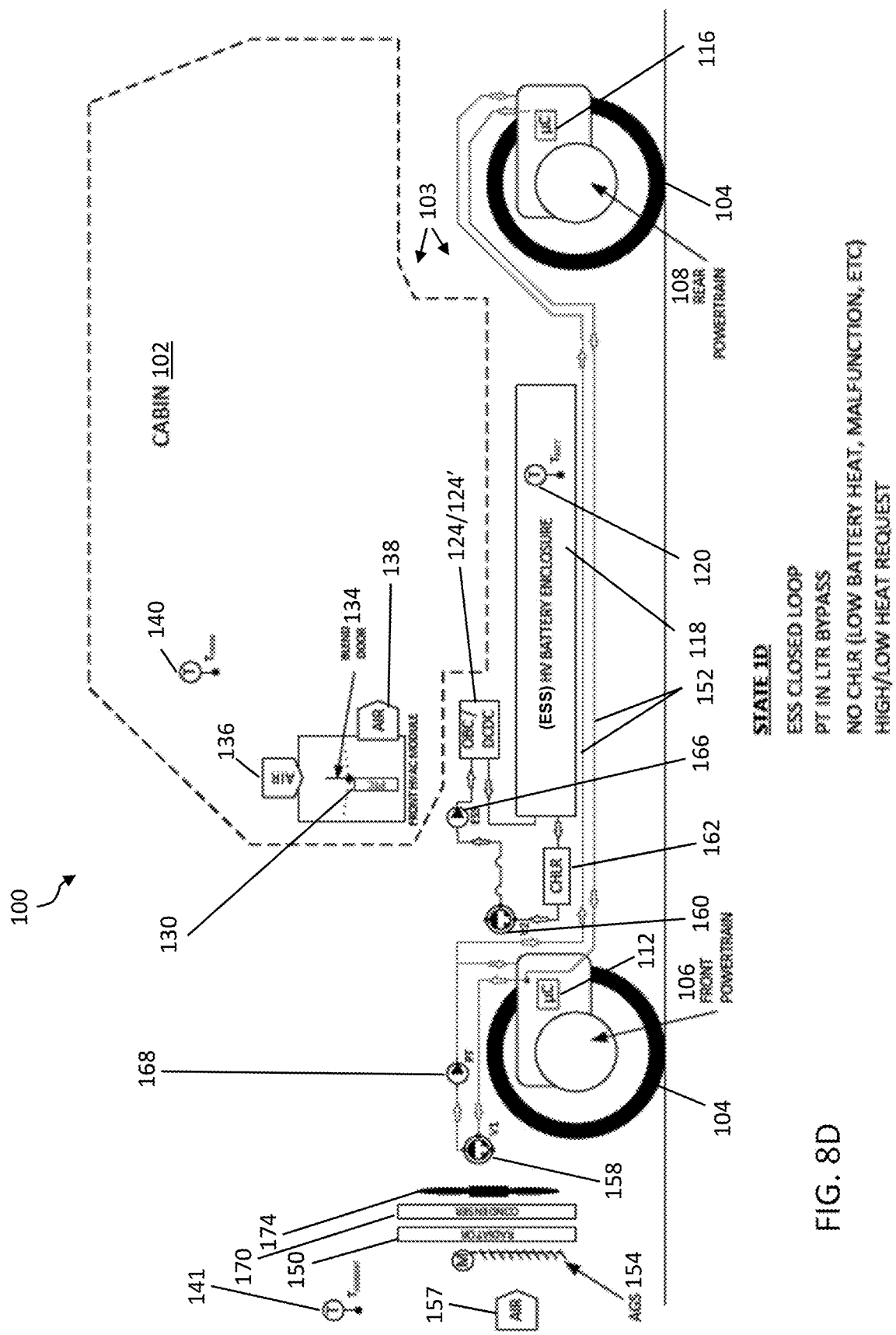
Figure 8E:
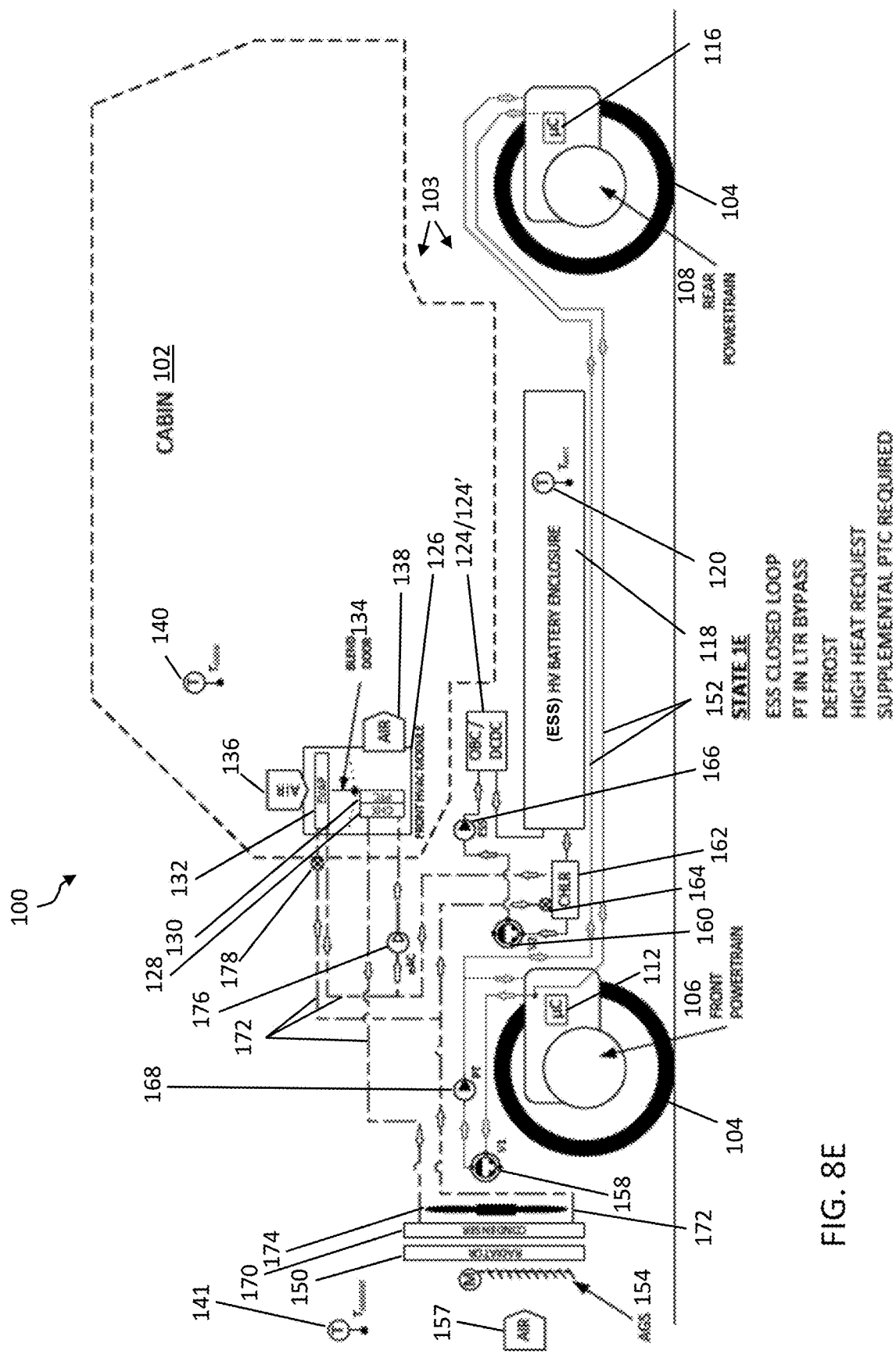
Figure 8F:
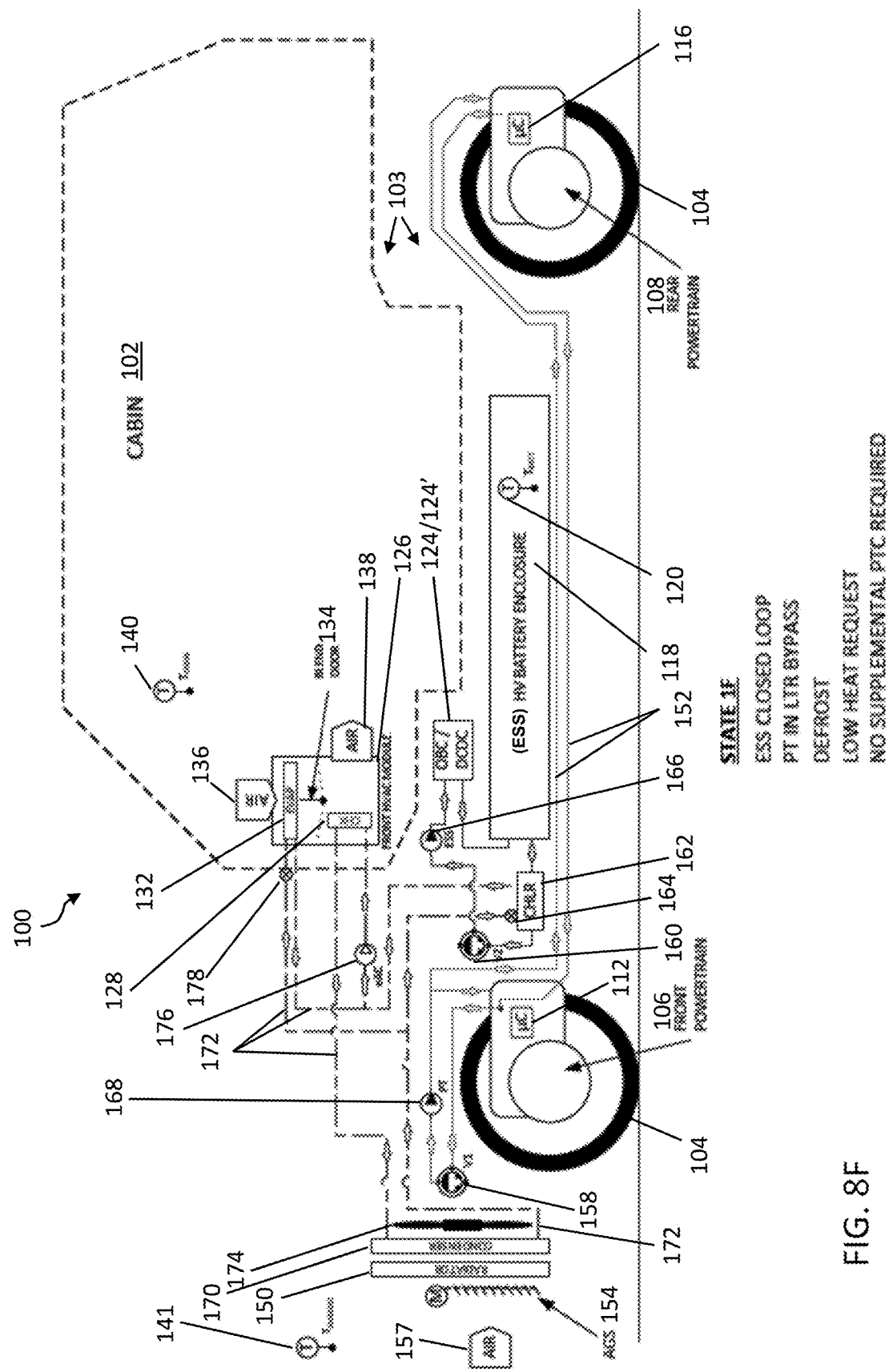
Figure 8G:
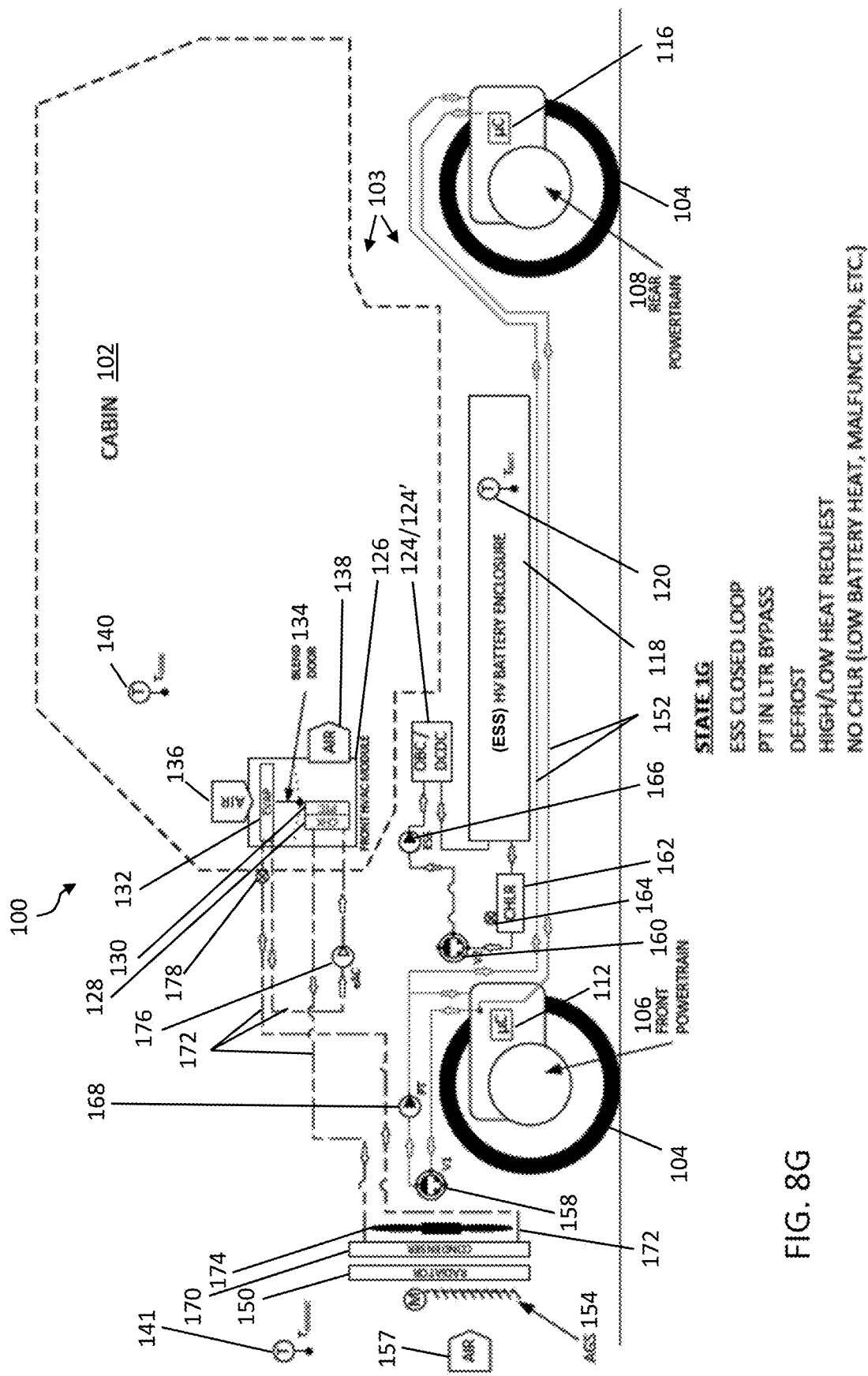
Figure 9A:
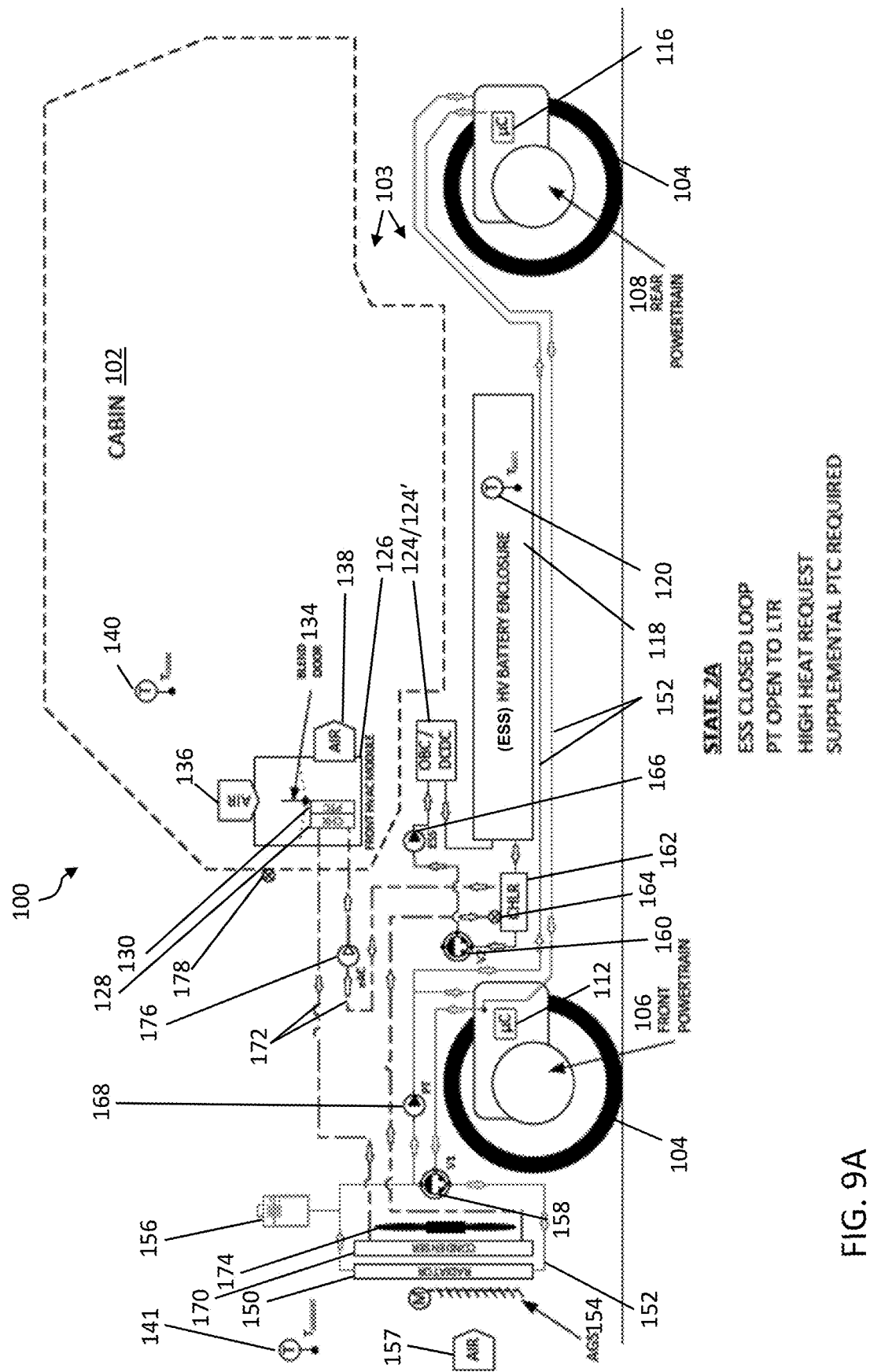
FIGS. 9A-9G are schematic diagrams illustrating coolant flow and refrigerant flow for seven other exemplary sub-states (State 2A-State 2G) for a second coolant flow state (State 2) in which HV battery energy storage system has a closed loop coolant configuration and in which the power train has a configuration where power train coolant is open to the low temperature radiator.
Figure 9B:
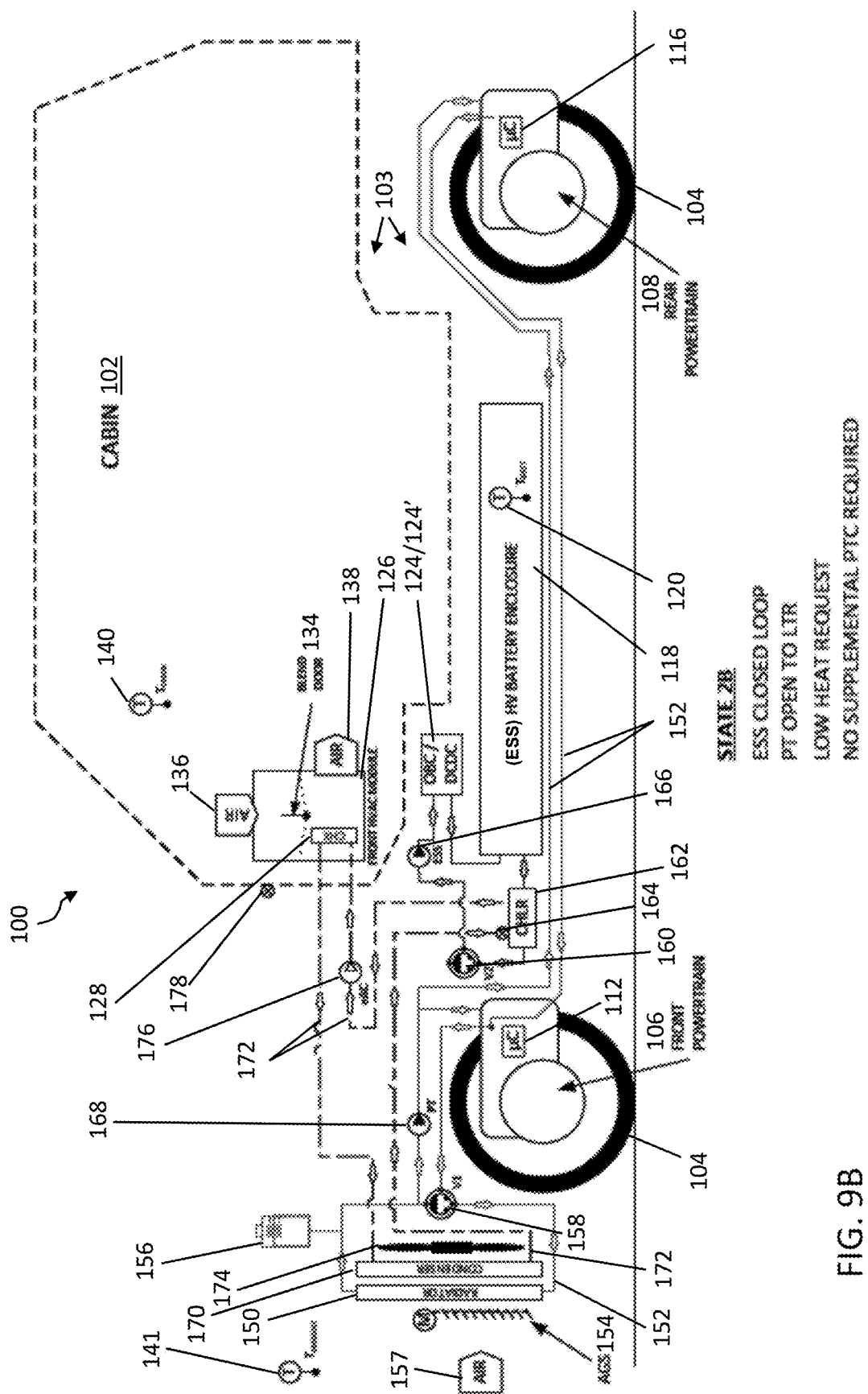
Figure 9C:
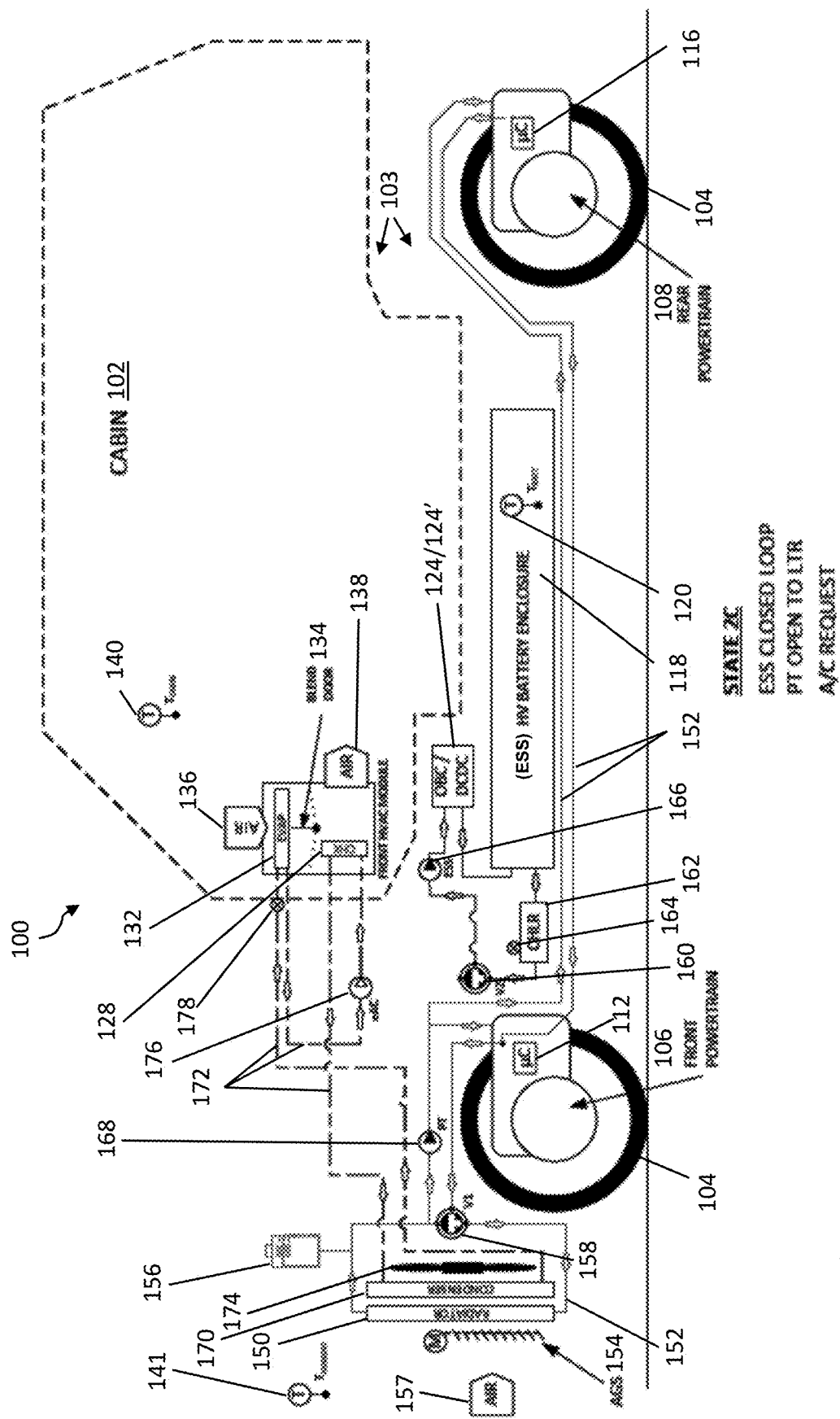
Figure 9D:
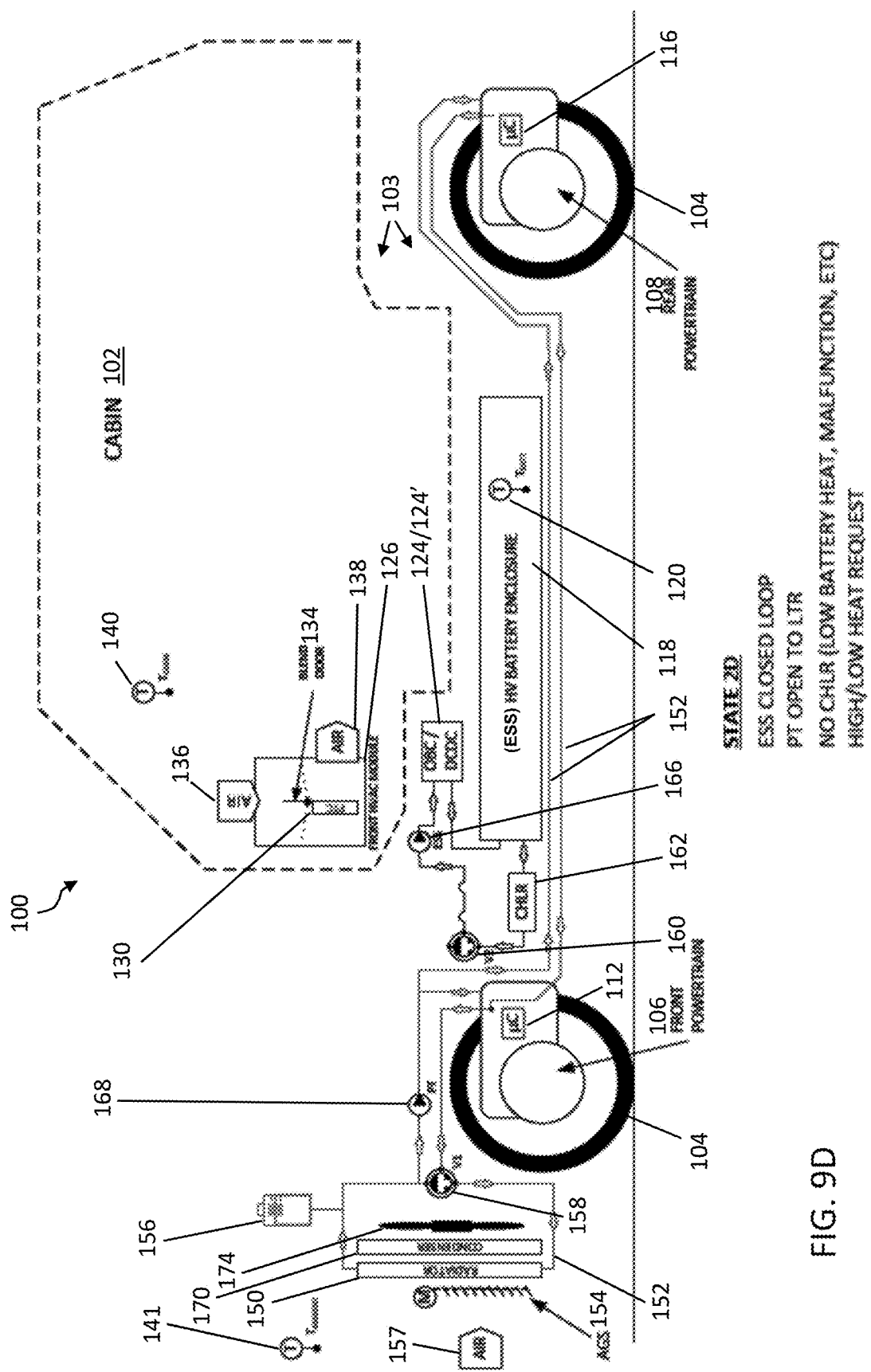
Figure 9E:
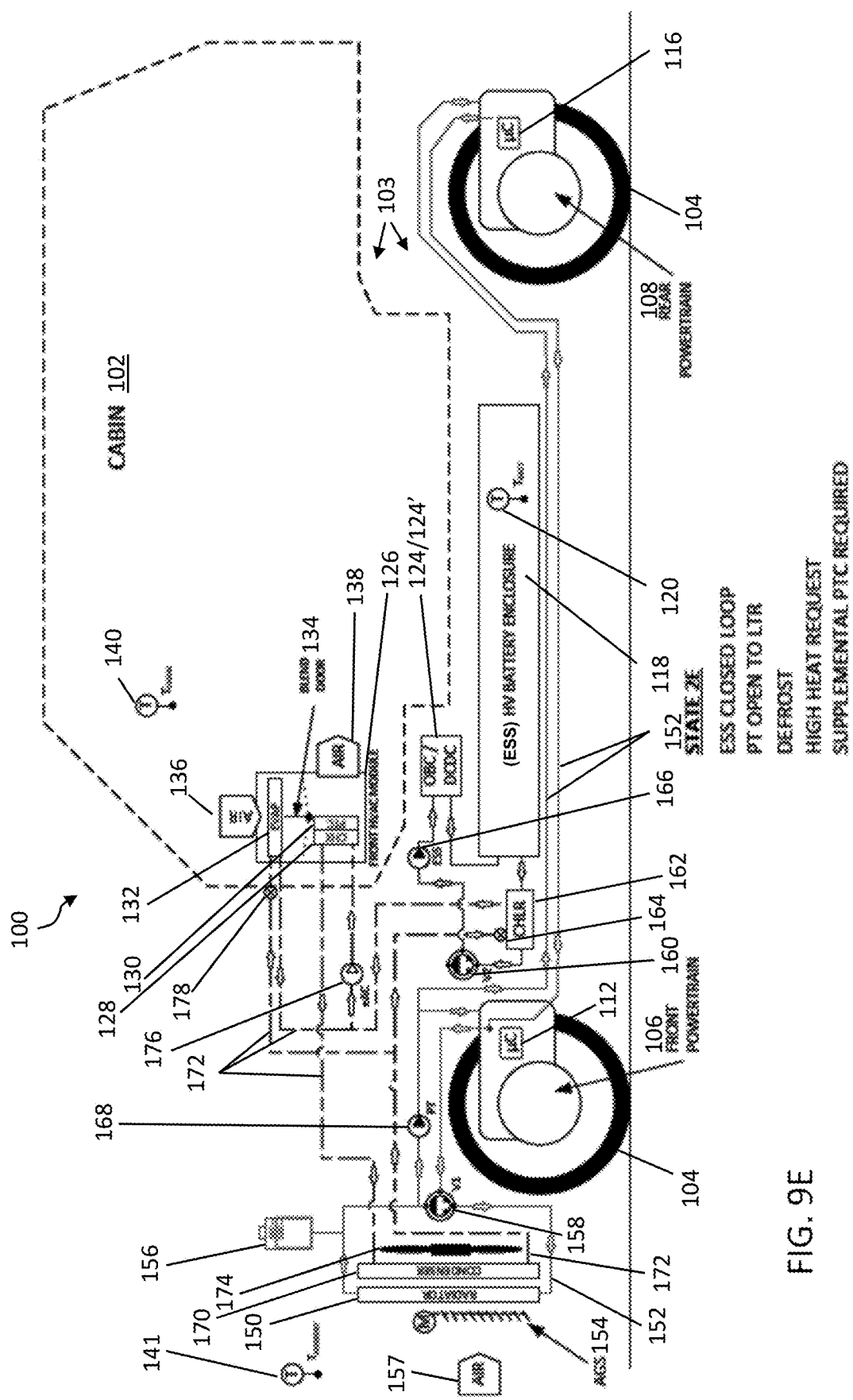
Figure 9F:
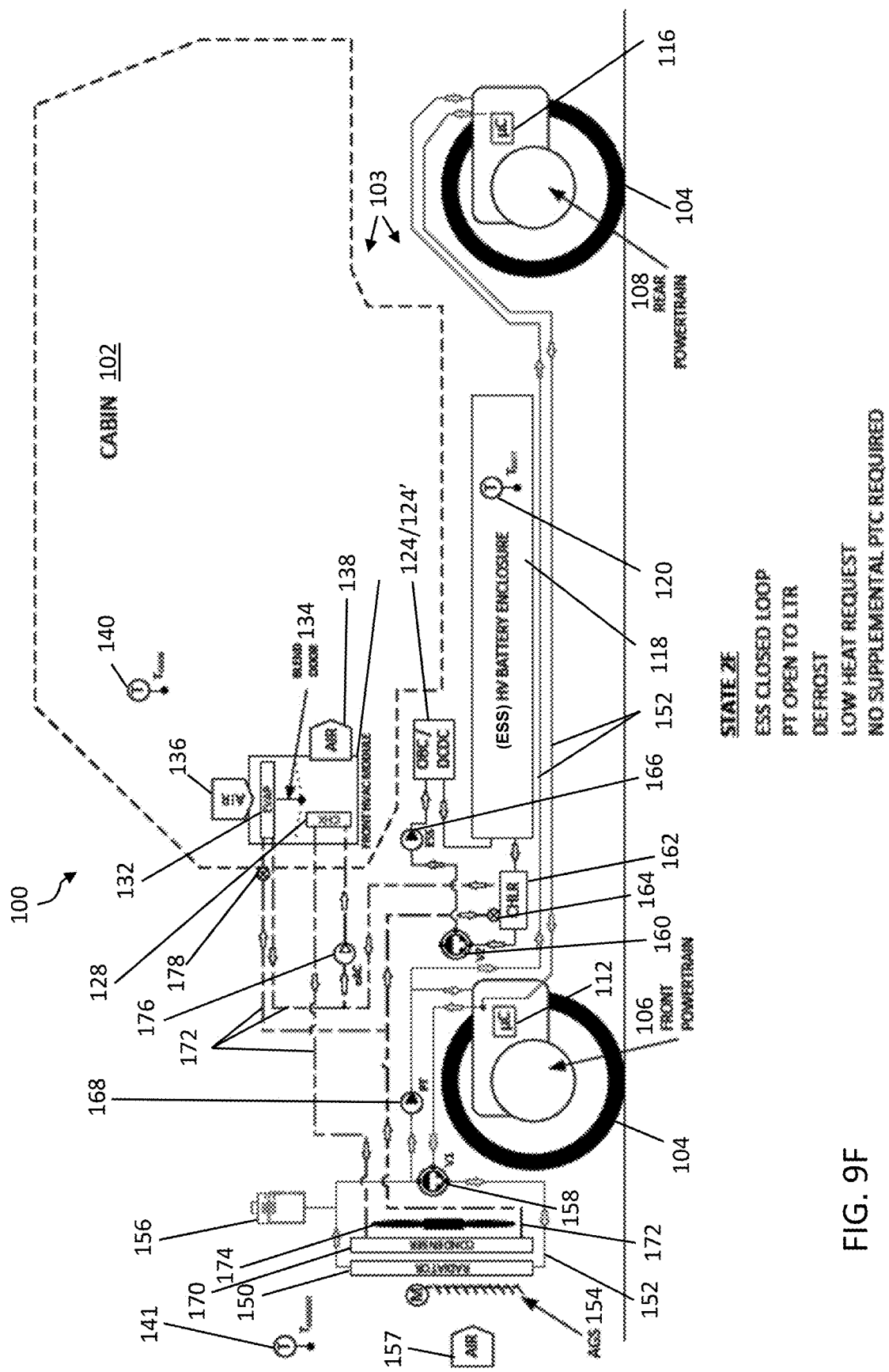
Figure 9G:
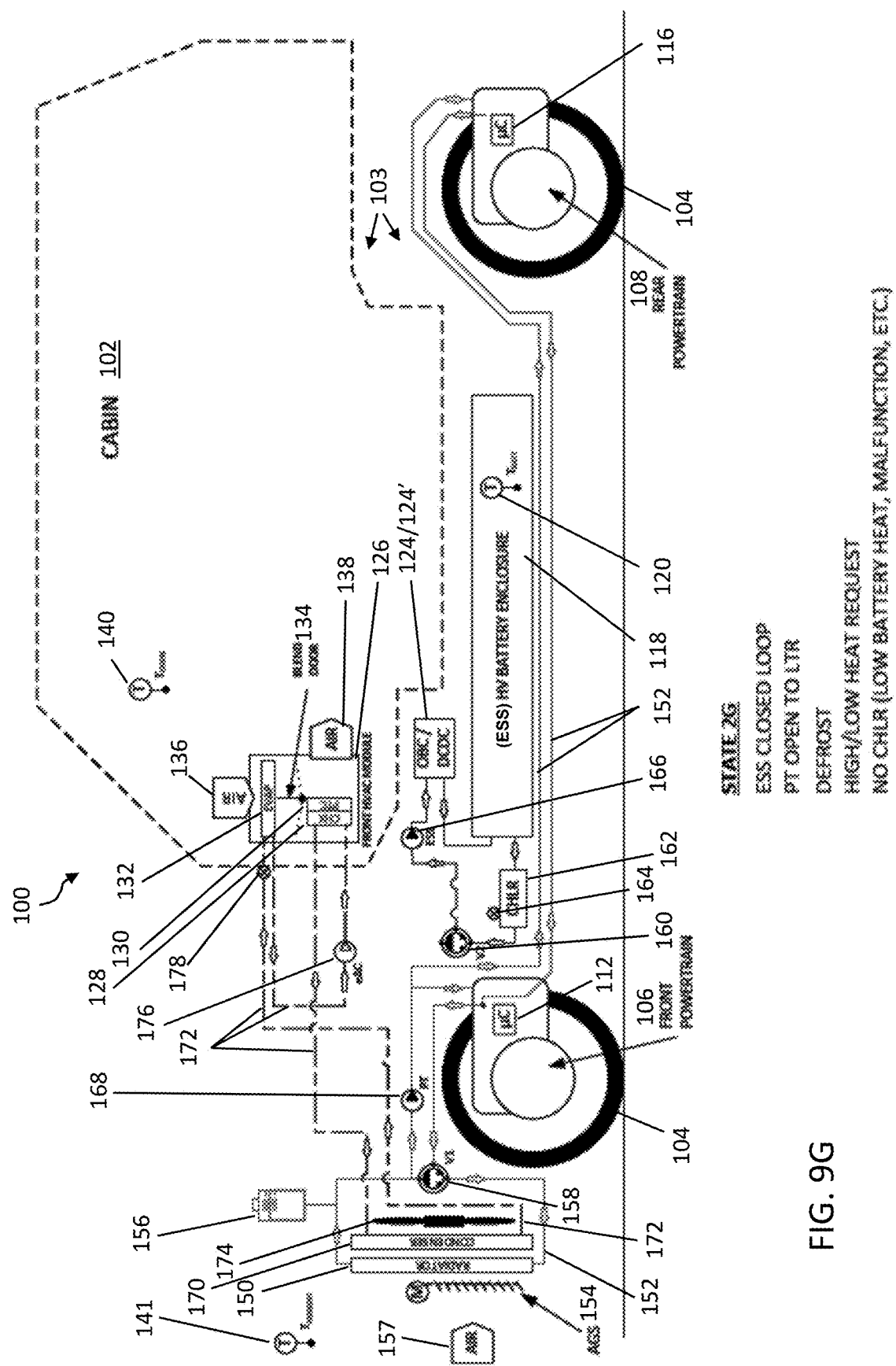
Figure 10A:
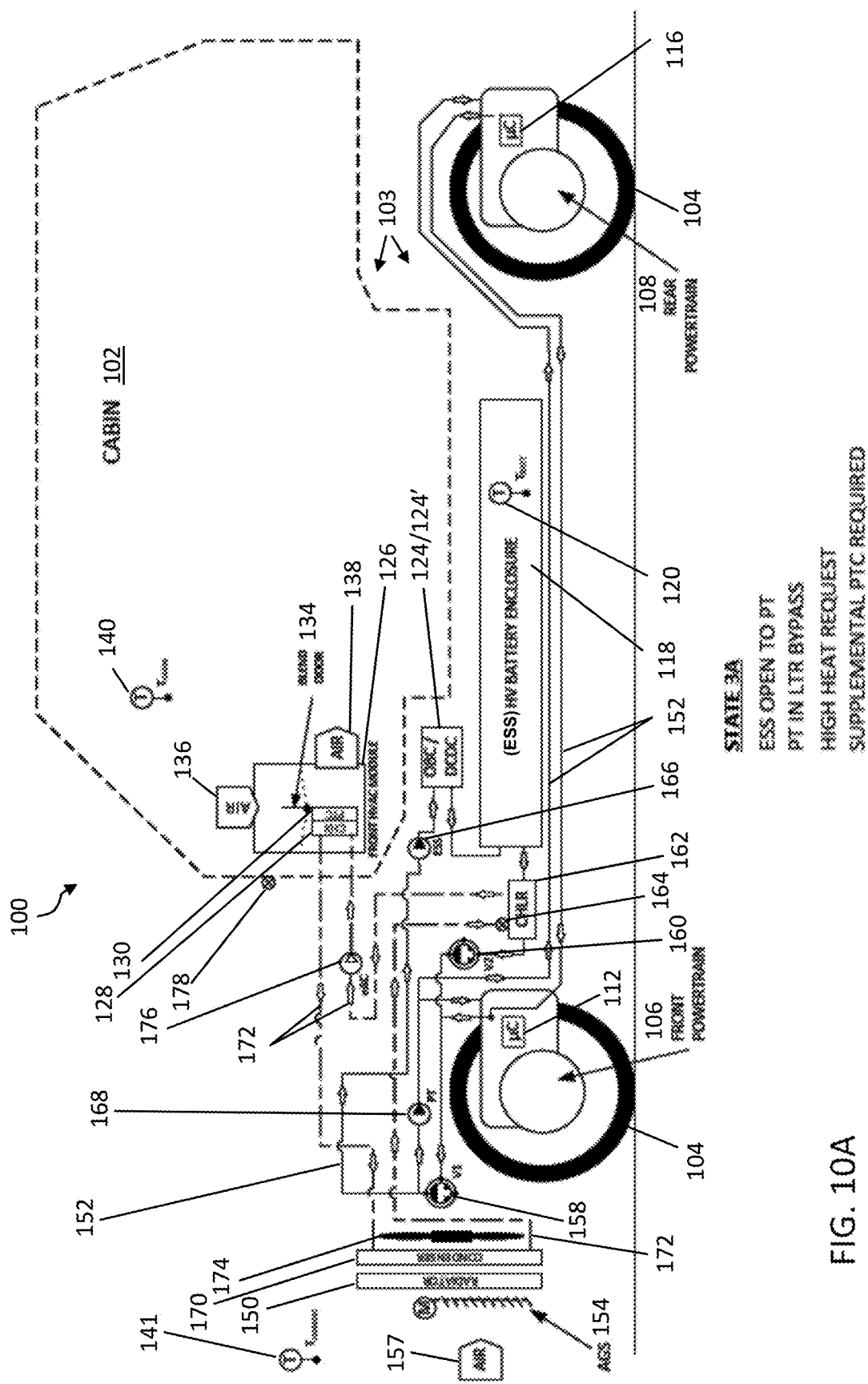
FIGS. 10A-10G are schematic diagrams illustrating coolant flow and refrigerant flow for seven other exemplary sub-states (State 3A-State 3G) for a third coolant flow state (State 3) in which coolant for the HV battery energy storage system is open to the power train and in which the power train has a configuration where power train coolant bypasses the low temperature radiator.
Figure 10B:
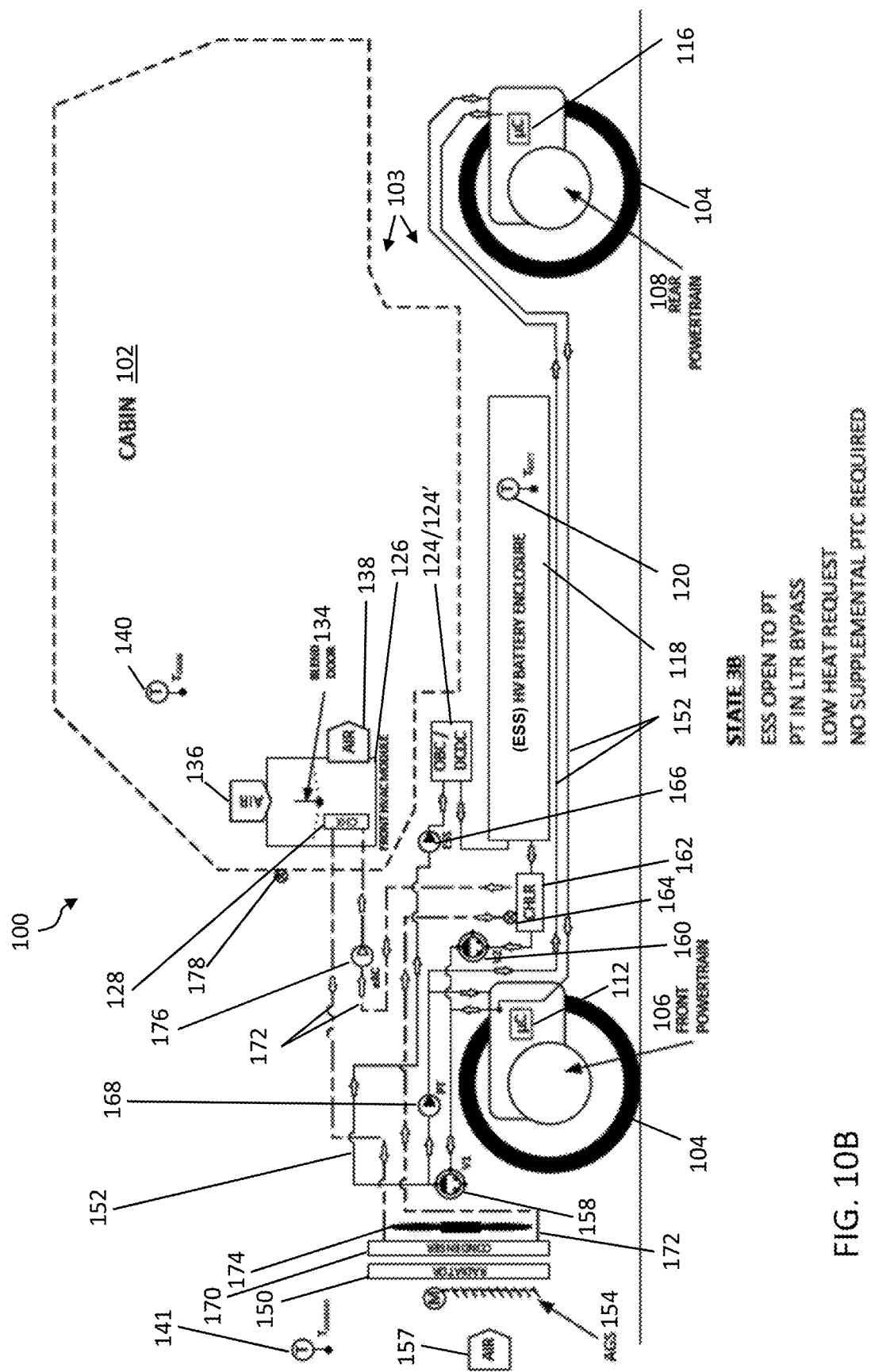
Figure 10C:
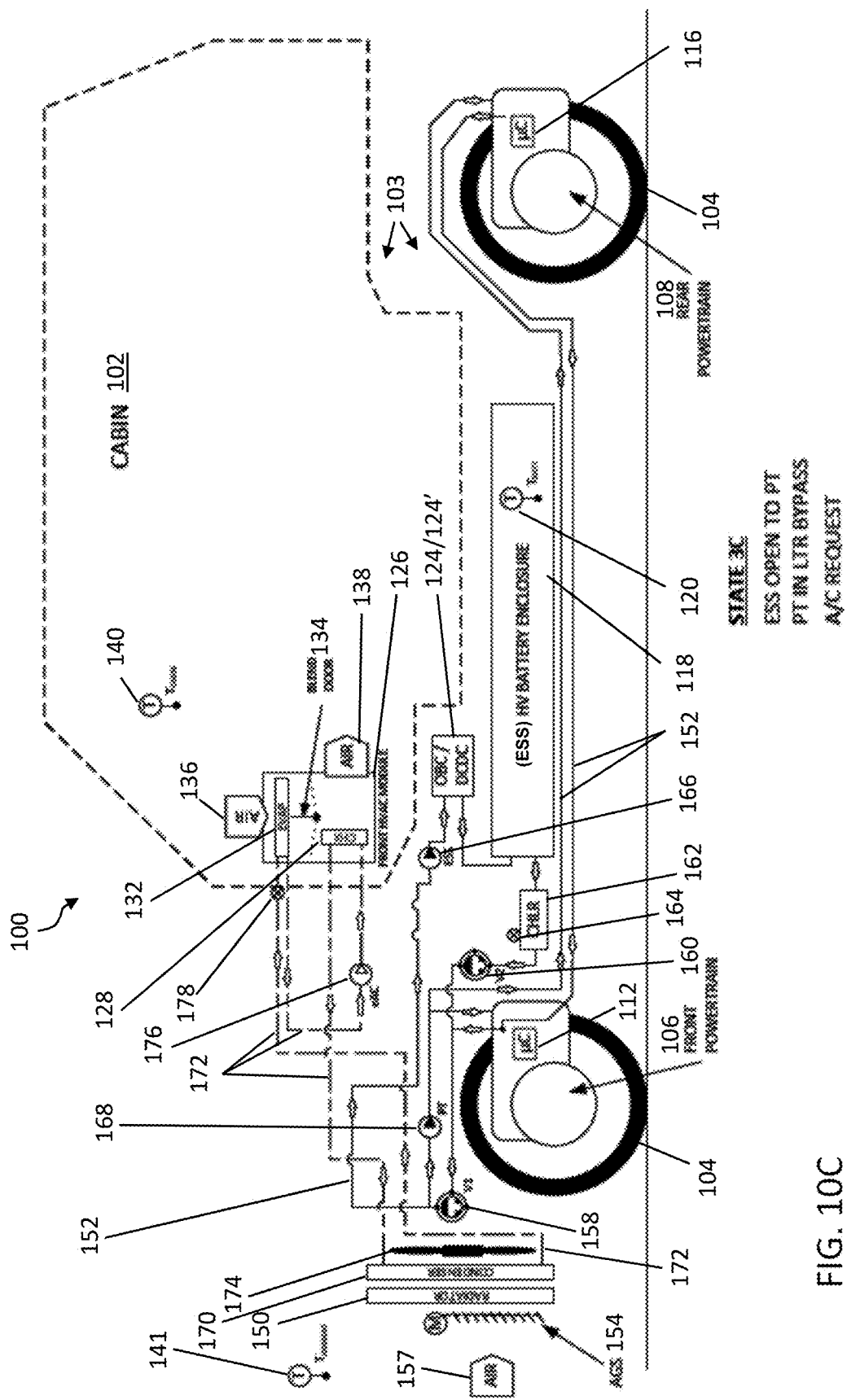
Figure 10D:
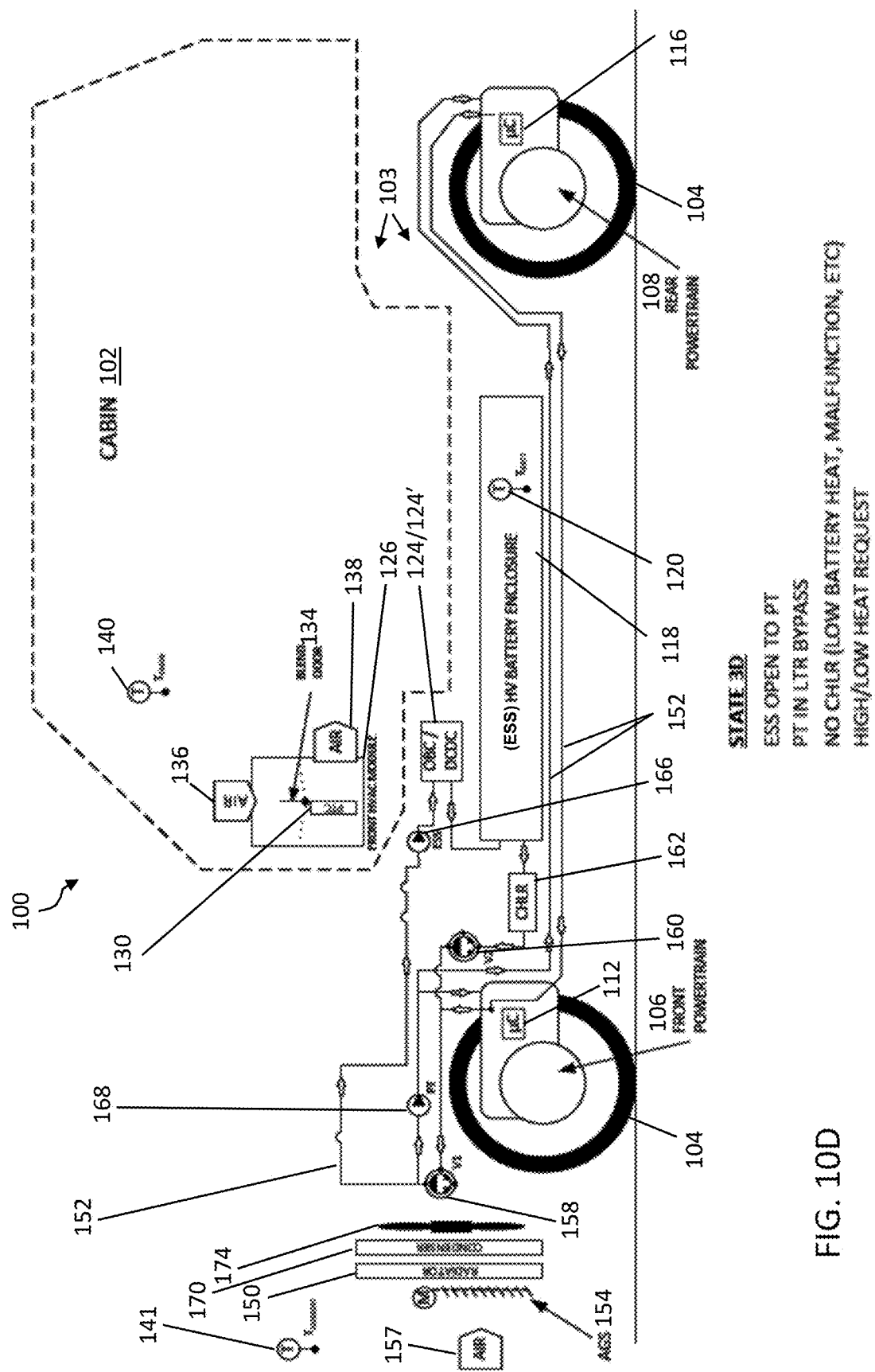
Figure 10E:
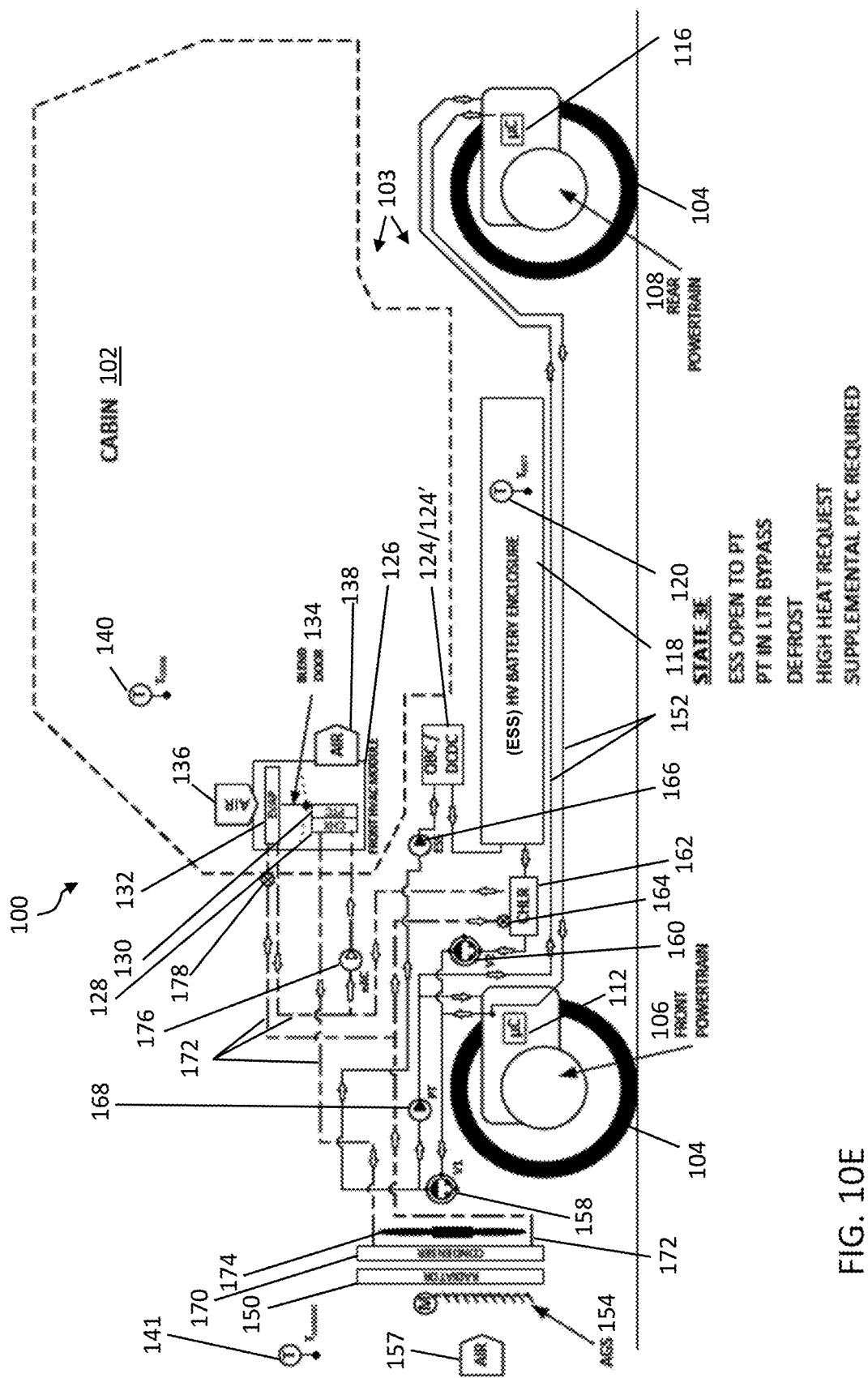
Figure 10F:
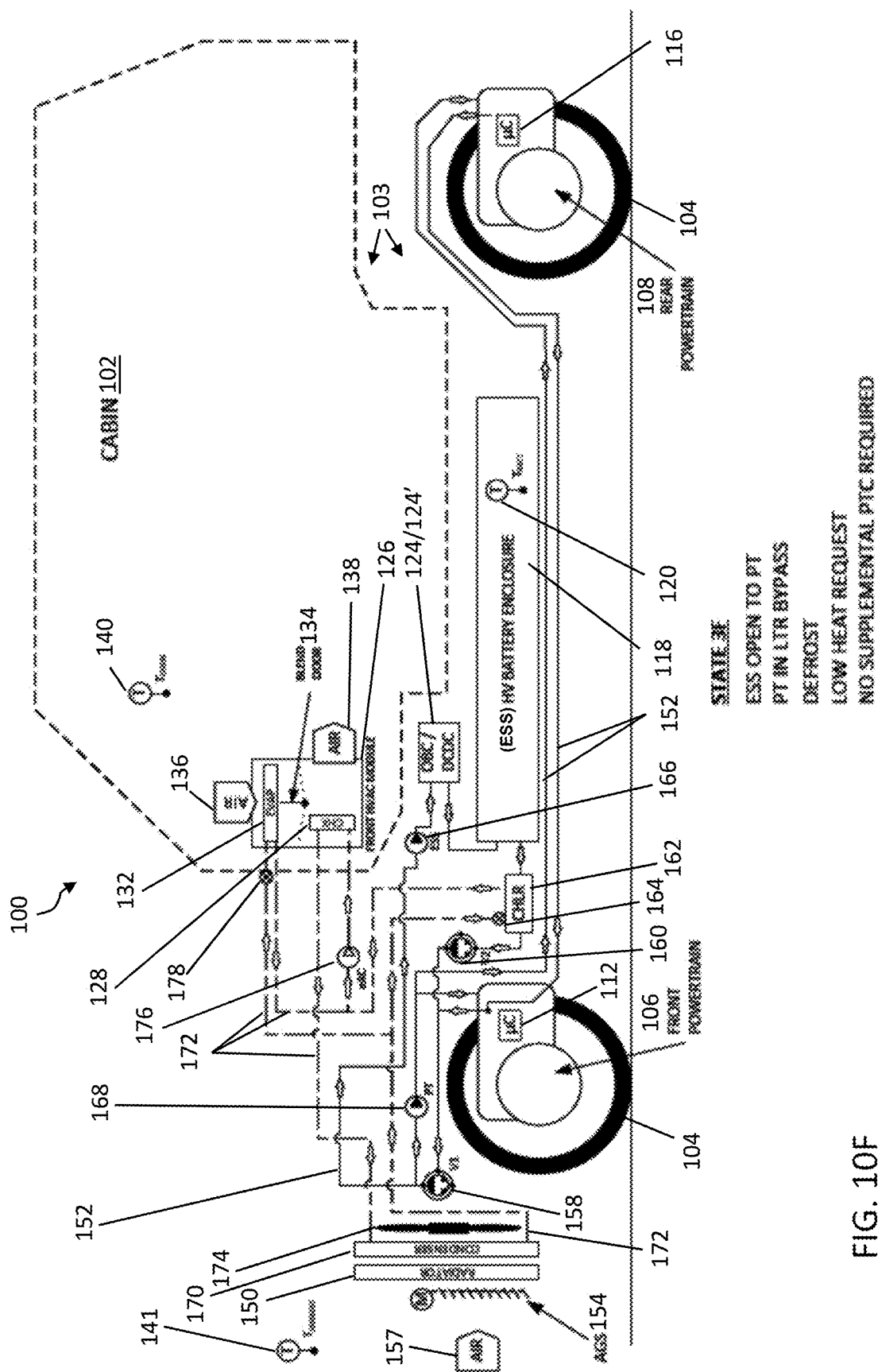
Figure 10G:
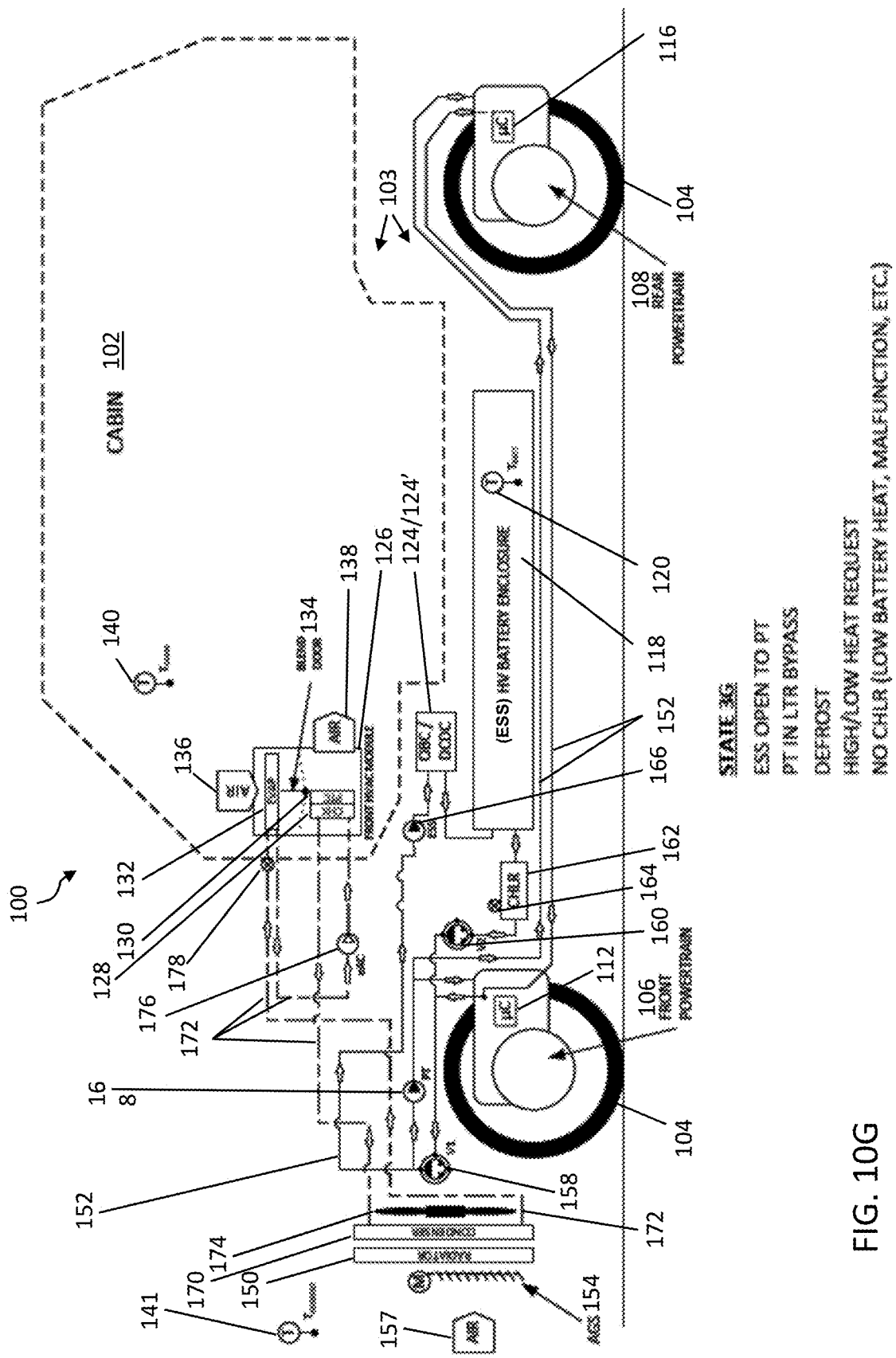
Figure 11A:
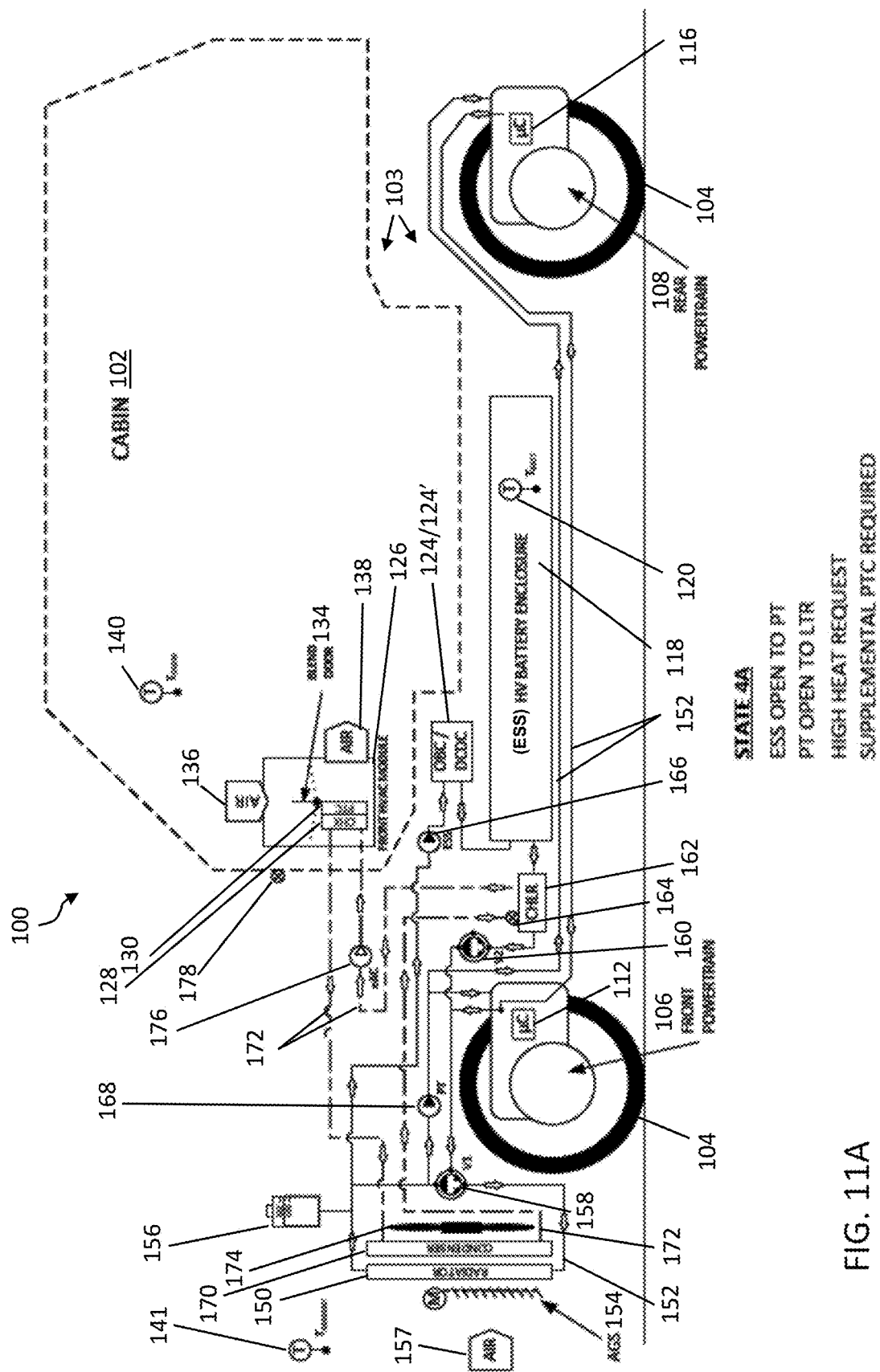
FIGS. 11A-11G are schematic diagrams illustrating coolant flow and refrigerant flow for seven other exemplary sub-states (State 4A-State 4G) for a fourth coolant flow state (State 4) in which coolant for the HV battery energy storage system is open to the power train and in which the power train has a configuration where power train coolant is open to the low temperature radiator.
Figure 11B:
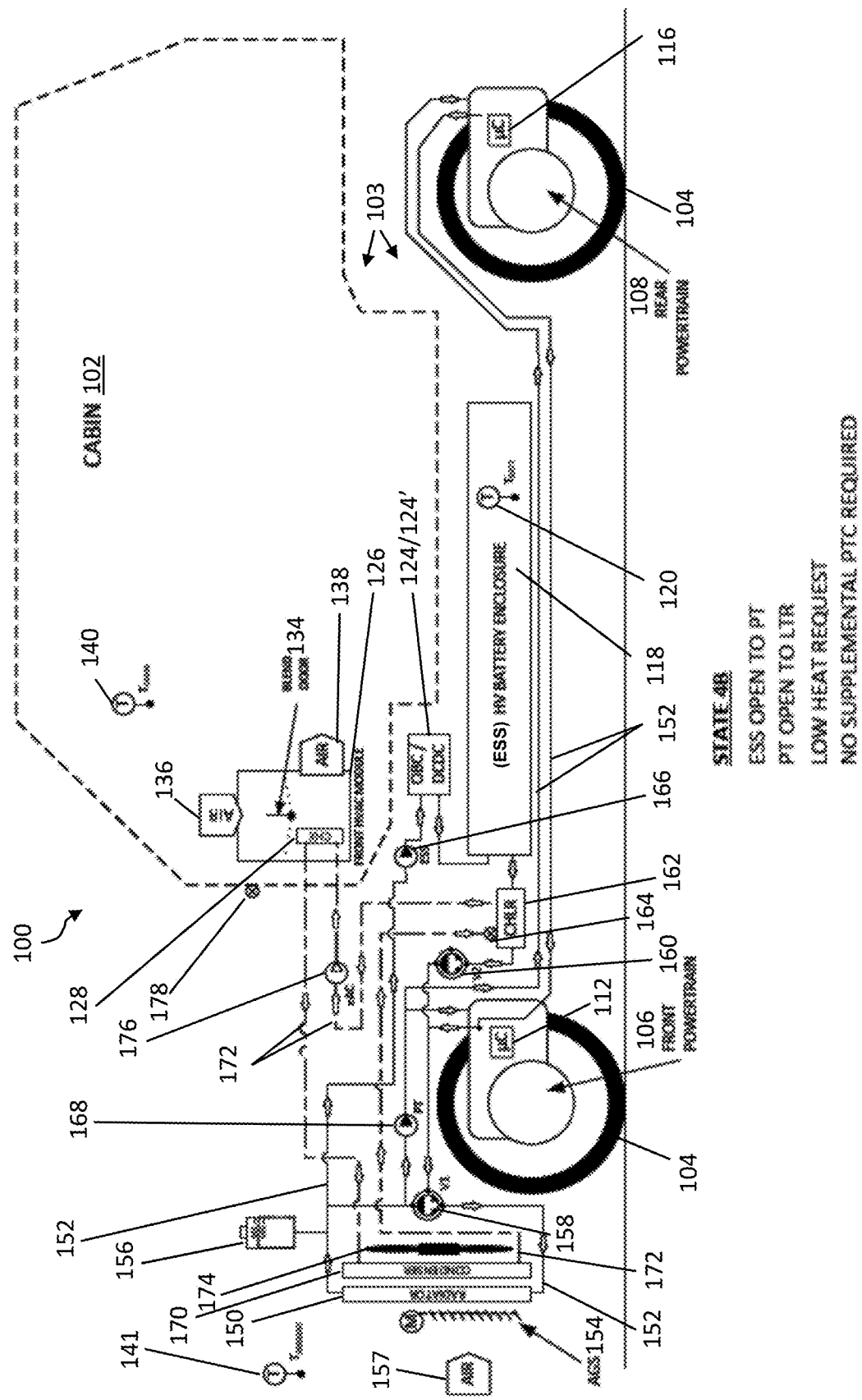
Figure 11C:
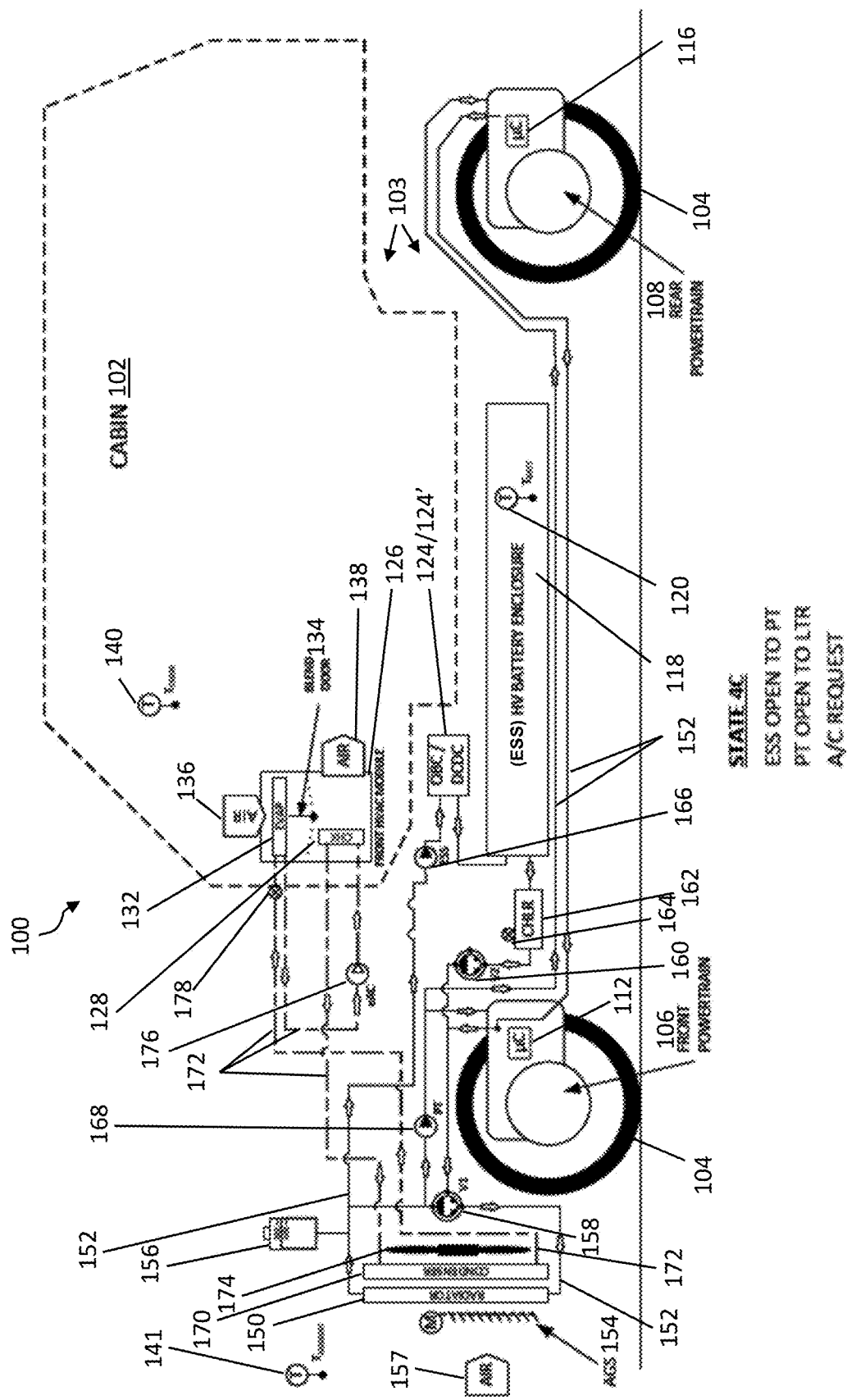
Figure 11D:
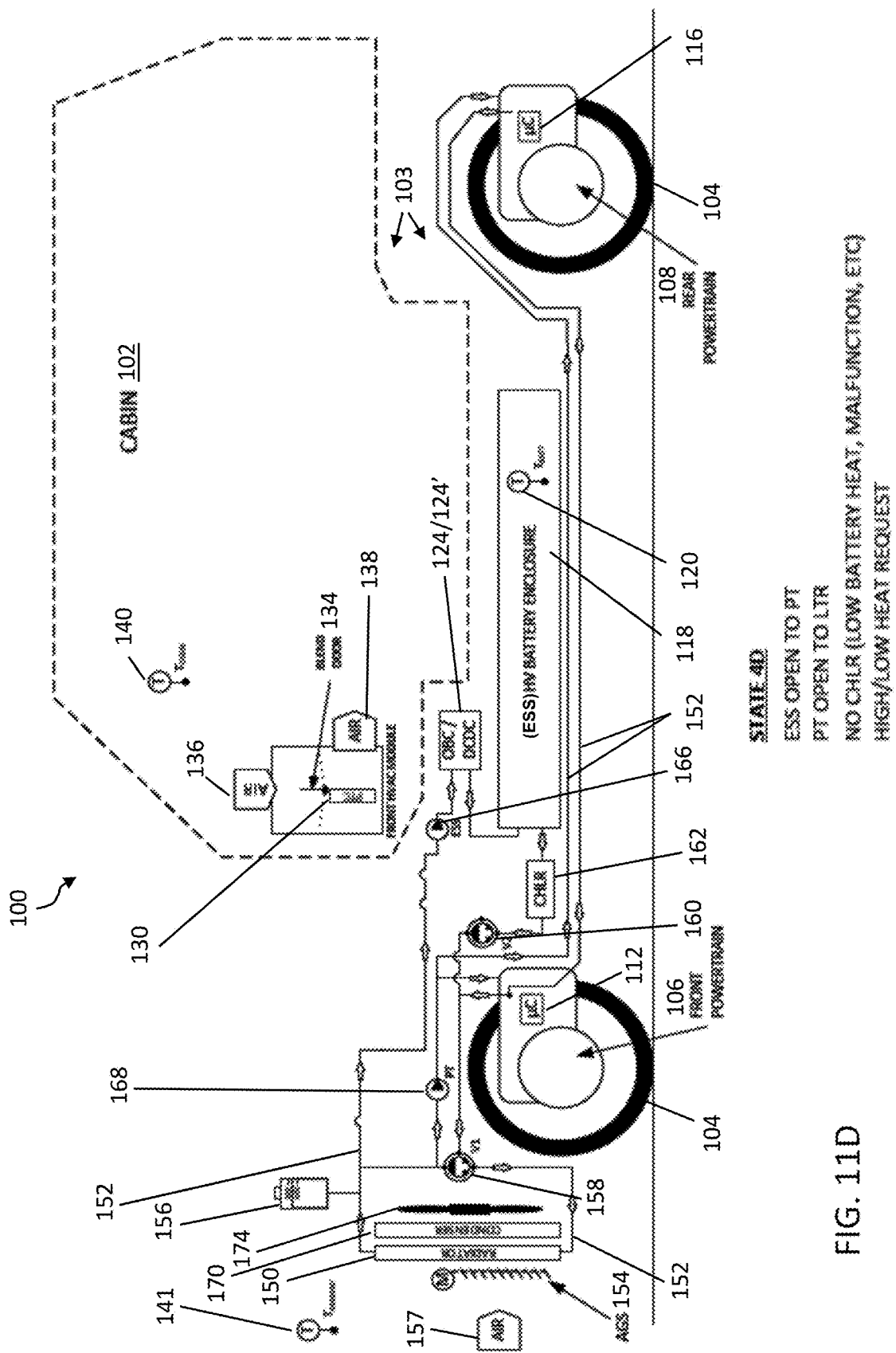
Figure 11E:
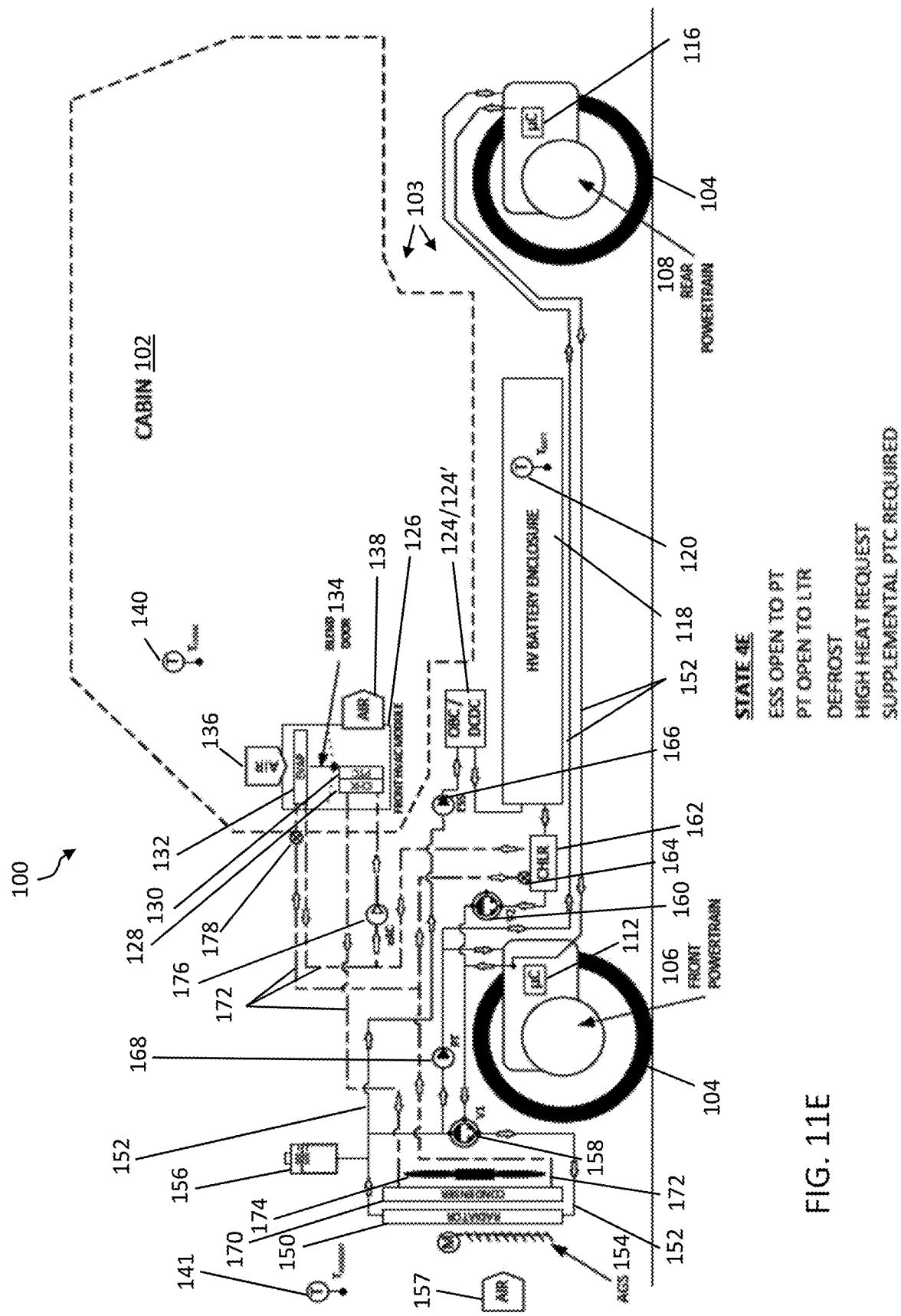
Figure 11F:
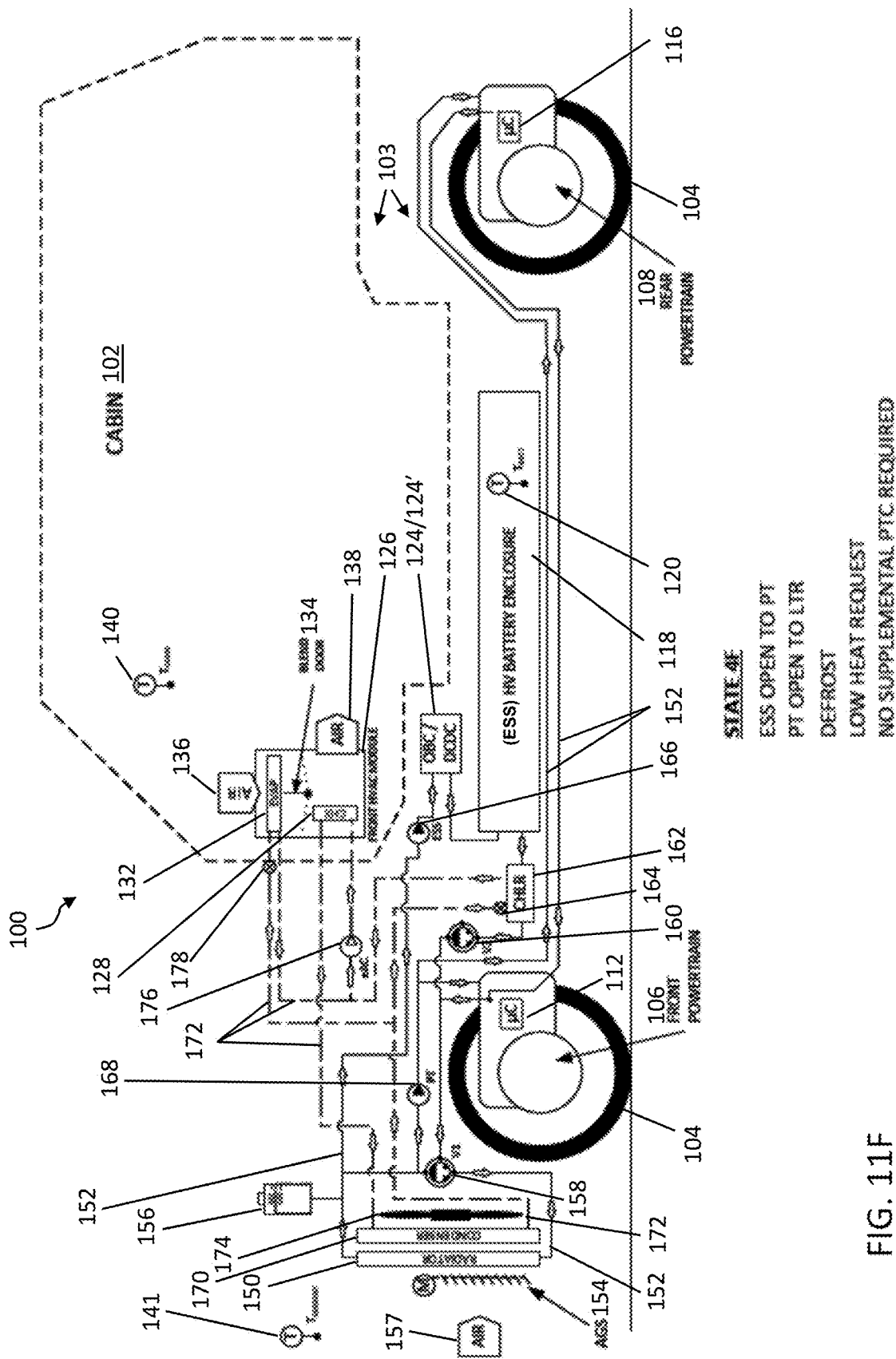
Figure 11G:
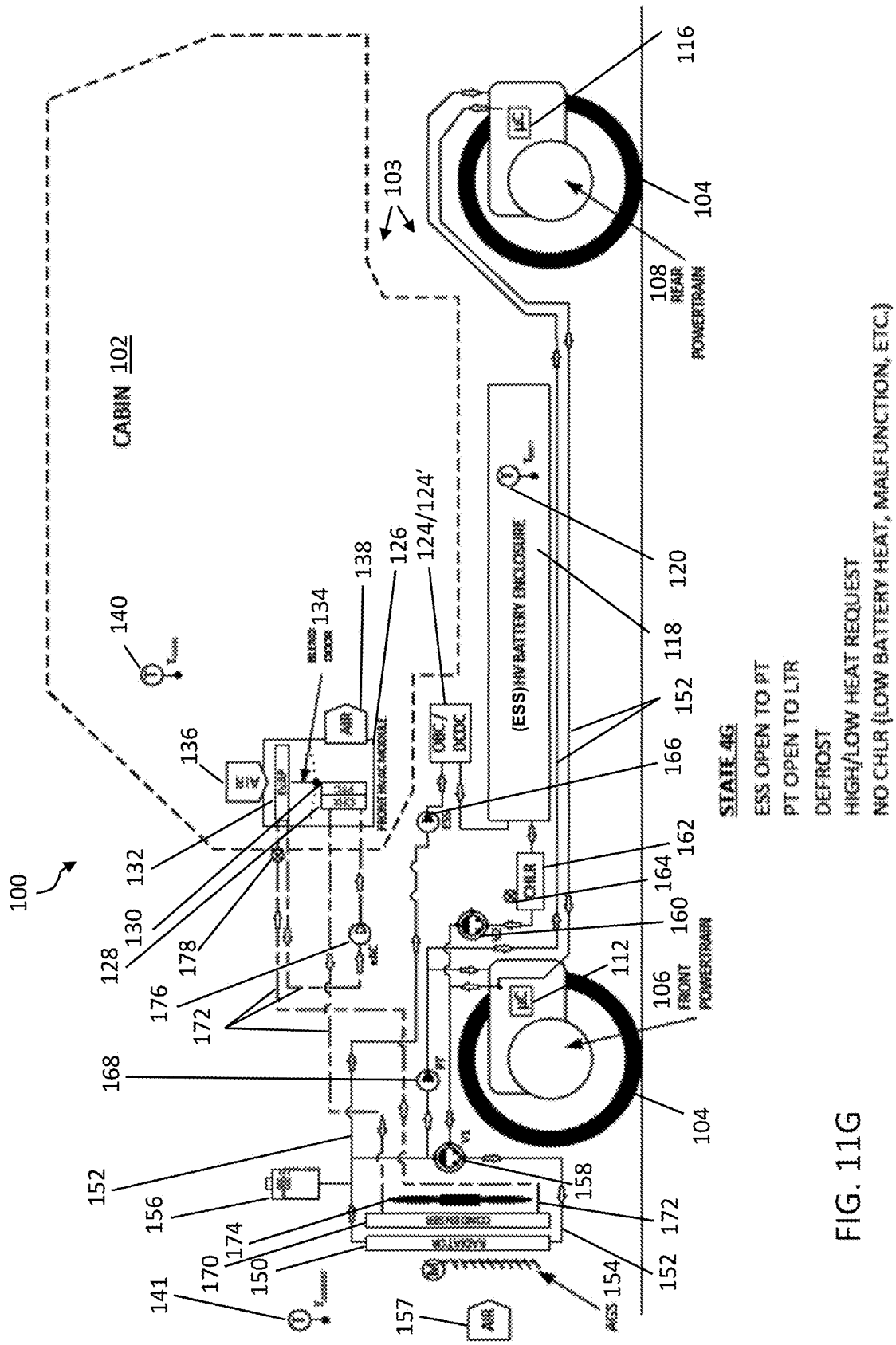

FIG. 7G illustrates a refrigerant flow state suitable for a high or low heat request, and for which defrost is desired and for which there is no activity required by the coolant-refrigerant heat exchanger 162. For example, refrigerant can flow along refrigerant lines 172 from condenser 170 through expansion valve 178 into A/C evaporator 132, through electric A/C compressor 176 into cabin heat exchanger (heat pump) 128 that can be modified via positive temperature coefficient heater 130, and subsequently back to condenser 170.

In exemplary operation, discharge gas from electric A/C compressor 176 (eAC) can be passed to the cabin heat exchanger 128 (CHX), where, when the HVAC module blend door 134 is not in "full cold" position, heat is exchanged (lost to) ambient air from outside which then passes to the cabin as "useful" heat. Where the blend door is in the "cold" position, no heat is exchanged. Refrigerant is then passed to the condenser 170 where full "condensation" takes place (if needed), or the AGS 154 can be closed to control the amount of subcooling. The high pressure liquid refrigerant then passes to the combo chiller/high pressure heat exchanger 162 and through the TXV 164 where heat from the ESS (and PT) glycol loops boil off the atomized refrigerant. This process can remove heat from the ESS and PT loops.

Refrigerant may also be passed to the front HVAC module evaporator 132 to enable drying of the incoming cabin air for comfort and demist purposes. Rear/Aux AC isolation solenoid 178' could be disabled in a heat pump mode. If the CHX "air-off temperature" is below the target temperature, or the heat pump is not operational (e.g., ESS temperature or ambient too low), then the airside PTC heater 130 can be commanded ON and its duty cycle adjusted (via PID) to achieve target heater discharge temperature.

FIGS. 8A-8G are schematic diagrams illustrating coolant flow and refrigerant flow for seven exemplary sub-states (State 1A-State 1G) for the first coolant flow state (State 1) described above in which HV battery energy storage system has a closed loop coolant configuration and in which the power train has a configuration where power train coolant bypasses the low temperature radiator. These sub-states are listed in the figures as States 1A-1G, and have associated conditions listed on the respective figures. The sub-states represent the combination of primary coolant State 1 combined with the seven different refrigerant flow states described above in connection with FIGS. 7A-7G, exemplary conditions for which are also summarized in FIGS. 14A-14D. In FIGS. 14A-14D, it should be understood that the heading V1 refers to V1 158 in FIGS. 1 and 5A-11G, heading V2 refers to V2 160 in FIGS. 1 and 5A-11G, heading EXV1 (Chiller) refers to expansion valve 164 in FIGS. 1 and 5A-11G, and heading EXV2 (Cabin) refers to expansion valve 178 in FIGS. 1 and 5A-11G, according to examples described herein.

FIGS. 9A-9G are schematic diagrams illustrating coolant flow and refrigerant flow for seven other exemplary sub-states (State 2A-State 2G) for a second coolant flow state (State 2) in which HV battery energy storage system has a closed loop coolant configuration and in which the power train has a configuration where power train coolant is open to the low temperature radiator. These sub-states are listed in the figures as States 2A-2G, and have associated conditions listed on the respective figures. The sub-states represent the combination of primary coolant State 2 combined with the seven different refrigerant flow states described above in connection with FIGS. 7A-7G, exemplary conditions for which are also summarized in FIGS. 14A-14D.

FIGS. 10A-10G are schematic diagrams illustrating coolant flow and refrigerant flow for seven other exemplary sub-states (State 3A-State 3G) for a third coolant flow state (State 3) in which coolant for the HV battery energy storage system is open to the power train and in which the power train has a configuration where power train coolant bypasses the low temperature radiator. These sub-states are listed in the figures as States 3A-3G, and have associated conditions listed on the respective figures. The sub-states represent the combination of primary coolant State 3 combined with the seven different refrigerant flow states described above in connection with FIGS. 7A-7G, exemplary conditions for which are also summarized in FIGS. 14A-14D.

FIGS. 11A-11G are schematic diagrams illustrating coolant flow and refrigerant flow for seven other exemplary sub-states (State 4A-State 4G) for a fourth coolant flow state (State 4) in which coolant for the HV battery energy storage system is open to the power train and in which the power train has a configuration where power train coolant is open to the low temperature radiator. These sub-states are listed in the figures as States 4A-4G, and have associated conditions listed on the respective figures. The sub-states represent the combination of primary coolant State 4 combined with the seven different refrigerant flow states described above in connection with FIGS. 7A-7G, exemplary conditions for which are also summarized in FIGS. 14A-14D.

Figure 12:
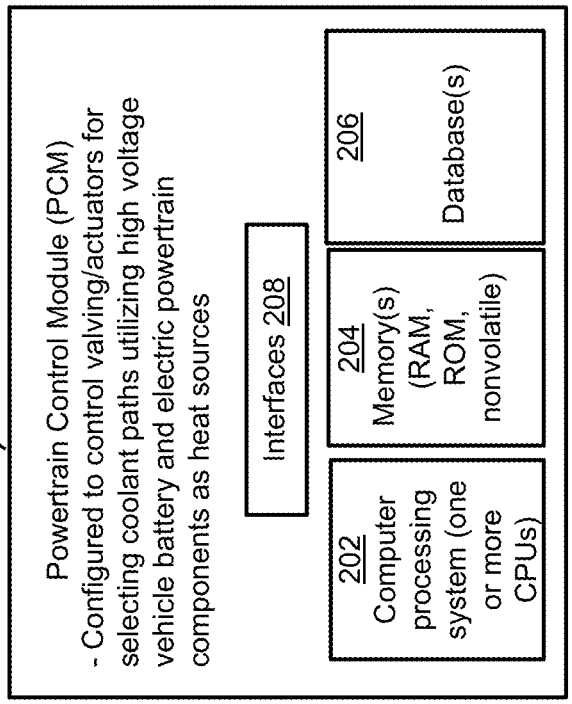
FIG. 12 is a block diagram illustrating components of a power train control module or controller for controlling coolant flow and refrigerant flow according to examples of the disclosure.

FIG. 12 is a block diagram illustrating components of a power train control module 200 or controller for controlling coolant flow and refrigerant flow according to examples of the disclosure, such as powertrain control module 190 in FIG. 1, which may be used control the methods and systems described herein, and which may comprise any suitable combination of hardware, software and/or firmware. As shown in FIGS. 1 and 12, the power train control module (PCM) 190, 200 may control suitable valves and actuators for selecting coolant paths utilizing high voltage vehicle battery and electric powertrain components as heat sources. As shown in FIG. 12, a PCM 200 may include a processing system 202, which may comprise one or more computer processing units, memory 204 such as random access memory, read only memory, nonvolatile memory, etc., one or more databases 206 store in memory that store information pertinent to the control of the vehicles cooling system, and one or more interfaces 208 suitable for acquiring data from various vehicle sensors, such as temperature sensors, and for controlling valves with suitable actuators to achieve the desired cooling and heating states. The computer processing system 202 may execute software operations, program instructions or routines to implement calculations and analyses. Such program instructions, accumulated data, and processed data may be stored one or more non-transitory computer-readable memories 204 and/or one or more in databases 206. The vehicle may communicate with remote databases and computer systems via a transceiver 199.

The powertrain control module 190, 200 may include element managers, real-time data buffers, conveyors, file input processors, database indices, data buffers and data managers for managing data and processing. The human machine interface 142, which communicates with the powertrain control module 190, 200, may include displays, display interfaces, input/output devices such as button controls, dials, microphones, touchscreens and the like for permitting a user to select desired cabin environmental conditions.

FIGS. 14A-14D depict operational guidelines or conditions for how the exemplary coolant flow states and refrigerant flow states may be invoked by the controller 190 depending upon desired actions for the electric vehicle 100. For example, the headings "Interior," "Battery," and "Powertrain Loop" reflect desired actions for each of these systems, which may be selected based on detected ambient environmental conditions, detected system conditions, as well as predictive analytics based upon the intended use of the vehicle, the vehicles location, weather conditions, road conditions, and the like. Exemplary states associated with identified conditions are also described for "Electric Air Conditioner Compressor" (on or off) (AC Compressor), "Air Positive Temperature Coefficient High Voltage Heater" (on or off) (PTC Heater), "Battery Heater" (on or off), "Active Grill Shutter" (0-100% open) (AGS), "Valve 1" and "Valve 2" (open, closed, or N/A which means it doesn't matter), "Chiller Valve (To CHLR)" (open or closed), and "Cabin Valve (To EVAP)" (open or closed). Regarding the active grill shutter (AGS), a position of the active grill shutter between 0% open and 100% open may be determined/chosen based on the external ambient temperature, the coolant temperature, the vehicle wind speed, etc., so as to achieve suitable heat dissipation at a radiator, e.g., as conventionally understood by those of skill in the art. For example, if the ambient temperature is 0 degrees C., the coolant temperature is 30 degrees C., and the vehicle is traveling 55 mph, the AGS can be set to 0% open (i.e., fully closed) to reduce aerodynamic drag while still achieving desired cooling of coolant at the radiator. Moreover, coolant temperatures can be monitored at an input to the radiator and at an output to the radiator can be monitored via temperature sensors positioned at input and output locations, and the AGS percent opening can be controlled based on a difference between those measured temperatures in order to provide desired heat dissipation at the radiator. In addition, exemplary temperature ranges are identified for identified conditions, e.g., "Interior Temperature," "Battery Loop Temperature," and "Power Train Loop Temperature." These temperatures are merely exemplary and other temperatures could be used depending upon the particular performance metrics of the various systems being controlled. For the temperatures shown in FIGS. 14A-14D, the values may be adjusted, for example, by ±10% in some examples, and by ±5° C. in other examples, for instance. Exemplary information in FIG. 14 summarizes examples by which a controller can receive input signals, e.g., relating to temperature, and communicate output signals to actuators for valves and other components such as described herein to invoke certain states associated with the identified numbered conditions. For example, with reference to the first row of FIG. 14A, if the interior temperature is detected as >20° C., the battery temperature is detected as >30° C., and the powertrain temperature is detected as <55° C., condition 1 may be invoked by the controller to execute control signals such that the electric air conditioning compressor is on, the air positive temperature coefficient high voltage heater is off, the battery heater is off, valve 1 is set to bypass radiator, valve 2 is closed, chiller valve is open, and cabin valve is open.

The order of importance for protecting vehicle's systems and components can be based on operational constraints (i.e., sensitivity to extremes of temperatures and maintaining functionality), and overall system cost. The high voltage battery assembly 118 (as an ESS) is an expensive and typically the most critical system of the vehicle 100, and has a relatively narrow temperature band at which it can operate (approximately in the region of +5° C. to 40° C.) compared with the ambient temperature that the vehicle may be expected to be operational in. This is followed by the powertrain systems (the inverter, motor, power electronics including the DC-DC converter, on-board charger), however, the powertrain systems are generally less sensitive to ambient temperatures, but may be more sensitive to the extremes of loading and duty cycles (e.g., towing, high speed, mountainous routes, etc., especially when combined with higher ambient temperatures).

However, operational hierarchy for the vehicle's thermal management system is based primarily on maintaining operator/passenger comfort at all ambient conditions (hot, cold, humidity, solar load, demist/defog)—the expectation is that the other systems (ESS and PT) are maintained within their respective operational limits, with no impact on passenger comfort. In an electric vehicle, on-board electric energy stored in the HV battery system has to provide the means to maintain this comfort while minimizing impact on operational system performance and overall vehicle range.

Figure 13:
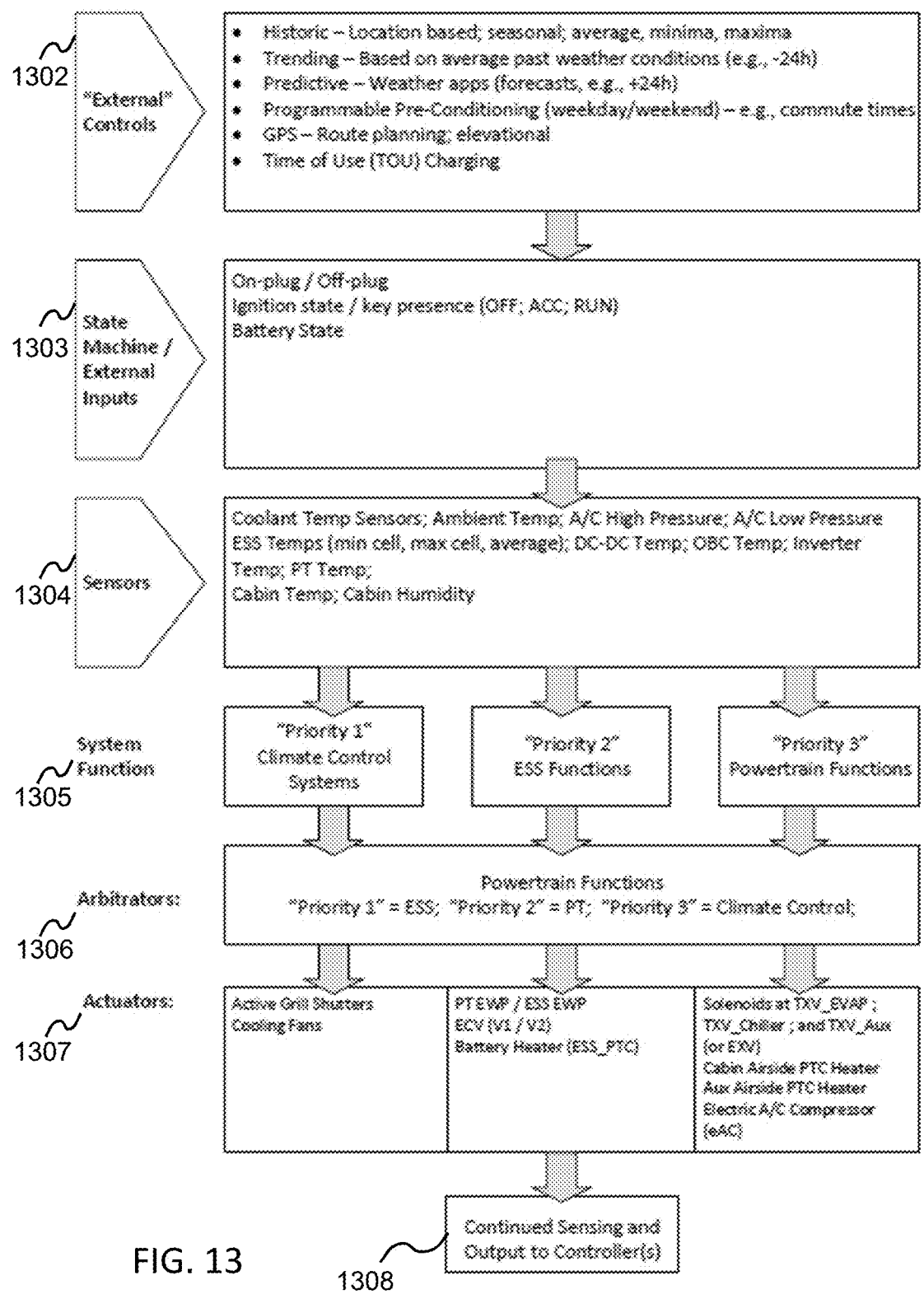
FIG. 13 is an operational flow diagram that illustrates various exemplary factors for controlling coolant and refrigerant states for an electric vehicle according to examples of the disclosure.

FIG. 13 shows an operational flow diagram that illustrates various exemplary factors for controlling coolant and refrigerant states for an electric vehicle according to examples of the disclosure such as described above. The vehicle's thermal management system is continuously responding to dynamic and changing conditions via suitable sensors such as described above and including, e.g., external controls 1302 such as vehicle speed, load (gradient; uphill/downhill grade), ambient temperature, solar load, rain, humidity, electrical loads, etc., through sensing and processing carried out by PCM 190, 200. Additionally external controls at 1302 may include historical information of the vehicle such as expected locational or seasonal information, e.g., average, minimum, maximum expected temperature for a given location for a given date range, trending information such as seasonal information based on average past weather conditions, e.g., for a prior 24 hour period, predictive information such as weather forecasts, e.g., for an upcoming 24 hour period, programmable pre-conditioning information such as commute time windows, global positioning system (GPS) information such as route planning, and intended time-of-use charging information. Furthermore, in a bid to increase efficiency, other factors may be considered to improve system function, e.g., using optimized GPS route planning to avoid steep grades, using trended or forecasted weather conditions to proactively "pre-condition" the vehicle's systems (either the cabin or ESS). Based on the operational hierarchy, and the cascading thermal management needs, the thermal management system can take inputs from many systems and determine the required outputs for the system's actuators, e.g., evaluate sensors listed at 1304. The controls set points are determined continuously on a set of system calibrations which are arbitrated in the controller to ensure that each system is maintained at the optimum temperature, and this may be different depending on the season, geographic location, route, etc.

Thus, as a general matter, it can be desirable to prioritize, at 1305, the vehicle's 100 satisfaction of desired performance factors according to certain rules. For example, it can be desirable to provide the desired cabin environment for the occupant as a first priority, then satisfy the high-voltage battery system requirements, then satisfy the powertrain system requirements. There is also an exception to adjust priority to configure the cooling and refrigerant systems to satisfy the most urgent need should there be a serious fault condition or extreme condition detected in either the high voltage battery system or the powertrain system. Powertrain functions as discussed above can determined by the PCM 190, 200 based on the set priority, at 1306, e.g., evaluate and apply arbitrator rules. Based on the powertrain functions, various actuators can be controlled by the PCM 190, 200, at 1307, to correspond with the given powertrain functions and control various components. For example, activation of one or more of active grill shutter (AGS) 154, fan 174, electric water pump 168, electric water pump 166, V1 158, V2, 160, solenoids at heat exchanger 162, solenoids at A/C evaporator 132, expansion valve 164, expansion valve 130, positive temperature coefficient heater 130, and/or electric A/C compressor 176 may be done to control the vehicle thermal management system as described herein. Ongoing sensing of vehicle parameters such as described above may be carried out with output therefrom being sent to controllers such as PCM 190 and/or PCM 200 for ongoing evaluation, at 1308.

It will be appreciated that examples described herein use the HV battery assembly 118 as a thermal heat store, having a large capacity for storing heat, which differs from a conventional approach which uses outside air as a heat source, such as in a reverse cycle heat pump (with reversing valves and check valves). This can provide increased performance and increased efficiency since heat is taken from ESS and PT loops as opposed to relying exclusively on outside air and/or electrical cabin heating from stored battery charge. Also, the high voltage battery assembly 118 can be preheated (preconditioned) using wall power and a battery heater to a maximum allowable battery temperature during cold climates to provide additional stored heat for the vehicle excursion reducing the need for relying the electrical charge of the battery itself for providing cabin heating. It should be appreciated that examples according to the disclosure may provide desirable advantages of avoiding reversing valves and may avoiding check valves at condenser evaporators and the chiller. Also, the exemplary system utilizes heat (thermal energy) stored in the battery itself and waste heat from powertrain loop when loops are blended. These exemplary approaches may provide improved vehicle range and overall efficiency for electric vehicles during "heating" season. Of course, the examples described herein may still also utilize outside air as a heat source or heat sink.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While the present invention has been described in terms of exemplary embodiments, it will be understood by those skilled in the art that various modifications can be made thereto without departing from the scope of the invention as set forth in the claims.

What is claimed is:

1. An automotive electric vehicle system, the system comprising:
   an electric powertrain system;
   a battery system that provides energy to the electric powertrain system for vehicle propulsion;
   a radiator;
   coolant lines that permit flow of coolant between the battery system, the powertrain system and the radiator;
   one or more valves configured to route coolant along the coolant lines;
   a controller configured to control the valves to facilitate the flow of coolant among a plurality of different, selectable coolant flow states involving the battery system, the powertrain system, and the radiator, the controller controlling the valves at least partially based on external control inputs and priorities,
   wherein the external control inputs are parameters measured, calculated or provided from outside of the vehicle and include at least one input selected from historic information, trending information, predictive information, Location-based information and intended Time of Use Charging information, and wherein the priorities are based on performance factors, and
   wherein the priorities include an order of importance for providing a desired cabin environment for the occupant, satisfying a battery system requirement, and satisfying powertrain system requirements; and
   a heating, ventilation and air conditioning (HVAC) system, the HVAC system comprising
   an evaporator at the cabin configured to provide cabin cooling using a refrigerant, a first heat exchanger at the cabin arranged in a heat pump configuration to provide cabin heating using the refrigerant, and
   a second heat exchanger configured to exchange heat between the refrigerant and the coolant to extract heat from the battery system to provide cabin heating.

2. The system of claim 1, wherein one of the plurality of different, selectable coolant states comprises a coolant flow state in which the battery system has a closed loop coolant configuration and in which the powertrain has a configuration in which powertrain coolant bypasses the radiator.

3. The system of claim 1, wherein one of the plurality of different, selectable coolant states comprises a coolant flow state in which the battery system has a closed loop coolant configuration and in which the powertrain has a configuration where powertrain coolant is open to the radiator.

4. The system of claim 1, wherein one of the plurality of different, selectable coolant states comprises a coolant flow state in which coolant in the battery system is open to the powertrain and in which powertrain coolant bypasses the radiator.

5. The system of claim 1, wherein one of the plurality of different, selectable coolant states comprises a coolant flow state in which coolant for the battery system is open to the powertrain and in which powertrain coolant is open to the radiator.

6. The system of claim 1, further comprising: a first temperature sensor configured to sense cabin temperature;
a second temperature sensor configured to sense an ambient outside temperature;
a third temperature sensor configured to sense powertrain temperature; and
a fourth temperature sensor configured to sense battery system temperature.

7. The system of claim 6, wherein the controller is configured to receive signals from the first, second, third and fourth temperature sensors and select one of the coolant flow states based at least in part on said signals from the first, second, third and fourth temperature sensors.

8. The system of claim 1, further comprising:
a human-machine interface configured to permit a vehicle occupant to select desired cabin environmental conditions.

9. The system of claim 8, wherein the controller is further configured to select one of the coolant flow states based at least in part on a signal from the human-machine interface.

10. The system of claim 1, wherein the one or more valves include a valve comprising five ports.

11. The system of claim 1, wherein the external control inputs include currently sensed information.

12. The system of claim 11, wherein the currently sensed information includes at least one of vehicle speed, vehicle load, and electrical load.

13. The system of claim 11, wherein the currently sensed information includes at least one of ambient temperature, solar load, rain, and humidity.

14. The system of claim 1, wherein the historic information includes historical weather information for a given location, wherein the predictive information includes weather forecasts, wherein the trending information includes commute time windows, wherein the location information includes at least one of route planning information and intended time-of-use charging information.

15. The system of claim 1, wherein the priorities include at least one of cabin environment, battery system requirements, powertrain system requirements.

16. The system of claim 15, wherein the priorities are set based on arbitrator logic.

17. A heat transfer system for an electric vehicle, the system comprising:
coolant lines that permit flow of coolant between a powertrain system, a battery system that provides energy to the powertrain system for vehicle propulsion, and a radiator;
one or more valves configured to route coolant along the coolant lines;
a controller configured to control the valves to facilitate the flow of coolant among a plurality of different, selectable coolant flow states involving the battery system, the powertrain system, and the radiator, the controller controlling the valves at least partially based on external control inputs and priorities,
wherein the external control inputs are parameters measured, calculated or provided from outside of the vehicle and include at least one input selected from historic information, trending information, predictive information, Location-based information and intended Time of Use Charging information, and
wherein the priorities are based on performance factors and the priorities include an order of importance for providing a desired cabin environment for the occupant, satisfying a battery system requirement, and satisfying powertrain system requirements; and
a heating, ventilation and air conditioning (HVAC) system, the HVAC system comprising
an evaporator at the cabin configured to provide cabin cooling using a refrigerant,
a first heat exchanger at the cabin arranged in a heat pump configuration to provide cabin heating using the refrigerant, and
a second heat exchanger configured to exchange heat between the refrigerant and the coolant to extract heat from the battery system to provide cabin heating.

18. The system of claim 17, wherein the one or more valves include a valve comprising five ports.

19. A method of controlling heat flow between systems of an electric automotive vehicle, the method comprising:
receiving, by at least one data processor, external data to the electric vehicle and sensor, data from one or more sensors at the electric vehicle, the electric vehicle comprising a powertrain system, a battery system that provides energy to the powertrain system for vehicle propulsion, and a radiator;
identifying, by at least one data processor, a desired coolant flow state from a plurality of different, selectable coolant flow states that permit flow of coolant among the battery system, the powertrain system, and the radiator;
providing, by at least one data processor, output to a controller to facilitate control of the desired coolant flow state; and
controlling a heating, ventilation and air conditioning (HVAC) system to provide a desired cabin climate, the controlling at least partially based on external control inputs and priorities,
wherein the external control inputs are parameters measured, calculated or provided from outside of the vehicle and include at least one input selected from historic information, trending information, predictive information, Location-based information and intended Time of Use Charging information, and
wherein the priorities are based on performance factors and the priorities include an order of importance for providing a desired cabin environment for the occupant, satisfying the battery system requirement, and satisfying powertrain system requirements,
the HVAC system comprising
an evaporator at the cabin configured to provide cabin cooling using a refrigerant,
a first heat exchanger at the cabin arranged in a heat pump configuration to provide cabin heating using the refrigerant, and
a second heat exchanger configured to exchange heat between the refrigerant and the coolant to extract heat from the battery system to provide cabin heating.

20. The method of claim 19, wherein one of the plurality of different, selectable coolant states comprises a coolant flow state in which the battery system has a closed loop coolant configuration and in which the powertrain has a configuration in which powertrain coolant bypasses the radiator.

21. The method of claim 19, wherein one of the plurality of different, selectable coolant states comprises a coolant flow state in which the battery system has a closed loop coolant configuration and in which the powertrain has a configuration where powertrain coolant is open to the radiator.

22. The method of claim 19, wherein one of the plurality of different, selectable coolant states comprises a coolant flow state in which coolant in the battery system is open to the powertrain and in which powertrain coolant bypasses the radiator.

23. The method of claim 19, wherein one of the plurality of different, selectable coolant states comprises a coolant flow state in which coolant for the battery system is open to the powertrain and in which powertrain coolant is open to the radiator.

24. The method of claim 19, comprising controlling one or more valves to facilitate control of the desired coolant flow state, wherein the one or more valves include a valve comprising five ports.

25. The method of claim 19, wherein the external control inputs include currently sensed information.

26. The system of claim 25, wherein the currently sensed information includes at least one of vehicle speed, vehicle load, and electrical load.

27. The system of claim 25, wherein the currently sensed information includes at least one of ambient temperature, solar load, rain, and humidity.

28. The system of claim 19, wherein the historic information includes historical weather information for a given location, wherein the predictive information includes weather forecasts, wherein the trending information includes commute time windows, wherein the location information includes at least one of route planning information, and intended time-of-use charging information.

29. The system of claim 19, wherein the priorities include at least one of cabin environment, battery system requirements, powertrain system requirements.

30. The system of claim 29, wherein the priorities are set based on arbitrator logic.

* * * * *